US 12,328,059 B2

(12) United States Patent
Atias et al.

(10) Patent No.: US 12,328,059 B2
(45) Date of Patent: Jun. 10, 2025

(54) INPUT VOLTAGE CONTROL FOR A DC/AC POWER CONVERTER

(71) Applicant: Solaredge Technologies Ltd., Herzeliya (IL)

(72) Inventors: Matan Atias, Tel Aviv (IL); Liron Har-Shai, Tel Mond (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 18/450,087

(22) Filed: Aug. 15, 2023

(65) Prior Publication Data

US 2023/0387778 A1    Nov. 30, 2023

Related U.S. Application Data

(63) Continuation of application No. 17/489,856, filed on Sep. 30, 2021, now Pat. No. 11,770,063.

(60) Provisional application No. 63/085,457, filed on Sep. 30, 2020.

(51) Int. Cl.
| | |
|---|---|
| *H02M 7/10* | (2006.01) |
| *H02J 3/38* | (2006.01) |
| *H02M 1/00* | (2006.01) |
| *H02M 3/07* | (2006.01) |

(52) U.S. Cl.
CPC ........... *H02M 1/0022* (2021.05); *H02J 3/381* (2013.01); *H02M 1/007* (2021.05); *H02M 3/07* (2013.01); *H02J 2300/24* (2020.01)

(58) Field of Classification Search
CPC .................. H02M 7/10–106; H02M 3/07–073
See application file for complete search history.

(56) References Cited

U.S. PATENT DOCUMENTS

| | | | |
|---|---|---|---|
| 8,169,797 B2 | 5/2012 | Coccia et al. | |
| 9,203,321 B1* | 12/2015 | Xiong | H05B 45/3725 |
| 10,141,788 B2* | 11/2018 | Karnstedt | H02J 50/12 |
| 11,159,016 B2 | 10/2021 | Yoscovich et al. | |
| 11,258,261 B2 | 2/2022 | Yoscovich et al. | |
| 11,770,063 B2* | 9/2023 | Atias | H02J 5/00 |
| | | | 363/37 |
| 2008/0266919 A1 | 10/2008 | Mallwitz | |
| 2009/0034304 A1* | 2/2009 | Engel | H02J 3/381 |
| | | | 363/71 |

(Continued)

FOREIGN PATENT DOCUMENTS

| | | | |
|---|---|---|---|
| DE | 202011102068 U1 | 9/2012 | |
| EP | 2136463 A2 | 12/2009 | |

(Continued)

OTHER PUBLICATIONS

Feb. 24, 2022—Extended EP Search Report—EP App. No. 21199900.8.

*Primary Examiner* — Sisay G Tiku
(74) *Attorney, Agent, or Firm* — Banner & Witcoff, Ltd.

(57) ABSTRACT

Systems, apparatuses, and methods are described for power conversion. In some examples, the power conversion may be done by an inverter configured to convert a direct current (DC) input to an alternating current (AC) output. The inverter may include a plurality of capacitors connected at the input of a DC/AC module. The system may include a housing configured to house the inverter. Voltage control circuitry may be configured to increase a voltage at the input of the DC/AC module inside the housing of the inverter.

20 Claims, 38 Drawing Sheets

(56) References Cited

U.S. PATENT DOCUMENTS

| | | | |
|---|---|---|---|
| 2011/0084553 A1 | 4/2011 | Adest et al. | |
| 2012/0007576 A1 | 1/2012 | Suntio et al. | |
| 2012/0155139 A1 | 6/2012 | Boeke | |
| 2013/0229844 A1 | 9/2013 | Gazit et al. | |
| 2013/0235628 A1 | 9/2013 | Dong et al. | |
| 2014/0084894 A1 | 3/2014 | Lubomirsky | |
| 2014/0268908 A1 | 9/2014 | Zhou et al. | |
| 2015/0288296 A1* | 10/2015 | Kidera | H02M 7/5387 363/132 |
| 2016/0085255 A1 | 3/2016 | Gazit et al. | |
| 2017/0255218 A1* | 9/2017 | Gazit | G05F 3/08 |
| 2019/0348926 A1* | 11/2019 | Yoscovich | H02J 3/381 |
| 2020/0083715 A1* | 3/2020 | Yoscovich | H02J 3/381 |
| 2020/0176991 A1 | 6/2020 | Dai et al. | |
| 2020/0177087 A1 | 6/2020 | Warnes | |
| 2020/0212806 A1* | 7/2020 | Levi | H02M 3/33507 |

FOREIGN PATENT DOCUMENTS

| | | |
|---|---|---|
| EP | 2339730 A1 | 6/2011 |
| EP | 3993243 A1 | 5/2022 |
| JP | 7140629 B2 | 9/2022 |
| WO | 2011027300 A2 | 3/2011 |
| WO | 2014169388 A1 | 10/2014 |
| WO | 2015063898 A1 | 5/2015 |
| WO | 2021090522 A1 | 5/2021 |

\* cited by examiner

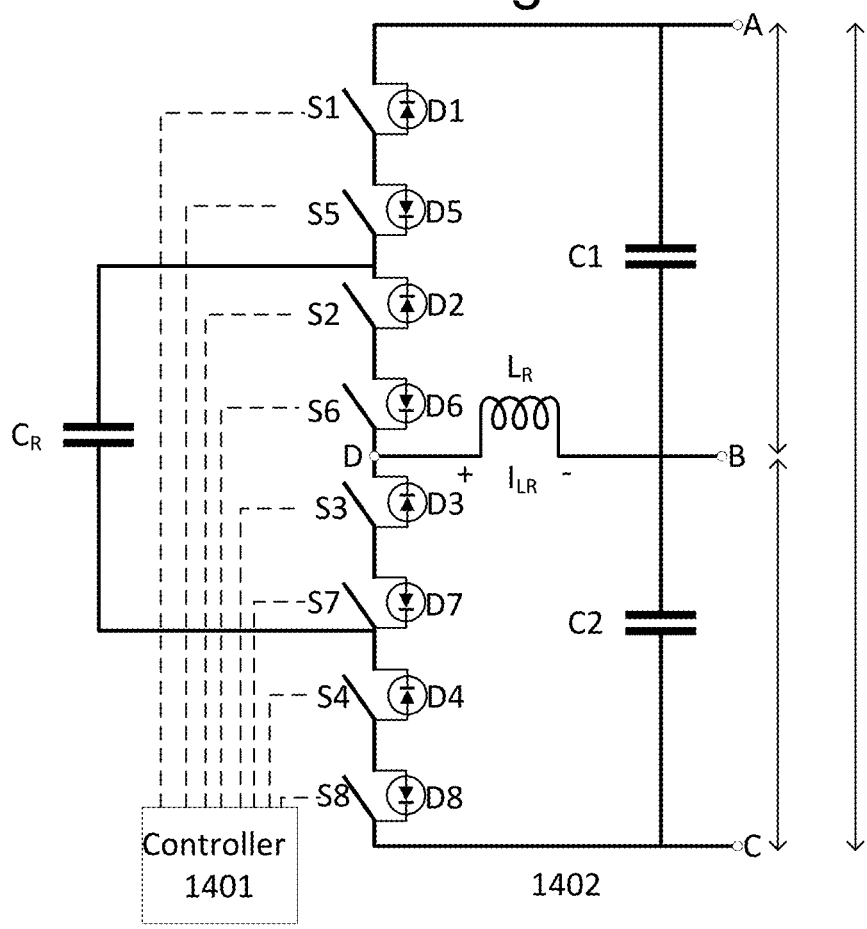

Fig. 14C
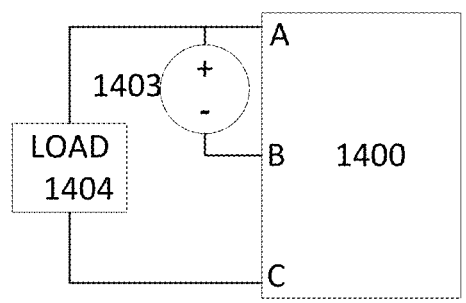
1400A
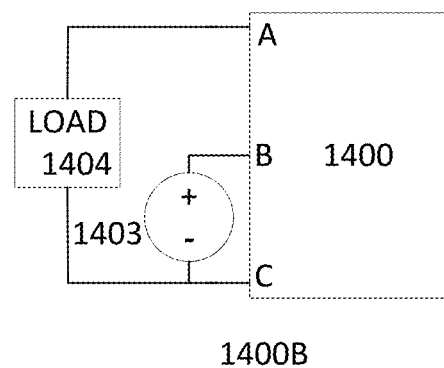
1400B
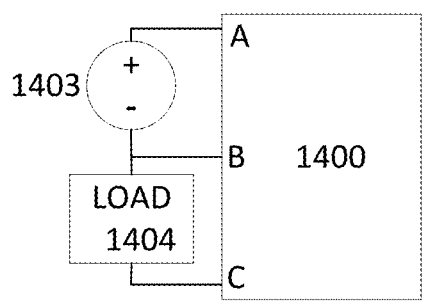
1400C
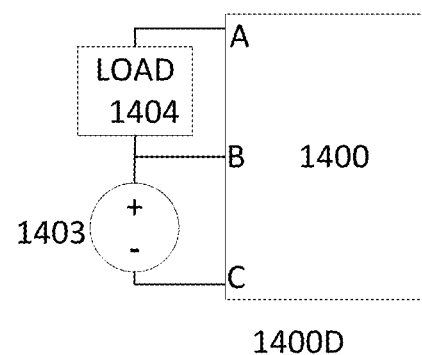
1400D
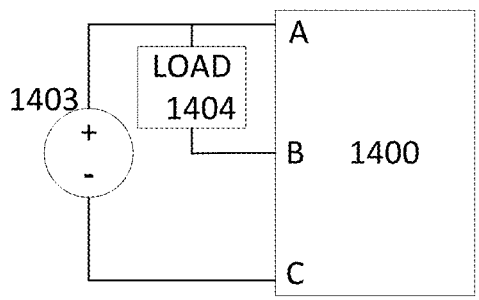
1400E
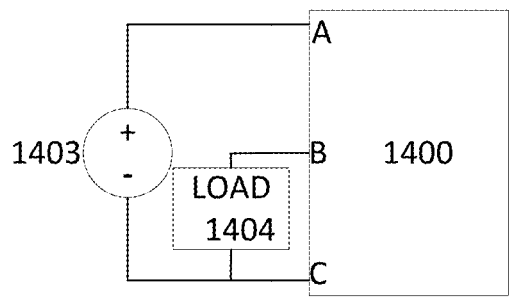
1400F

Fig. 21

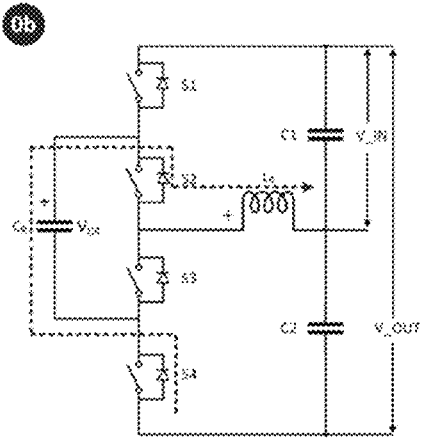
- Resonance circuit between $C_x$ and $L_x$.
- Current is positive.
- S1, S3 are turned-off.
- S2, S4 are turned-on.
(e)

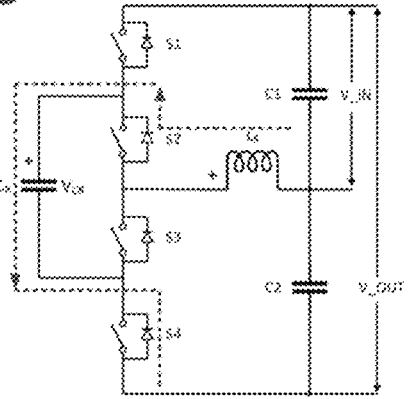
- Resonance continues between $C_x$ and $L_x$.
- Current is now negative.
- S1, S3 are turned-off.
- S2, S4 are turned-on.
(f)

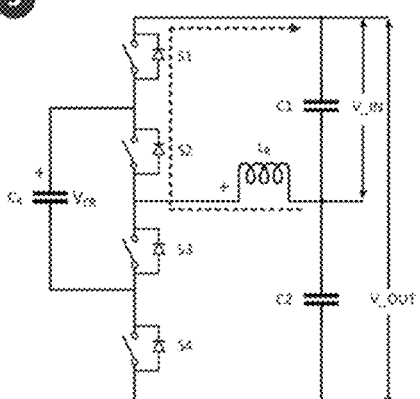
- S4 gate is turned-off (near-ZCS switching operation).
- S2 continues to conduct.
- S3 diode turns-on. S1 gate can be turned-on. (ZVS switching operation)
- $L_x$ current starts to rise as it sees a positive voltage $V_{IN}$ across it.
(g)

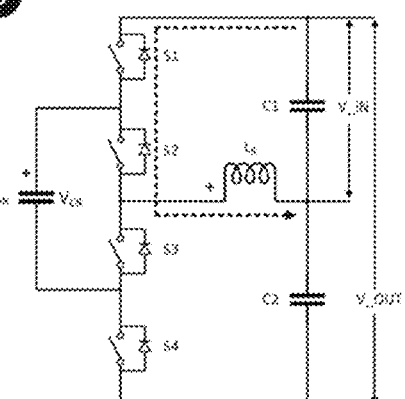
- $L_x$ current becomes positive.
- S2 gate is turned-off between (5) and (6) (near-ZCS and ZVS switching operation).
- $L_x$ current continues to flow due to S2 diode recovery and S2 output capacitor charging process.
- $L_x$ current continues to rise.
(h)

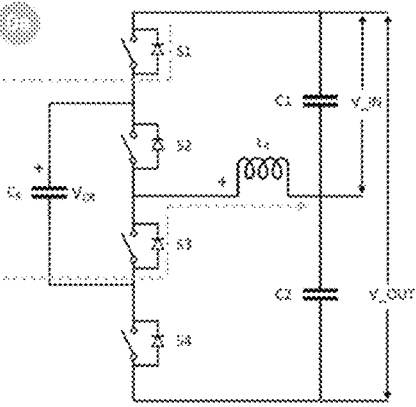
- S2 finally turns-off and current is positive.
- S3 is kept-on.
- S3 diode takes-over the $L_x$ current. S3 gate is turned-on.
- Resonance cycle between $C_x$ and $L_x$.
(a)

INPUT VOLTAGE CONTROL FOR A DC/AC POWER CONVERTER

CROSS REFERENCE TO RELATED APPLICATIONS

This application is a continuation of U.S. application Ser. No. 17/489,856, filed Sep. 30, 2021, now U.S. Pat. No. 11,770,063, which is a non-provisional of and claims priority to U.S. Provisional Application No. 63/085,457, filed Sep. 30, 2020.

BACKGROUND

Electrical power conversion may be done to convert electrical energy from one form to another. Power conversion of electrical energy may include: changing a voltage to another voltage, changing a frequency to another frequency, converting between alternating current (AC) and direct current (DC), etc. An electric power converter is a device used for converting electrical energy. One way of classifying power conversion is according to whether the input and output are AC or DC. DC to DC converters may convert power from a source of DC from one voltage level to DC at another voltage level. There may be certain rules that dictate what voltage levels are permitted for a given source and given load.

SUMMARY

The following presents a simplified summary of certain features. The summary is not an extensive overview and is not intended to identify key or critical elements.

Systems, apparatuses, and methods are described for electrical power conversion.

In some examples, electrical power conversion may be done by an inverter configured to convert a direct current (DC) input to an alternating current (AC) output. The inverter may include a plurality of capacitors connected in series at the input of a DC/AC module. The system may include a housing configured to house the inverter. A converter may be configured to increase a voltage at the input of the DC/AC module inside the housing of the inverter. As an example, the voltage inside the housing may be greater than a threshold of voltage that is permitted outside of the housing of the inverter.

In some examples, the system may be configured to control a voltage at a midpoint terminal of an inverter. The system may be configured to control the voltage according to a neutral output terminal of the inverter. The system may be configured to control the voltage according to a positive or negative input terminal of the inverter.

In some examples, the system may be configured to maintain a positive voltage with respect to a ground potential or a negative voltage with respect to a ground potential at each output terminal of a power source that is connected to an input of an inverter.

In some examples, the system may be configured to switch between different modes of configuration, for example: an above ground potential voltage-boost configuration mode, a below ground potential voltage-boost configuration mode, a non-voltage-boost configuration mode, etc.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 14B illustrates a circuit in accordance with various aspects;

FIG. 14C illustrates example systems in accordance with various aspects;

FIG. 21 illustrates an example switching circuit illustrating an example ZVS and ZCS process.

DETAILED DESCRIPTION

Figure 1A:
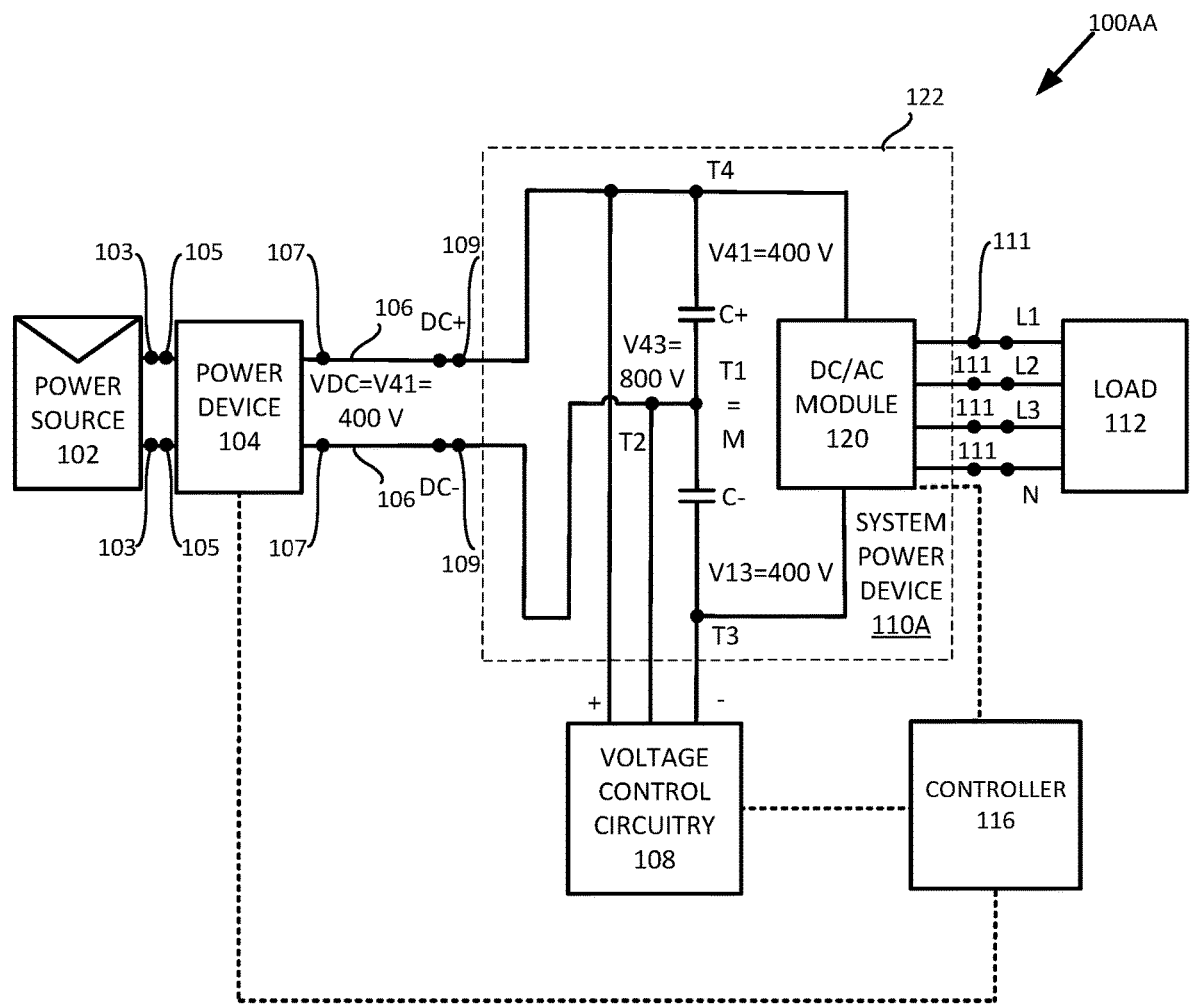
FIG. 1A shows a power system with an above ground potential configuration.

Systems, apparatuses, and methods are described herein for electrical power conversion. In some examples, the electrical power conversion is performed by a power system with an inverter configured to convert a direct current (DC) input power to an alternating current (AC) output power. The inverter may include a plurality of capacitors connected in series at the input of a DC/AC module. The system may include a housing configured to house the inverter. The housing is also referred to herein as "housing of the inverter", and may be considered part of the inverter. The housing may house converter circuitry of the inverter. The converter circuitry may be configured to convert power. The converter circuitry may include the DC/AC module. Voltage control circuitry may be configured to increase a voltage at the input of the DC/AC module inside the housing of the inverter. As an example, the voltage inside the housing may be greater than a threshold of voltage that is permitted outside of the housing of the inverter. The voltage control circuitry may include a converter.

In some examples, the system may be configured to control a voltage at a midpoint terminal between a plurality of capacitors of an inverter. The plurality of capacitors may be a plurality of series-connected capacitors that are serially connected to one another. The system may be configured to control the voltage according to a neutral output terminal of the inverter.

In some examples, the power system may be configured to maintain either a positive voltage (e.g., with respect to a ground potential) or a negative voltage (e.g., with respect to a ground potential) at each output terminal of a power source that is connected to an input of an inverter. For example, in some cases each output terminal of the power source may be maintained at a positive voltage potential with respect to ground. As another example, each output terminal of the power source may be maintained at a negative voltage potential with respect to ground.

In some examples, the power system may be configured to switch between different modes of configuration, for example: an above ground potential voltage-boost configuration mode, a below ground potential voltage-boost configuration mode, a non-voltage-boost configuration mode, etc. In the above ground potential voltage-boost configuration mode, the system may be configured to increase a voltage across, and maintain a positive voltage potential at, the power source output terminals with respect to a ground reference. In the below ground potential voltage-boost configuration mode, the system may be configured to increase a voltage across, and maintain a negative voltage potential at, the power source output terminals. In the non-voltage-boost configuration mode, the system may be configured to disconnect at least some of the voltage control circuitry, and thus, would not increase a voltage inside the housing of the inverter.

The term "ground" and "ground potential" used herein may refer to a reference voltage. For example, ground potential may be an actual earth potential (e.g., electrically connected to earth) or a virtual earth potential.

The accompanying drawings, which form a part hereof, show examples of the disclosure. It is to be understood that the examples shown in the drawings and/or discussed herein are non-exclusive and that there are other examples of how the disclosure may be practiced.

It is noted that the presently disclosed subject matter is not bound by the systems and apparatuses described with reference to the figures. Equivalent and/or modified functionality may be consolidated or divided in another manner and may be implemented in any appropriate combination. For example, power source 102 and power device 104, which are shown as separate units (shown, for example, in FIG. 1A), may have their functionalities and/or components combined into a single unit. As another example, power device 104 and system power device 110A, which are shown as separate units (shown, for example, in FIG. 1A), may have their functionalities and/or components combined into a single unit. As another example, one or more switches S shown internal to housing 122 may be arranged external to housing 122. For example switch SA shown internal to housing 122 in FIG. 5A and FIG. 5B may be arranged external to housing 122.

It is also noted that the presently disclosed subject matter is not bound by the flow charts shown in the figures, and the shown operations may occur out of the shown order. For example, operations that are shown in succession may be executed substantially concurrently or in reverse order. It is also noted that while the flow charts are described with reference to elements shown herein, this is by no means binding, and the operations may be performed by elements other than those described herein.

It is also noted that like references, or similar references, in the various figures refer to like elements throughout the application. For example, it is to be understood that voltage control circuitry 108 shown in FIG. 1A may be similar or the same as other voltage control circuitry described and shown herein, and vice versa. Throughout the application, certain general references may be used to refer to any of the specific related elements. For example, power system 100 may refer to any of the various power systems (e.g., 100AA, 100AB, 100B), power device 104 may refer to any of the various power devices, system power device 110 may refer to any of the various system power devices (e.g., 110A, 110B, 110C, 110D, 110E, 110F, 110G, 110H, 110I, 110J, 110K, 110L), etc.

It is also noted that all numerical values given in the examples of the description are provided for purposes of example only and are by no means binding.

The terms, "substantially", "about", and, "threshold", used herein include variations that are equivalent for an intended purpose or function (e.g., within a permissible variation range). Certain values or ranges of values are presented herein with numerical values being preceded by the terms "substantially", "about", and, "threshold". The terms "substantially", "about", and "threshold", are used herein to provide literal support for the exact number that it precedes, as well as a number that is near to or approximately the number that the term precedes. In determining whether a number is near to or approximately a specifically recited number, the near or approximating un-recited number may be a number, which, in the context in which it is presented, provides a substantial equivalent of the specifically recited number.

The term "controller" used herein may include a computer and/or other appropriate processing circuitry and memory. The terms "computer" and "processor" and variations thereof should be expansively construed to cover any kind of hardware-based electronic device with data processing capabilities including, by way of non-limiting example, one or more digital processing devices (e.g., digital signal processor (DSP), microcontroller, field programmable circuit, application-specific integrated circuit (ASIC), etc.), one or more devices which comprise or are operatively connected to one or more digital processing devices, and/or an analog circuit implementing control logic. The "computer" or "processor" may include memory and/or hardware registers that are operatively connected to the one or more digital processing devices. The memory and/or hardware registers may store configuration information and/or computer executable instructions that when read and interpreted by the one or more digital processing devices, cause the system or apparatus, including the one or more digital processing devices, to perform the steps and operations described herein. The terms "memory" and "data storage device" used herein should be expansively construed to cover any volatile or non-volatile computer memory suitable to the presently disclosed subject matter. The above may include, by way of non-limiting example, the one or more controllers 116 disclosed in the present application.

FIG. 1A to FIG. 10C show examples of various power systems 100 with voltage control circuitry 108 according to examples of the present subject matter.

Reference is now made to FIG. 1A, which shows a power system 100AA according to examples of the present subject matter. Power system 100AA may include one or more power sources 102. The one or more power sources 102 are also referred to herein as "power sources 102", and a respective power source of the one or more power sources 102 is also referred to herein as "power source 102".

As an example, power system 100AA may be a photovoltaic (PV) power system, and the power sources 102 may be PV generators. For example, each power source 102 may be one or more photovoltaic cells, one or more strings of serially connected photovoltaic cells, a photovoltaic panel, or one or more photovoltaic panels. As an example, a power source 102 may include series-connected or parallel-connected strings of serially connected photovoltaic cells. Also as an example, a power source 102 may include photovoltaic panels that are series-connected and/or parallel-connected to one another. Although power sources 102 are described herein in the context of PV generators, the term "power source" may include other types of appropriate power sources, for example: wind turbines, hydro-turbines, fuel cells, batteries, etc. As an example, where power source 102 may be a storage device, such as a battery, the power system 100 may be arranged so that elements of the power system provide an electrical current to the power source 102 in order to charge power source 102.

Although only a single power source 102 is shown in FIG. 1A for the sake of simplicity, the one or more power sources may include a plurality of power sources 102 connected to each other in series and/or parallel connections. For example, the one or more power sources 102 may include a plurality of strings (also referred to as serial strings or series strings) of power sources 102, where each string of power sources 102 includes a plurality of power sources 102 connected to each other in series. Each of the strings of power sources 102 may be connected to the other strings of power sources 102 in parallel.

Figure 1B:
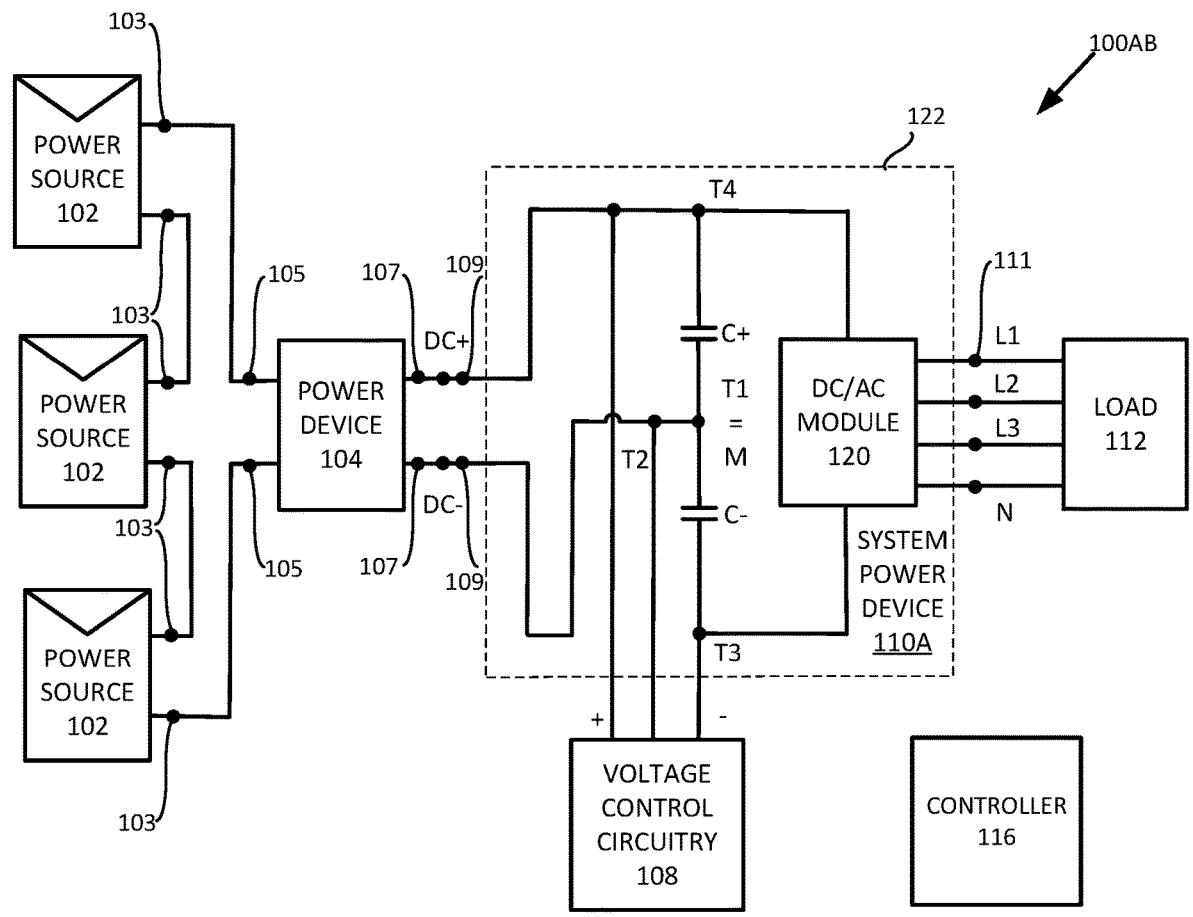
FIG. 1B shows a power system with a plurality of power sources.

Referring to FIG. 1B, a power system 100AB is shown with a plurality of power sources 102 connected to each other in series. The plurality of power sources 102 may also be referred to as a series string of power sources 102. The series string of power sources 102 is connected to power device 104. In some examples a plurality of series strings of power sources 102 may be connected in parallel to each other, and the parallel connection connected to power device 104.

Figure 1C:
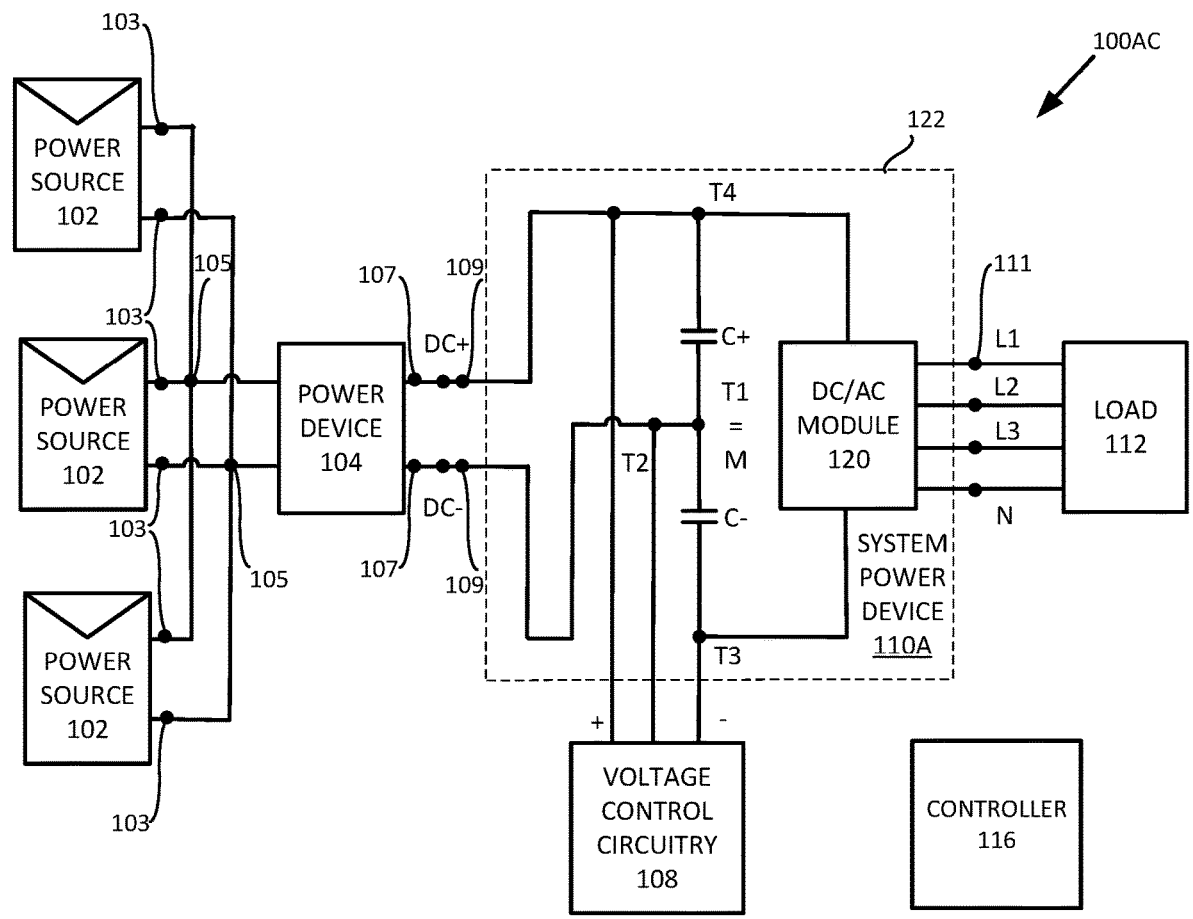
FIG. 1C shows a power system with a plurality of power sources.

Referring to FIG. 1C, a power system 100AC is shown with a plurality of power sources 102 connected to each other in parallel. The plurality of power sources 102 is connected to power device 104.

Referring back to FIG. 1A, each power source 102 may include a plurality of output terminals 103 configured to connect the power source 102 to one or more power devices 104 or one or more system power devices 110A. In the example of FIG. 1A power source 102 is connected to power device 104. Power device 104 is connected to system power device 110A. System power device 110A is connected to load 112. In FIG. 1A, output terminals 103 of the power source 102 are connected to input terminals 105 of power device 104. Output terminals 107 of power device 104 are connected to terminals DC+, DC− of bus 106. Input terminals 109 of system power device 110A are also connected to terminals DC+, DC− of bus 106. In this way output terminals 107 of power device 104 are connected to input terminals 109 of system power device 110A. Output terminals 111 of system power device 110A are connected to load 112. In the example of FIG. 1A system power device has four output terminals 111 connected to load 112. One respective output terminal 111 for each of three different output phase terminals L1, L2, L3 and an output terminal 111 for a neutral output terminal N. For simplicity the references to some of the output terminals 111 are omitted from other figures. Bus 106 may be a conductor that helps connect elements of the power system 100. Bus 106 may help distribute voltage between elements of the power system 100. Bus 106 may correspond to one or more physical busbars or other conducting elements. Bus 106 may include a plurality of terminals for connecting a plurality of elements of the power system 100.

The one or more power sources 102 may be connected to one or more respective power devices 104 in series, parallel, or some other combination with respect to each other. The one or more power devices 104 are also referred to herein as "power devices 104", and a respective power device of the one or more power devices 104 is also referred to herein as "power device 104". As mentioned above, each power device 104 may include a plurality of input terminals 105 configured to connect one or more power sources 102 to the power device 104. As an example, where power source 102 may be a storage device that is able to store an electrical charge, the power device 104 may be a bi-directional power device 104 arranged so that the power source 102 may be provided an electrical current in order to charge power source 102. Meaning, in some examples the current may flow through the power device 104 in a direction from the power source 102 or in a direction to the power source 102.

The power devices 104 may include, for example, one or more DC to DC converters (e.g., buck converter, boost converter, buck/boost converter, buck+boost converter, or combination thereof), DC to AC inverters, micro-inverters, AC to DC rectifiers, etc. As mentioned above, in some examples one or more power devices 104 may be internal to the system power device 110 (e.g., inside a housing 122 of the system power device 110).

In some examples, each power device 104 may include a plurality of converters, power stages, or sub-converters. The plurality of converters may be located inside a single shared housing or enclosure of the power device 104 (i.e., inside the same housing or enclosure as each other). In some examples, the plurality of converters may be located on the same printed circuit board (PCB) (e.g., which may be located inside the single shared housing or enclosure of the power device 104).

The one or more power sources 102 or one or more power devices 104 may be connected to one or more system power devices 110A. The housing 122 of the one or more system power devices is shown using broken lines in FIG. 1A. The one or more system power devices 110A may include the elements enclosed inside the housing 122. The one or more system power devices 110A are also referred to herein as "system power devices 110A", and a respective system power device of the one or more system power devices 110A is also referred to herein as "system power device 110A". System power devices 110 of other power systems 100 may be referred to in a similar fashion (e.g., system power devices 110B, system power device 110B, etc.) Outputs of the power devices 104 may be connected to one another in series, parallel, or a combination of serial and parallel connections. For example, the power devices 104 may be connected to one another at their outputs, with at least one output terminal of a first power device being connected to at least one other output terminal of a second power device. The power devices 104 may be connected in a series connection forming a series string of power devices 104. The series string of power devices 104 may be connected to the one or more system power devices 110A via a bus 106 (e.g., a DC bus). DC bus 106 may have a high side connected to a first input terminal of system power device 110A, and a low side connected to a second input terminal of system power device 110A. While one system power device 110A is shown in FIG. 1A, multiple system power devices 110 may be connected to bus 106 in the same manner. In the example of FIG. 1A, power device 104 is connected to the high side of DC bus 106 and a first input of system power device 110A at terminal DC+. Power device 104 is connected to the low side of DC bus 106 and a second input of system power device 110A at terminal DC−.

Figure 1D:
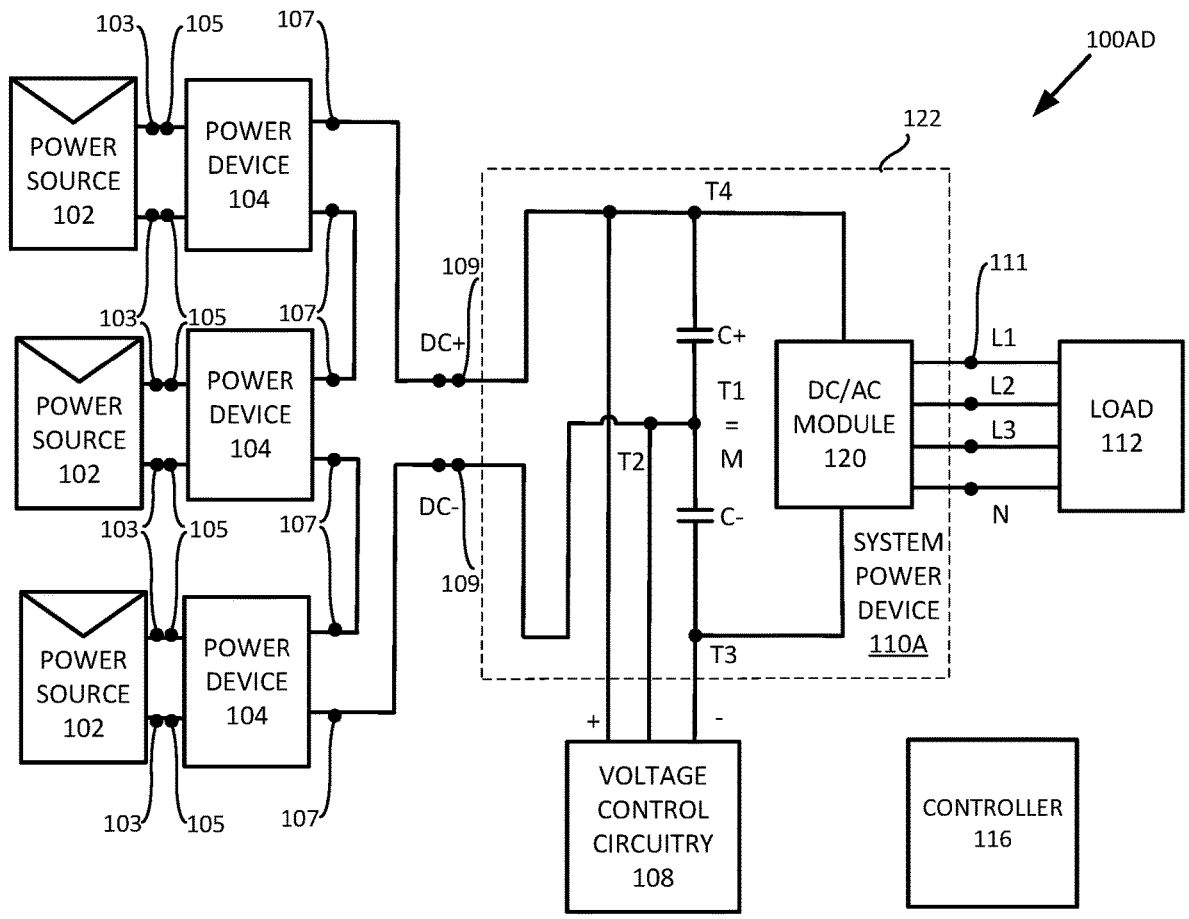
FIG. 1D shows a power system with a plurality of power devices.

Referring to FIG. 1D, a power system 100AD is shown with a plurality of power devices 104 connected at their outputs to each other in series, which may also be referred to as a series string of power devices 104. The series string of power devices 104 may be connected to system power device 110A. In some examples, a plurality of series strings of power devices 104 may be connected in parallel to one or more system power devices 110A (e.g., via a bus 106). For the sake of simplicity, each power device 104 is shown in FIG. 1D as being connected to a single power source 102, but, in some examples, one or more power devices 104 of the plurality of power devices 104 may each be connected to a plurality of power sources 102 as described above.

Figure 1E:
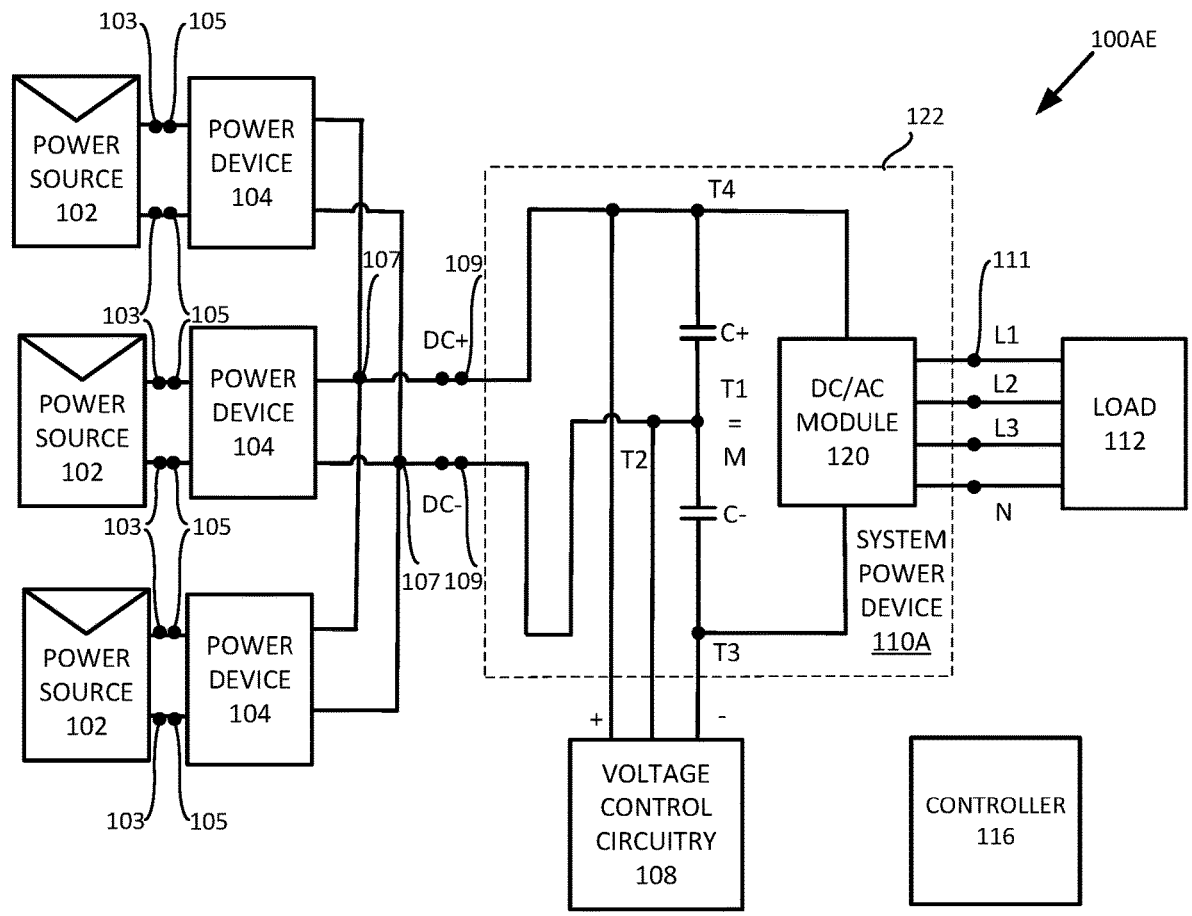
FIG. 1E shows a power system with a plurality of power devices.

Referring to FIG. 1E, a power system 100AE is shown with a plurality of power devices 104 connected at their outputs to each other in parallel. The plurality of power devices 104 may be connected to system power device 110A, for example, via a bus 106. For the sake of simplicity, each power device 104 is shown in FIG. 1E as being connected to a single power source 102, but, in some examples, one or more power devices 104 of the plurality of power devices 104 may be connected to a plurality of power sources 102 as described above.

In a case where power devices 104 are not included in the power system, then the power sources 102 may be connected directly to one or more system power devices 110, via DC bus 106, in a manner similar to the ones described above with respect to connecting the power devices 104 to the one or more system power devices 110A.

Referring back to FIG. 1A, the system power devices 110 may include, for example, one or more DC to DC converters (e.g., buck converter, boost converter, buck/boost converter, and/or buck+boost converter, combinations thereof, etc.), DC to AC inverters, combiner and/or monitoring boxes, etc. Each system power device 110 may include a DC/AC module 120. The DC/AC module 120 may include circuitry configured to convert a DC input to an AC output. For example, the system power device 110 may include an inverter for one or more phases (e.g., one phase inverter, two phase inverter, three phase inverter, etc.). As mentioned above, in the example shown in FIG. 1A, system power device 110A has four output terminals 111 with four output lines, including a first AC phase output terminal L1, a second AC phase output terminal L2, a third AC phase output terminal L3, and a neutral output terminal N.

As an example, where power source 102 may be an energy storage device, the system power device 110 may be a bi-directional system power device 110 that is arranged so the power source 102 may be provided an electrical current in order to charge power source 102. For example, DC/AC module 120 may also be configured to convert an AC input to a DC output. As such, in some examples the current may flow through the system power device 110 in a direction from the power source 102 or in a direction to the power source 102.

Each system power device 110 may include a plurality of capacitors, including C+ and C−, which may be connected across the input of the DC/AC module 120. For example, one capacitor C+ may be connected to input terminal T4 of DC/AC module 120, and another capacitor C− may be connected to input terminal T3 of DC/AC module. Capacitor C+ and capacitor C− may be connected to each other at a terminal T1. Terminal T1 may also be referred to herein as midpoint terminal M or midpoint terminal T1. The term "midpoint terminal" used herein refers to a terminal located between a plurality of capacitors that are connected to each other in series. For the sake of simplicity, only two capacitors, C+ and C−, are shown in FIG. 1A, but system power device 110 may have more than two capacitors, for example, by having multiple capacitors connected in series between terminal T4 and terminal T1, and/or multiple capacitors connected in series between terminal T1 and terminal T3 (as shown, for example, in FIG. 3). In some examples, the plurality of capacitors may include a plurality of parallel-connected capacitors (not shown).

Figure 12:
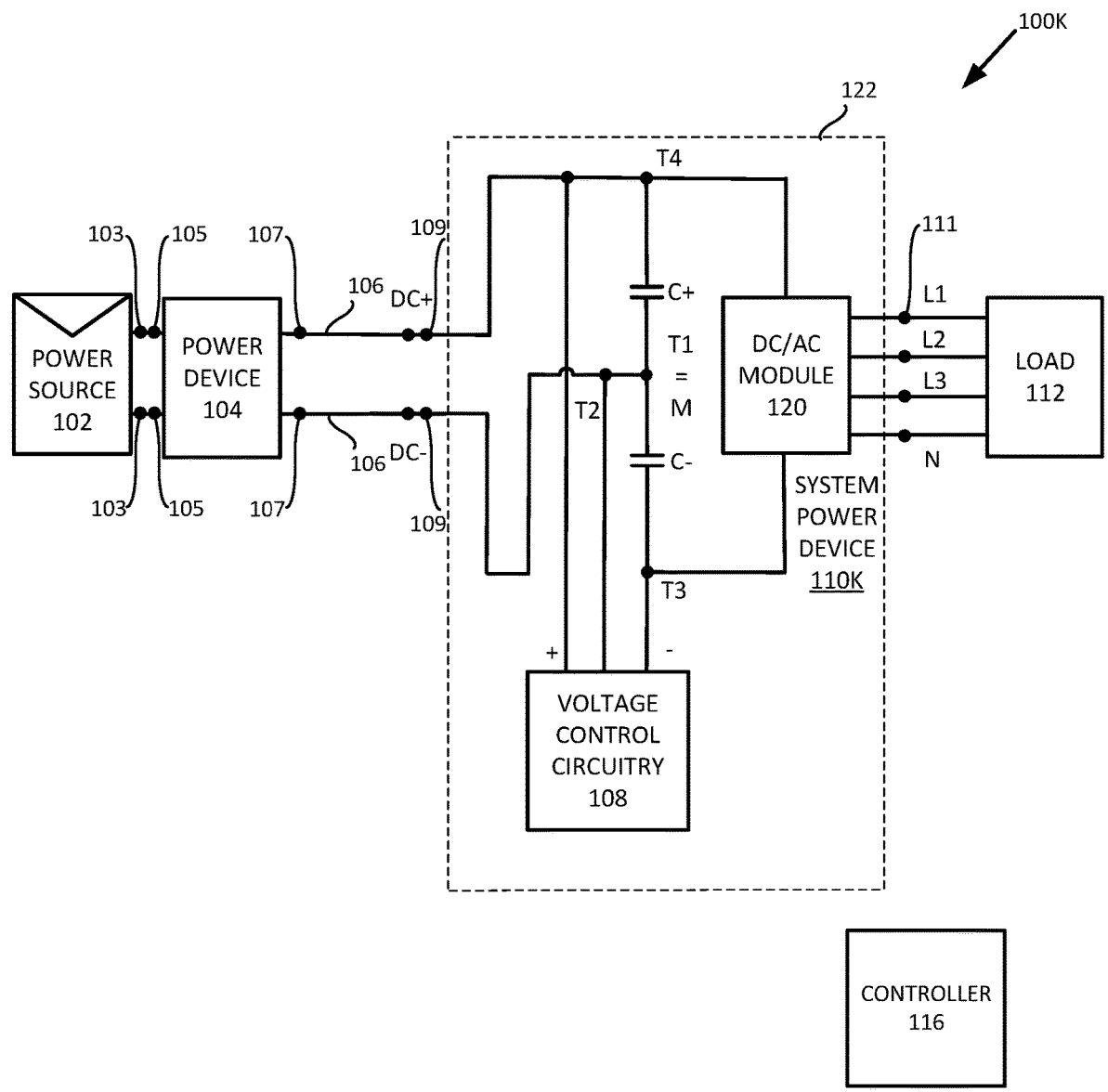
FIG. 12 shows a power system with the voltage control circuitry internal to the system power device housing.

Housing 122 may be configured to contain the system power device 110. For example, housing 122 may be an enclosure configured to hold the plurality of capacitors (e.g., C+ and C−) and the DC/AC module 120 of the system power device 110. In other variations, housing 122 may be configured to hold other components of power system 100, such as voltage control circuitry 108, and/or power device 104. As an example, FIG. 12 shows a power system 100K where the system power device 110K and the voltage control circuitry 108 may be both located internal to housing 122. Such an arrangement may be possible in other power systems 100 shown and described herein without all of the options being shown for the sake of brevity.

Housing 122 may be a physical structure configured to physically surround and encompass at least some of the elements of system power device 110. As mentioned above, housing 122 may also surround at least some other elements of the system 100. As an example, housing 122 may be configured to house the DC/AC module 120, the plurality of capacitors C, one or more switches, etc.

Voltage control circuitry 108 may be configured to control a voltage. For example, voltage control circuitry 108 may be configured to adjust the voltage across the input terminals T3 and T4 of DC/AC module 120. Voltage control circuitry 108 may be configured to substantially double the voltage across the input to DC/AC module 120. For example, if the voltage across the input terminals T3, T4 of DC/AC module 120 is about 400 volts without voltage control circuitry 108 operating, then voltage control circuitry 108 may be configured to double that voltage to about 800 volts across the input terminals T3 and T4 of DC/AC module 120. Voltage control circuitry 108 may be configured to increase voltage according to a certain efficiency. Voltage control circuitry 108 may also be configured to control the voltage at the midpoint M of system power device 110. For example, voltage control circuitry 108 may be configured to control the voltage at the midpoint M according to a voltage of the neutral output terminal N.

Voltage control circuitry 108 may include a plurality of terminals connected to system power device 110. In the example shown in FIG. 1A, voltage control circuitry 108 includes a plurality of terminals connected across the input of the DC/AC module 120 including a first terminal connected to terminal T4 and a second terminal connected to terminal T3. Voltage control circuitry 108 also includes a third terminal connected to terminal T2 of the system power device 110A. Terminal T2 may be connected to, and be at, substantially the same potential as terminal T1, which is the midpoint terminal M between the plurality of capacitors C+ and C−. In some examples, terminal T1 and terminal T2 may be the same terminal.

Figure 13:
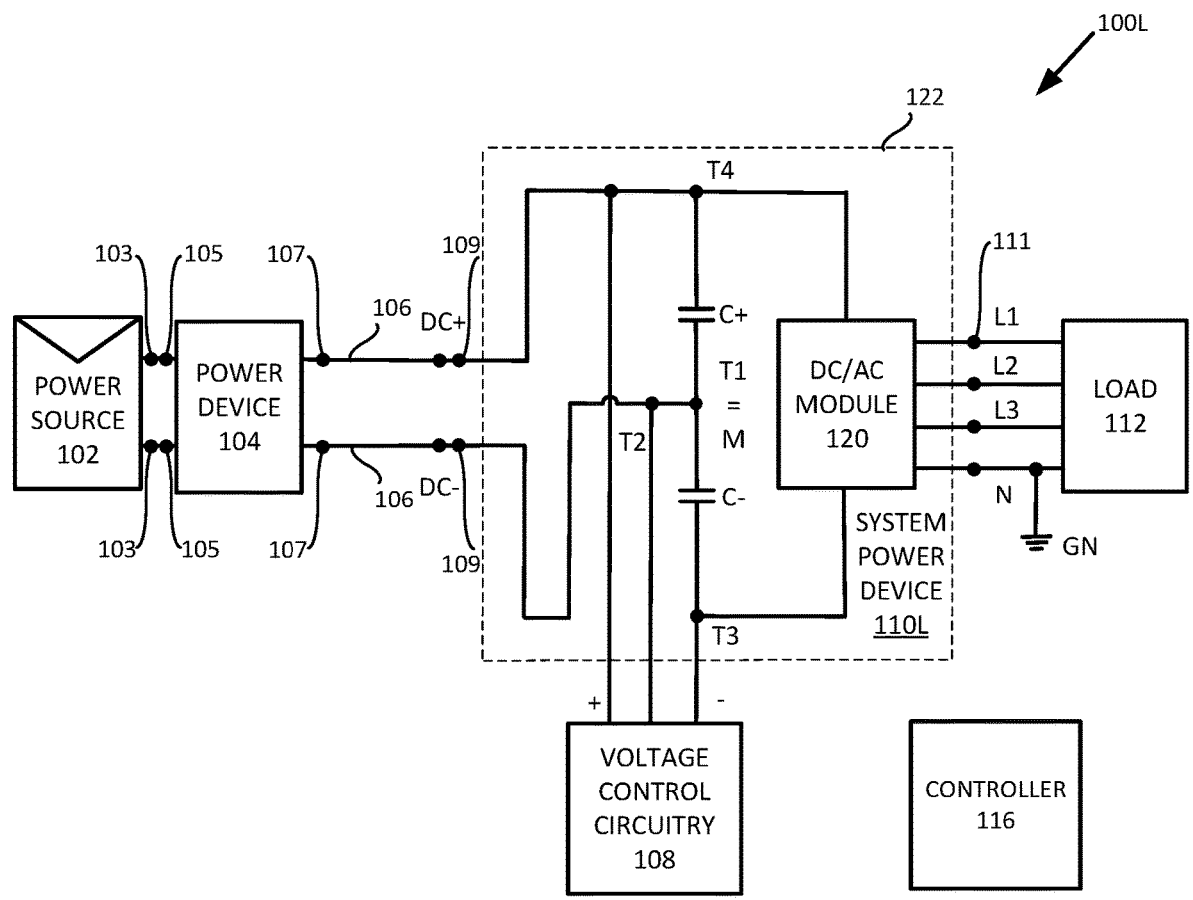
FIG. 13 shows a ground connection in a power system.

In some examples, voltage control circuitry 108 may be configured to maintain a positive voltage or a negative voltage with respect to a ground potential (for example, the neutral point N) at each output terminal of a power source 102 that is connected to system power device 110. For example, the voltage at both terminals 103 may be a positive voltage with respect to the ground potential, or the voltage at both terminals 103 may be a negative voltage with respect to the ground potential. In some examples, the ground potential may be an actual earth potential (e.g., electrically connected to earth) or a virtual earth potential. FIG. 13 shows a power system 100L where the neutral point N that is connected to system power device 110L is connected to an actual earth potential represented by ground GN. Such an arrangement may be possible in other power systems 100 shown and described herein without all of the options being shown for the sake of brevity.

Figure 2:
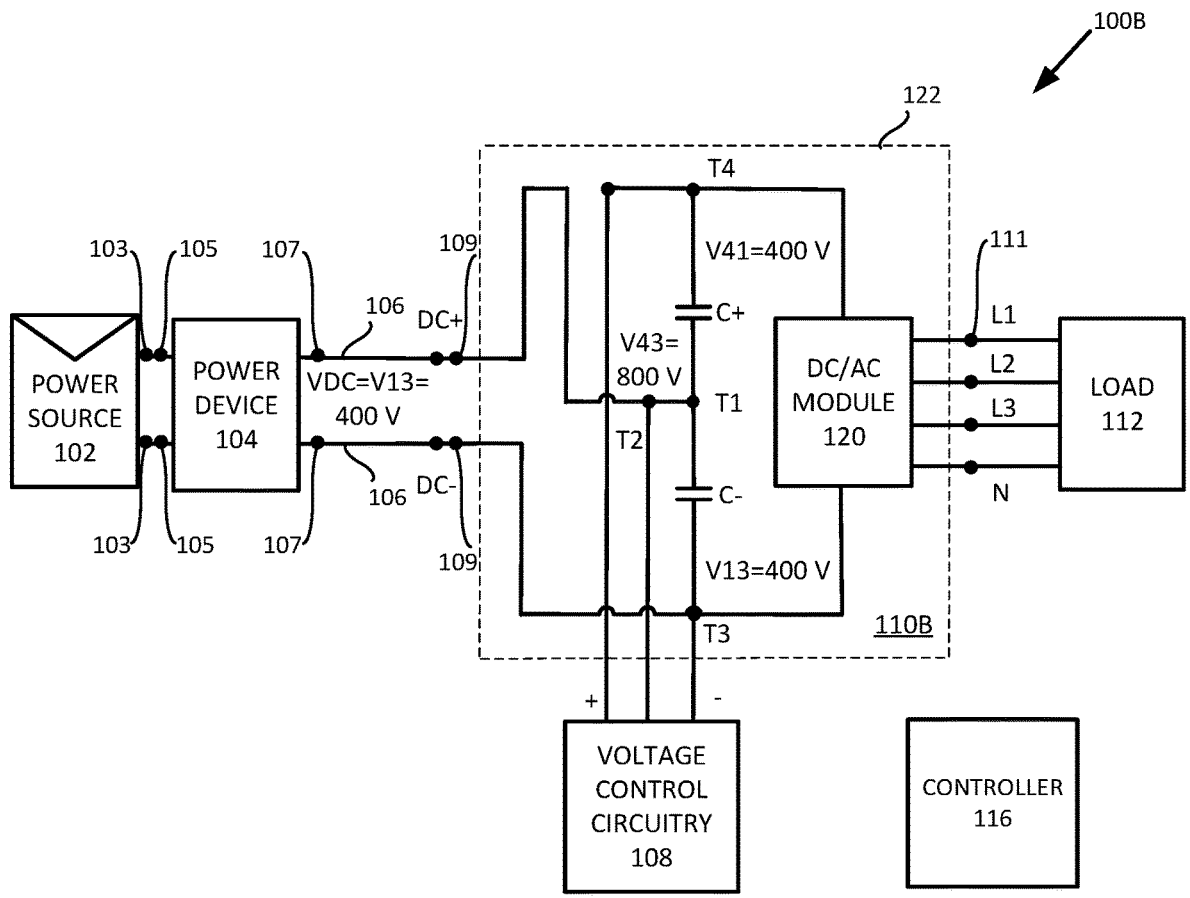
FIG. 2 shows a power system with a below ground potential configuration.

In the examples shown in FIGS. 1A-1E, power system 100 (e.g., 100AA, 100AB, 100AC, 100AD, 100AE) may be in an above ground potential configuration, where voltage control circuitry 108 is configured to maintain a positive voltage with respect to a ground potential at each output terminal of power source 102, and/or each terminal of bus 106. As shown in FIG. 1A, in the above ground potential configuration, system power device 110A may be connected to power source 102 and/or power device 104 via terminal DC+ and terminal DC− of bus 106. Terminal T4 may be connected to terminal DC+, and terminal T2 (and/or terminal T1) may be connected to terminal DC−. In the example shown in FIG. 2, power system 100B may be in a below ground potential configuration, where voltage control circuitry 108 is configured to maintain a negative voltage with respect to a ground potential at each output terminal of power source 102. As shown in FIG. 2, in the below ground potential configuration, system power device 110B may be connected to power source 102 and/or power device 104 via terminal DC+ and terminal DC− of bus 106. Terminal T2 may be connected to terminal DC+, and terminal T3 may be connected to terminal DC−.

With reference to FIG. 1A, the high side of DC bus 106 may be connected to terminal T4 via terminal DC+, and the low side of DC bus 106 may be connected to the midpoint terminal M via terminal DC−. This configuration may enable voltage control circuitry 108 to maintain the voltage at terminal DC+ and the voltage at terminal DC− as zero and/or positive voltages with respect to a ground potential (for example, the neutral point N).

Voltage control circuitry 108 may include circuitry described in U.S. Patent Application No. 62/955,627, incorporated herein by reference, and attached hereto as appendix A. For example, voltage control circuitry 108 may include a voltage doubler circuit that is configured to convert an input voltage to an output voltage that is about double the value of the input voltage.

The voltage control circuitry 108 may include, for example, one or more DC to DC converters (e.g., buck converter, boost converter, buck/boost converter, buck+ boost converter, combinations thereof), DC to AC inverters, micro-inverters, AC to DC rectifiers, etc.

As an example, a design parameter (e.g., as specified in safety regulations or required by component wire insulation capability) may specify that the voltage external to housing 122 of system power device 110 does not exceed a voltage threshold (e.g., a voltage threshold of about 600 volts across terminal DC+ and terminal DC− of bus 106). However, it may be advantageous for the voltage, that is input internal to system power device 110, to be a relatively larger voltage (e.g., about 800 volts across terminal T4 and terminal T3 at the input to DC/AC module 120). Providing a relatively larger voltage internal to the system power device 100 may help the system power device 100 operate with greater efficiency. The voltage control circuitry 108 may be configured to control the voltage that is input to the DC/AC module 120 so that the voltage across the input to the DC/AC module 120 is a relatively larger voltage (e.g., about 800 volts) than what is provided at the input to system power device 110 (e.g., via bus 106). In this way, the power system 100AA may be configured so that there is a relatively high input voltage to the DC/AC module 120, of system power device 110, since the relatively high voltage is internal to the housing 122 of the system power device 110. In this way, the voltage that is external to the housing 122 does not exceed a voltage threshold (e.g. a voltage at one or more external input of system power device 110).

For example, the voltage control circuitry 108 may be configured to control the voltage between terminal T4 and terminal T3, that is internal to the housing 122 of system power device 110, to be about 800 volts (e.g., voltage V43=about 800 volts). Voltage control circuitry 108 may also be configured to control the voltage on the DC bus 106 between terminal DC+ and terminal DC− to be about equal to the voltage between terminal T4 and terminal T1 (e.g., voltage VDC=voltage V41=about 400 volts), which, for example, may be about half of the voltage across terminal T4 and terminal T3. In this example, the voltage between terminal T1 and terminal T3 may also be about half of the voltage across terminal T4 and terminal T3 (e.g., voltage V13=about 400 volts). The voltage control circuitry 108 may also be configured to control the voltage at the midpoint terminal T1 relative (e.g., equal) to the neutral output line N of the system power device 110.

As an example, voltage control circuitry 108 may be configured to help one or more power sources 102 and/or power device 104 reach about a certain voltage. For example, voltage control circuitry 108 may be configured to help a series strings of power sources 102 (for example, as shown in FIG. 1B), a series string of power devices 104 (for example, as shown in FIG. 1D), or a series string with a mix of power sources 102 and power devices 104, to reach about a certain voltage. The certain voltage may be a threshold voltage. For example, the certain voltage may be a DC threshold voltage needed to produce a certain AC voltage for a three-phase power system. For example, the three-phase power system may be a power system that has about 400 volts AC with each line of the three lines having about 230 volts AC. In some examples, in order to produce such an AC voltage, the DC voltage input to the DC/AC module 120 may be a relatively high DC voltage (e.g., about 600 volts DC or about 800 volts DC). If the series strings of power sources 102, series string of power devices 104, or mixed series string needs help to reach that certain voltage, then voltage control circuitry 108 may be configured to help boost the DC voltage produced by the series string. The voltage control circuitry 108 may therefore help relatively shorter series strings to reach a relatively higher voltage that without the voltage control circuitry 108 may be produced by a relatively longer series string. For example, if in a case where the system does not have voltage control circuitry 108 so that a relatively longer series string of about 10 to 15 powers sources 102 and/or power devices 104 may be used to reach the certain voltage, then by including voltage control circuitry 108 a relatively shorter series string of about 6 to 9 powers sources 102 and/or power devices 104 may be used to reach the certain voltage with the help of the voltage control circuitry 108. Relatively shorter series strings may advantageously require fewer power sources 102 and/or fewer power devices 104 than relatively longer series strings.

As mentioned above, voltage control circuitry 108 may also be configured to control the voltage in such a way that the voltage at each output terminal of the power source 102 is maintained as either positive or negative with respect to ground potential (e.g., at the neutral line N). For example, in the example shown in FIG. 1A, the power system 100AA may be configured to maintain a positive voltage with respect to ground potential at each output terminal of the power source 102. In the example shown in FIG. 2, the power system 100B may be configured to maintain a negative voltage with respect to ground potential at each output terminal of the power source 102.

If the voltage at one output terminal of a power source 102 is positive and the voltage at another output terminal of a power source 102 is negative, then there may be an issue of potential induced degradation (PID) in the power source 102 (e.g. PV panel). However, by maintaining each output terminal 103 of the power source 102 either above ground potential or below ground potential, then PID is mitigated.

Maintaining each of the output terminals 103 of the power source 102 either above ground potential or below ground potential in order to mitigate PID may depend on properties of one or more of the power sources 101. For example, one or more of the power sources 102 may be photovoltaic panels having properties where PID is reduced by maintaining the photovoltaic panels at a voltage above zero with respect to ground potential. Alternatively, one or more of the power sources 102 may be photovoltaic panels having properties where PID is reduced by maintaining the photovoltaic panels at a voltage below zero with respect to ground potential. As an example, the one or more power sources 102 may be one or more photovoltaic panels that operate more efficiently when the voltage is maintained above a ground potential (a positive voltage). Alternatively, the one or more power sources 102 may be one or more photovoltaic panels that operate more efficiently when the voltage is maintained below a ground potential (a negative voltage). For example, the photovoltaic panels may be p-type panels that have p-type cells which may be doped with boron that has one less electron than silicon which may make the cells positively charged. Alternatively, the photovoltaic panels may be n-type panels that have n-type cells which may be doped with phosphorus that has one more electron than silicon which may make the cells negatively charged. For example, the p-type panels with the positively-doped silicon cells p-type cells may be maintained at a positive voltage above ground potential (with a negative terminal connected to ground potential) to mitigate PID, and the n-type panels with negatively-doped silicon cells n-type cells may be maintained at a negative voltage below ground potential (with a positive terminal connected to ground potential) to mitigate PID. In some examples, a system may have both p-type panels and n-type panels, and the voltage of those panels may be maintained either above ground potential or below ground potential according to the types of the different panels. In some examples, a single panel may have both p-type cells and n-type cells, and the voltage of those cells may be maintained either above ground potential or below ground potential accordingly.

The system power devices 110 may be connected to one or more loads 112. The one or more loads 112 may include, for example, one or more of an electrical grid (e.g., AC electrical grid), storage device (e.g., battery systems), resistive device (e.g., resistors), inductive device (e.g., motors), etc.

Power system 100AA may include one or more controllers 116. A given controller 116 may be configured to transmit and receive one or more signals to or from one or more other controllers 116, and/or one or more other elements of power system 100AA. The one or more signals may include one or more instructions related to power conversion. The one or more controllers 116 may be configured to communicate using any appropriate communication methods and devices, including Power Line Communication (PLC), ZIGBEE™, Wi-Fi, etc. If power system 100AA includes a plurality of controllers 116, then one or more of those controllers 116 may be designated as a master controller. As an example, the functionality of the master controller may be included in one or more controllers 116 or may be included as part of power devices 104, voltage control circuitry 108, and/or system power devices 110, which may be in separate housings, or arranged in different combinations in one or more common housings (for example, in housing 122). For example, power devices 104 and/or voltage control circuitry 108 may have a plurality of controllers 116, and one or more of those controllers 116 may be designated as the master controller. For example, each power device 104 and/or voltage control circuitry 108 may have its own controller 116 with or without an external central controller, and one or more of those internal controllers may be designated as the master controller. In some cases, one or more controllers 116 included in the system power devices 110 may be designated as the master controller. For simplicity, FIG. 1A shows controller 116 as a central controller external to power devices 104, voltage control circuitry 108, and system power devices 110.

The one or more controllers 116 may include processing circuits and memory storing computer executable instructions for controlling the processing circuits and storing data. The one or more controllers 116 may be configured to access data and make determinations. This data may include one or more parameters and/or parameter data related to power system 100AA.

One or more sensors (not shown) may be configured to obtain one or more parameters and/or parameter data related to power system 100AA. These one or more parameters may include, for example, current, voltage, power, temperature, irradiance, etc.

As mentioned above, the one or more controllers 116 of power system 100AA may be configured to transmit and receive instructions as signals to or from one or more other elements of the power system 100AA. In some examples, power devices 104, system power devices 110, and/or one or more sensors, may be communicatively and/or operably connected to the one or more controllers 116. For example, the one or more sensors may provide data to the one or more controllers 116. As an example, connections between the controller 116 and other elements of power system 100AA are shown in FIG. 1A. In FIG. 1A the connections between the controller and the power device 104, voltage control circuitry 108, and system power device 110A (e.g., DC/AC module 120) are shown using dashed lines. For simplicity, the connections between the one or more controllers 116 and the other elements of other power systems 100 are not shown in other figures. However, the one or more controllers 116 of those power systems 100 may be connected to, for example, power devices 104, voltage control circuitry 108, system power devices 110, one or more sensors, one or more switches, etc.

Some examples of power systems shown herein might not include the controller 116 and power devices 104 for the sake of simplicity, but they may be included as shown in FIG. 1A.

FIG. 2 shows a power system 100B according to examples of the present subject matter. Power system 100B may be similar to other power systems 100 shown herein, except that, as mentioned above, power system 100B is configured in a below ground potential configuration. In the below ground potential configuration, the high side (with relatively higher voltage) of DC bus 106 may be connected to the midpoint terminal M via terminal DC+, and the low side (with relatively lower voltage) of DC bus 106 may be connected to terminal T3 via terminal DC−. This configuration may help voltage control circuitry 108 maintain the voltage at terminal DC+ and the voltage at terminal DC− as zero and/or negative voltages with respect to a ground potential. For example, if voltage control circuitry 108 controls the voltage across terminal T4 and terminal T3 to be about 800 volts and also controls the voltage at the midpoint terminal T1 relative (e.g., equal) to the neutral output terminal N, then the voltage on the DC bus 106 between terminal DC+ and terminal DC− may be about equal to the voltage between terminal T1 and terminal T3 (e.g., voltage VDC=voltage V13=about 400 volts), which may be about half of the voltage across terminal T4 and terminal T3 (e.g., voltage V43=about 800 volts), and may be a zero or negative voltage with regards to ground since that voltage is negative relative to the voltage of the neutral output N (which may be used to control the voltage at midpoint terminal T1). In this example, the voltage between terminal T4 and terminal T1 may also be about half of the voltage across terminal T4 and terminal T3 (e.g., voltage V41=about 400 volts), and may be a positive voltage with regards to ground since that voltage is positive relative to the voltage of the neutral output N. However, in this example the positive voltage V41 is not used to maintain the voltage at the output terminals 103 of power source 102 as positive voltages. Rather, the negative voltage V13 is used to maintain the voltage at the output terminals 103 of power source 102 as negative voltages.

Figure 3:
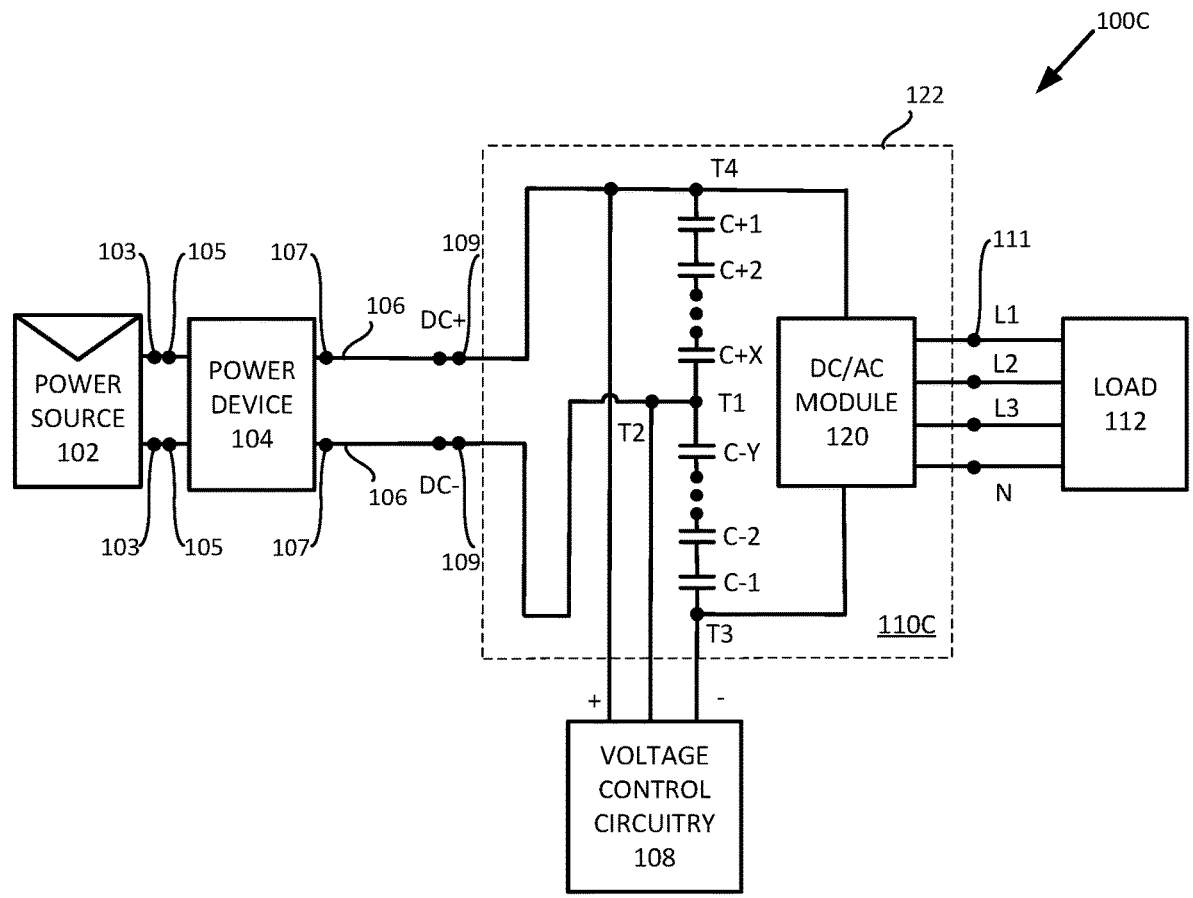
FIG. 3 shows a power system.

FIG. 3 shows a power system 100C similar to other power systems 100 shown herein, except that power system 100C includes a plurality of capacitors, X+Y, where X and Y may be any appropriate numbers, or may be the same or different number. As an example, there may be an even number of capacitors (e.g., where X is an even number) serially connected between terminal T4 and midpoint terminal T1. Similarly, there may be an even number of capacitors (e.g., where Y is an even number) serially connected between terminal T3 and midpoint terminal T1. Similar to power system 100AA, power system 100C is configured in an above ground potential configuration. The arrangement of system power device 110C may be similar to the arrangement of system power device 110A.

Figure 4:
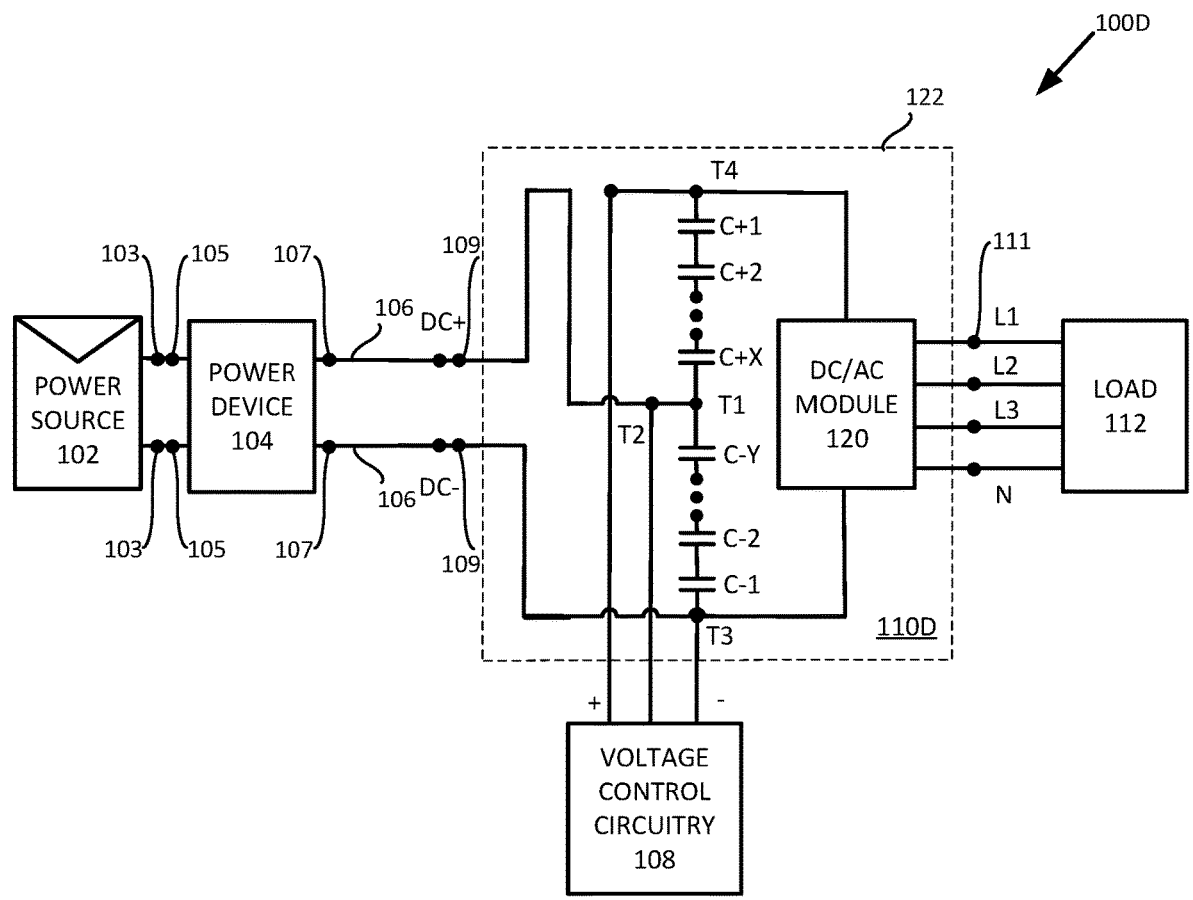
FIG. 4 shows a power system.

FIG. 4 shows a power system 100D similar to other power systems 100 shown herein, except that power system 100D is configured in an below ground potential configuration as in power system 100B and with a plurality of capacitors as arranged in power system 100C. The arrangement of system power device 110D may be similar to the arrangement of system power device 110B.

In some examples, the power system 100 may be configured to operate in a plurality of configuration modes. For example, the power system may be configured to switch between a voltage-boost configuration mode and a non-voltage-boost configuration mode. In the voltage-boost configuration mode, the voltage control circuitry 108 may be configured to increase a voltage inside a housing 122 of the system power device 110 (e.g., across the input of DC/AC module 120). In the non-voltage-boost configuration mode, the voltage control circuitry 108 might not increase a voltage inside the housing 122 of the system power device 110. In the voltage-boost configuration mode, the power system 100 may be configured to control the voltage at the midpoint terminal T1 relative to the voltage at the neutral output terminal N. In the non-voltage-boost configuration mode, the power system 100 may be configured to control the voltage at a different terminal that is not the midpoint terminal T1 (e.g., terminal T4 or terminal T3) relative to the voltage at the neutral output terminal N. The power system 100 may be configured to adjust the voltage at a terminal that is not the midpoint terminal T1 to also mitigate PID. For example, in the non-voltage-boost configuration mode, the power system 100 may be configured to adjust the voltage at terminal T3 or at terminal T4 so that it is a positive voltage or a negative voltage with regards to ground. Switches may be configured to switch the power system 100 between different configuration modes.

The term "switch" used herein refers to any appropriate reversible switching element that may be switched in a non-permanent fashion, or any appropriate irreversible switching element that may be switched in a permanent fashion. An example of a reversible switching element that may be switched in a non-permanent fashion may be any appropriate relay or switch, for example: a field effect transistor (FET), a metal oxide semiconductor field-effect transistor (MOSFET), a bipolar junction transistor (BJT), an insulated-gate bipolar transistor (IGBT), a Silicon Carbide (SiC) switch, a Gallium Nitride (GaN) switch, a diode, etc.

The switch may be single throw, double throw, etc. The term "switch" may also include one or more wires (e.g., jumper wires or jump wires) that may be switched (e.g., mechanically repositioned) between the different configurations of the power system 100. An example of an irreversible switching element that may be switched in a permanent fashion is a fuse or breaker that is configured to be burned or opened according to one or more certain electrical parameters (e.g., voltage and/or current above a certain threshold). The term "burn" or "blow" used herein may refer to a situation wherein the fuse may be configured to be limited or rated to one or more certain threshold electrical parameters (e.g., voltage, current, power, etc.). If one or more electrical parameters exceeding the threshold electrical parameters are applied to the fuse, then at least a portion of the fuse may be configured to respond accordingly to open the related electrical pathway (e.g., at least a portion of the fuse may melt, disconnect, become an open circuit element, etc.). The one or more switching elements may be configured to set a configuration mode either permanently or non-permanently.

Figure 5A:
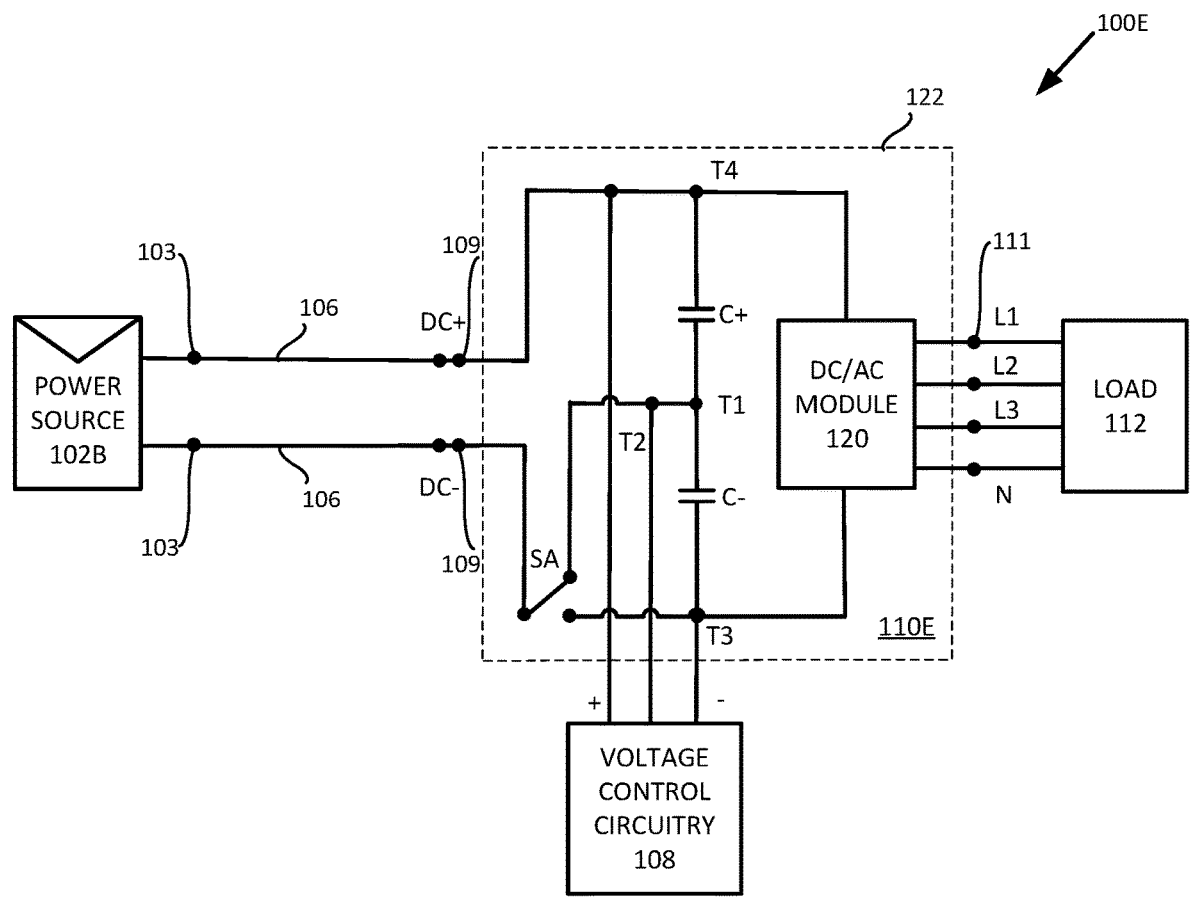
FIG. 5A shows a power system in a voltage-boost configuration mode.
Figure 5B:
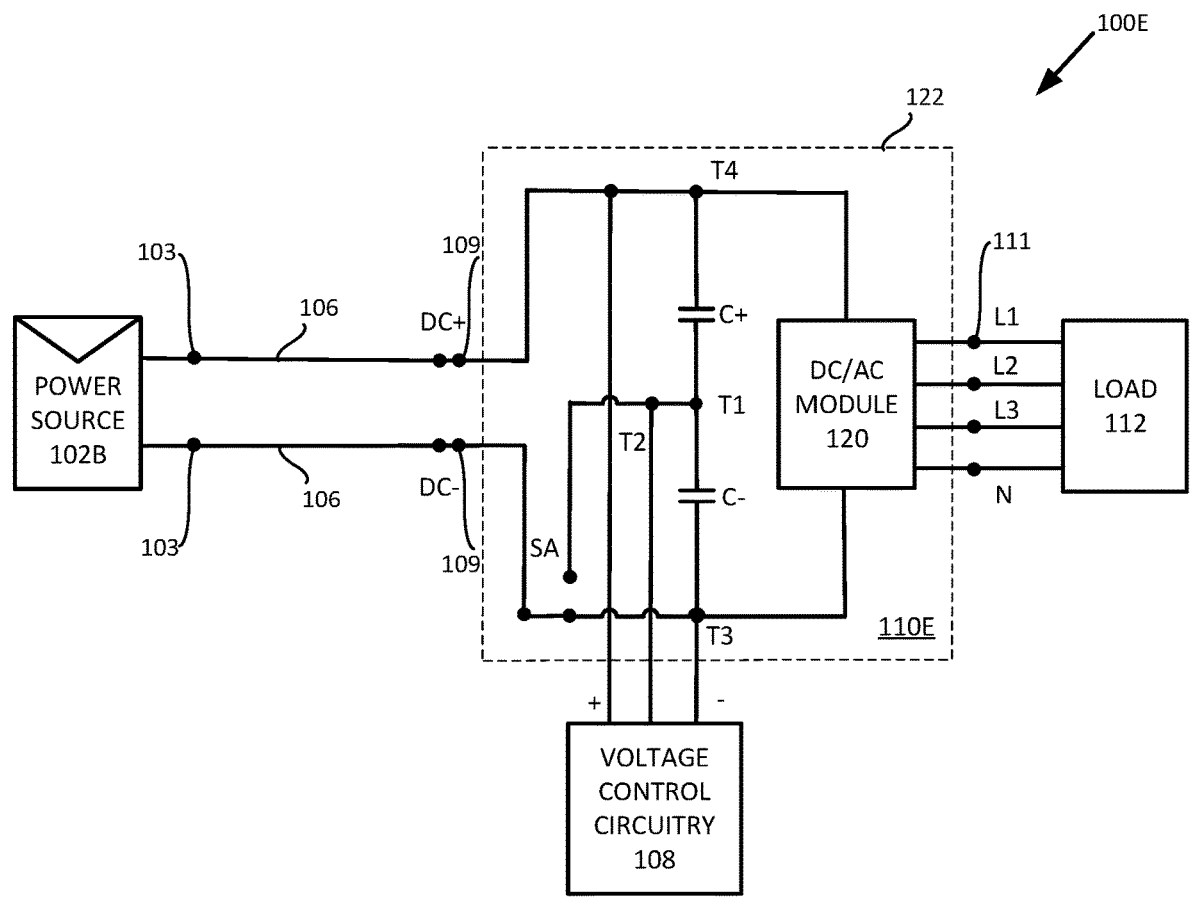
FIG. 5B shows the power system of FIG. 5A in a non-voltage-boost configuration mode.

FIG. 5A and FIG. 5B illustrate a power system 100E according to examples of the present subject matter. Power system 100E may be similar to other power systems 100 shown herein, except that power system 100E may be configured to switch between a plurality of configuration modes. Switch SA may be configured to alternatively connect terminal DC– to either terminal T2 or terminal T3. For simplicity FIG. 5A and FIG. 5B show only a single power source 102B. Power source 102B may be any appropriate arrangement of one or more power sources 102 and/or power devices 104 as described in detail above. For example, power source 102B may be a power source 102 without a power device 104 (e.g., power system 100E might not include a power device 104). As another example, power source 102B may include one or more integrated power devices 104 incorporated into the power source 102B. Other power systems 100 shown herein with power devices 104 may also be arranged without power devices 104, and vice versa. And other power systems 100 may also only show a power source 102B although one or more power devices 104 and/or additional power sources 102 may be integrated within the power source 102B.

FIG. 5A shows power system 100E in a voltage-boost configuration mode. In voltage-boost configuration mode, switch SA connects terminal DC– to terminal T2 such that voltage control circuitry 108 may increase the voltage internal to housing 122. For example, voltage control circuitry 108 may substantially double a voltage across DC/AC module 120 (e.g., the voltage across terminal T4 and terminal T3). In voltage-boost configuration mode, the voltages at the output terminals 103 of power source 102B may be maintained as equal or positive relative to a ground potential. Meaning, in this example the power system 100E is in an above ground potential configuration. The configuration mode shown in FIG. 5A may also be referred to as an above ground potential voltage-boost configuration mode. In voltage-boost configuration mode, voltage control circuitry 108 may also be configured to control the voltage at midpoint terminal T1 relative (e.g., equal) to the neutral output terminal N. The arrangement of system power device 110E when power system 100E is in voltage-boost configuration mode may be similar to the arrangement of system power device 110A.

FIG. 5B shows power system 100E in a non-voltage-boost configuration mode. In the non-voltage-boost configuration mode, switch SA connects terminal DC– to terminal T3 such that voltage control circuitry 108 might not increase the voltage internal to housing 122. For example, voltage control circuitry 108 may not double a voltage across DC/AC module 120. In non-voltage-boost configuration mode, power system 100E may also be configured to control the voltage at terminal T3 or the voltage at terminal T4 relative to the neutral output terminal N. For example, in non-voltage-boost configuration mode, the voltages at both output terminals 103 of power source 102B may or might not be maintained as positive relative to a ground potential or as negative relative to a ground potential.

As an example, if switch SA is a jumper wire then, then in the voltage-boost configuration mode, terminal DC– may be connected to terminal T2 via the jumper wire, and in the non-voltage-boost configuration mode, terminal DC– may be connected to terminal T3 via the jumper wire.

Figure 6A:
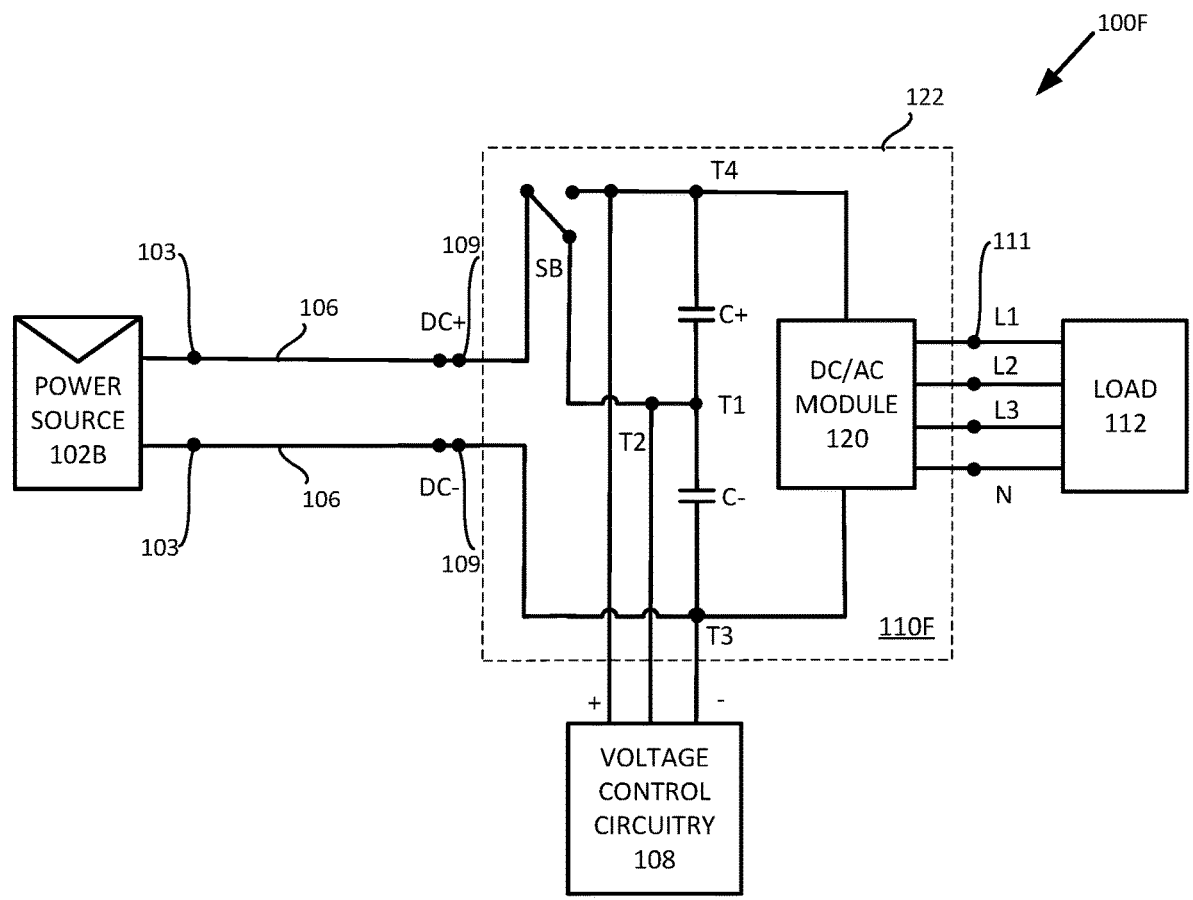
FIG. 6A shows a power system in a voltage-boost configuration mode.
Figure 6B:
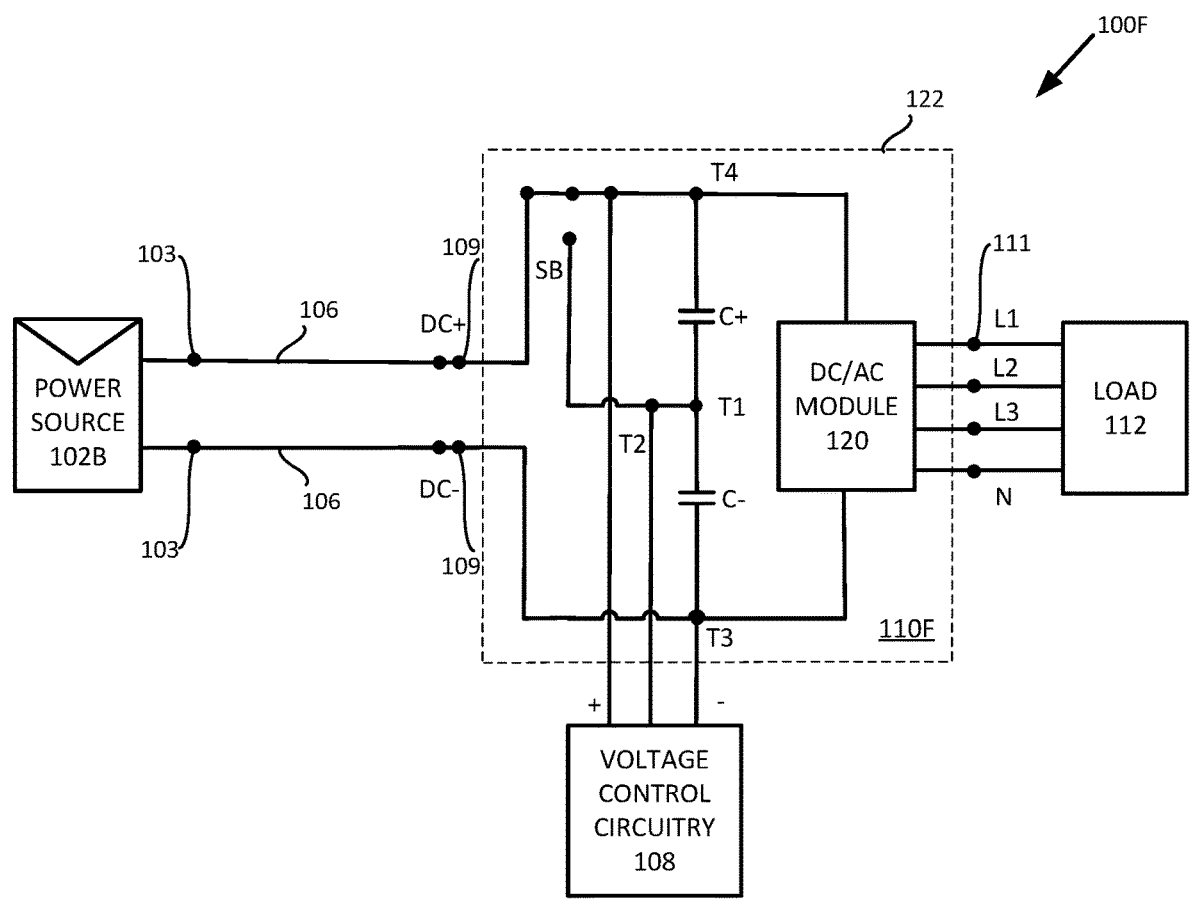
FIG. 6B shows the power system of FIG. 6A in a non-voltage-boost configuration mode.

FIG. 6A and FIG. 6B illustrate a power system 100F according to examples of the present subject matter. Power system 100F may be similar to other power systems 100 shown herein, except that power system 100F may be configured to switch between a below ground potential voltage-boost configuration mode and a non-voltage-boost configuration mode. Switch SB may be configured to connect terminal DC+ alternatively to terminal T2 or terminal T4.

FIG. 6A shows power system 100F in a voltage-boost configuration mode. In voltage-boost configuration mode, switch SB connects terminal DC+ to terminal T2 such that voltage control circuitry 108 may increase the voltage internal to housing 122. For example, voltage control circuitry 108 may double a voltage across DC/AC module 120. In voltage-boost configuration mode, the voltages at the output terminals 103 of power source 102B may be maintained as equal or negative relative to a ground potential. Meaning, in this example, the power system 100F is in a below ground potential configuration. The configuration mode shown in FIG. 6A may also be referred to as a below ground potential voltage-boost configuration mode. In voltage-boost configuration mode, voltage control circuitry 108 may also be configured to control the voltage at midpoint terminal T1 relative (e.g., equal) to the neutral output terminal N. The arrangement of system power device 110F when power system 100F is in voltage-boost configuration mode may be similar to the arrangement of system power device 110B.

FIG. 6B shows power system 100F in a non-voltage-boost configuration mode. In the non-voltage-boost configuration mode, switch SB connects terminal DC+ to terminal T4 such that voltage control circuitry 108 does not increase the voltage internal to housing 122. For example, voltage control circuitry 108 may not double a voltage across DC/AC module 120. In non-voltage-boost configuration mode, power system 100F may also be configured to control the voltage at terminal T3 or the voltage at terminal T4 relative to the neutral output terminal N. For example, in non-voltage-boost configuration mode, the voltages at both output terminals 103 of power source 102B may or might not be maintained as positive relative to a ground potential or as negative relative to a ground potential.

Figure 7A:
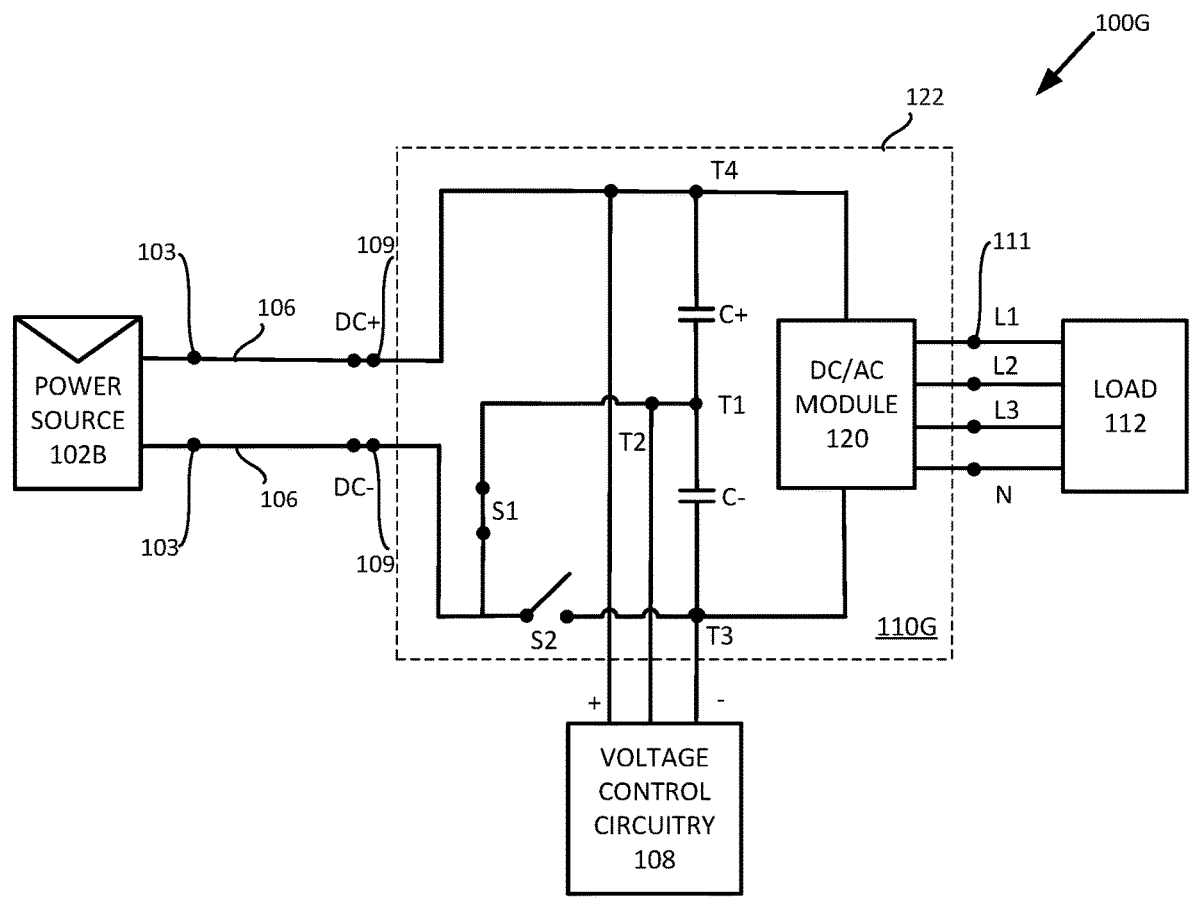
FIG. 7A shows a power system in a voltage-boost configuration mode.
Figure 7B:
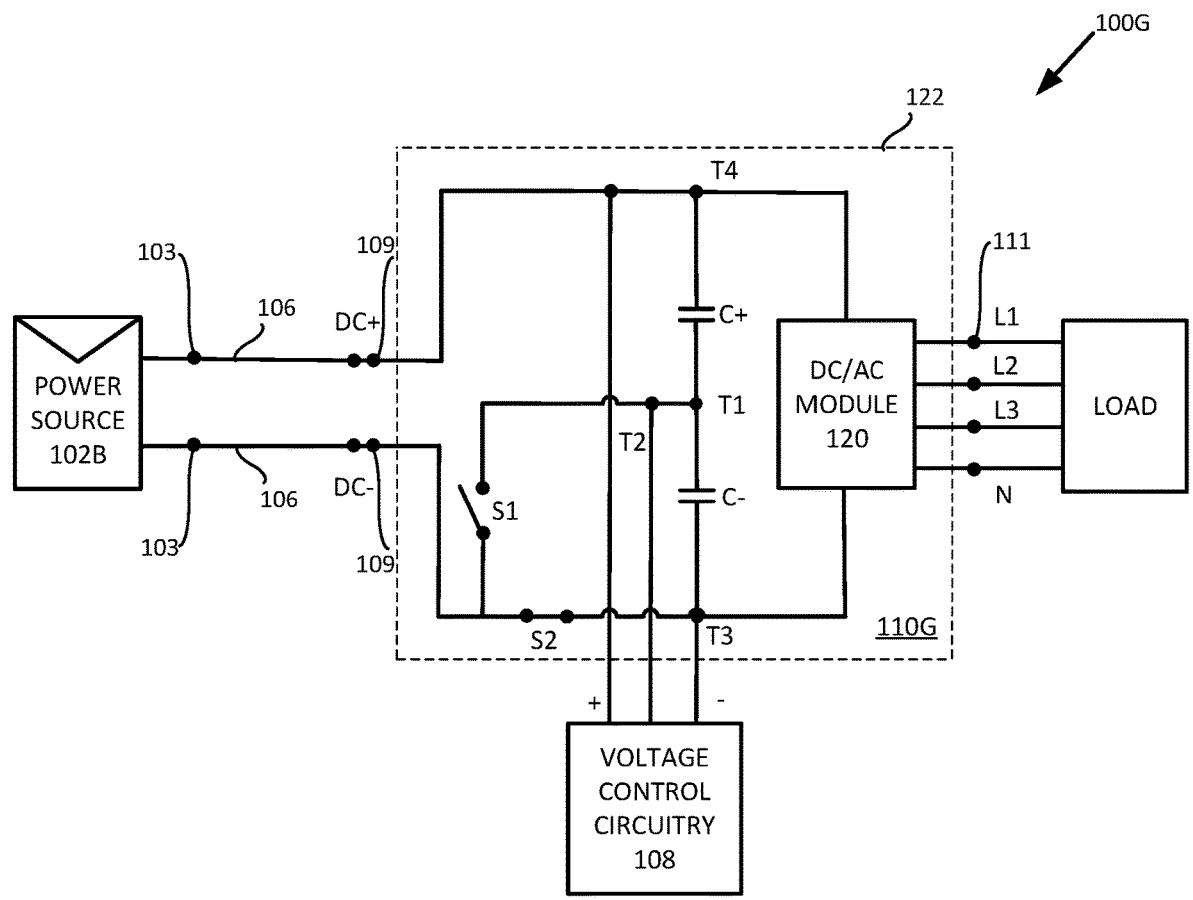
FIG. 7B shows the power system of FIG. 7A in a non-voltage-boost configuration mode.

FIG. 7A and FIG. 7B illustrate a power system 100G according to examples of the present subject matter. Power system 100G may be similar to other power systems 100 shown herein, except that power system 100G may include a plurality of switches, S1 and S2, configured to switch the power system 100G between the different configuration modes. Switch S1 may be configured to alternatively connect terminal DC– to, or to disconnect terminal DC– from, terminal T2. Switch S2 may be configured to alternatively connect terminal DC− to, or to disconnect terminal DC− from, terminal T3. Switches S1 and S2 may be configured to alternatingly switch power system 100G between a voltage-boost configuration mode, that may be an above ground potential configuration mode, and a non-voltage-boost configuration mode. For example, power system 100G may be configured to switch into a voltage-boost configuration mode by switching switch S1 "ON" to create a closed circuit and connect terminal DC− to terminal T2, and switching switch S2 "OFF" to disconnect (e.g., create an open circuit) between terminal DC− and terminal T3, as shown in FIG. 7A. Power system 100G may also be configured to switch into a non-voltage-boost configuration mode by switching switch S1 "OFF" to disconnect (e.g., create an open circuit between) terminal DC− and terminal T2, and by switching switch S2 "ON" to create a closed circuit and connect terminal DC− and terminal T3, as shown in FIG. 7B. Switches S1 and S2 may be two separate switches or may be combined into a single pole double throw switch that alternates between connecting terminal DC− to either terminal T2 or terminal T3. The arrangement of system power device 110G when power system 100G is in voltage-boost configuration mode may be similar to the arrangement of system power device 110A.

Figure 8A:
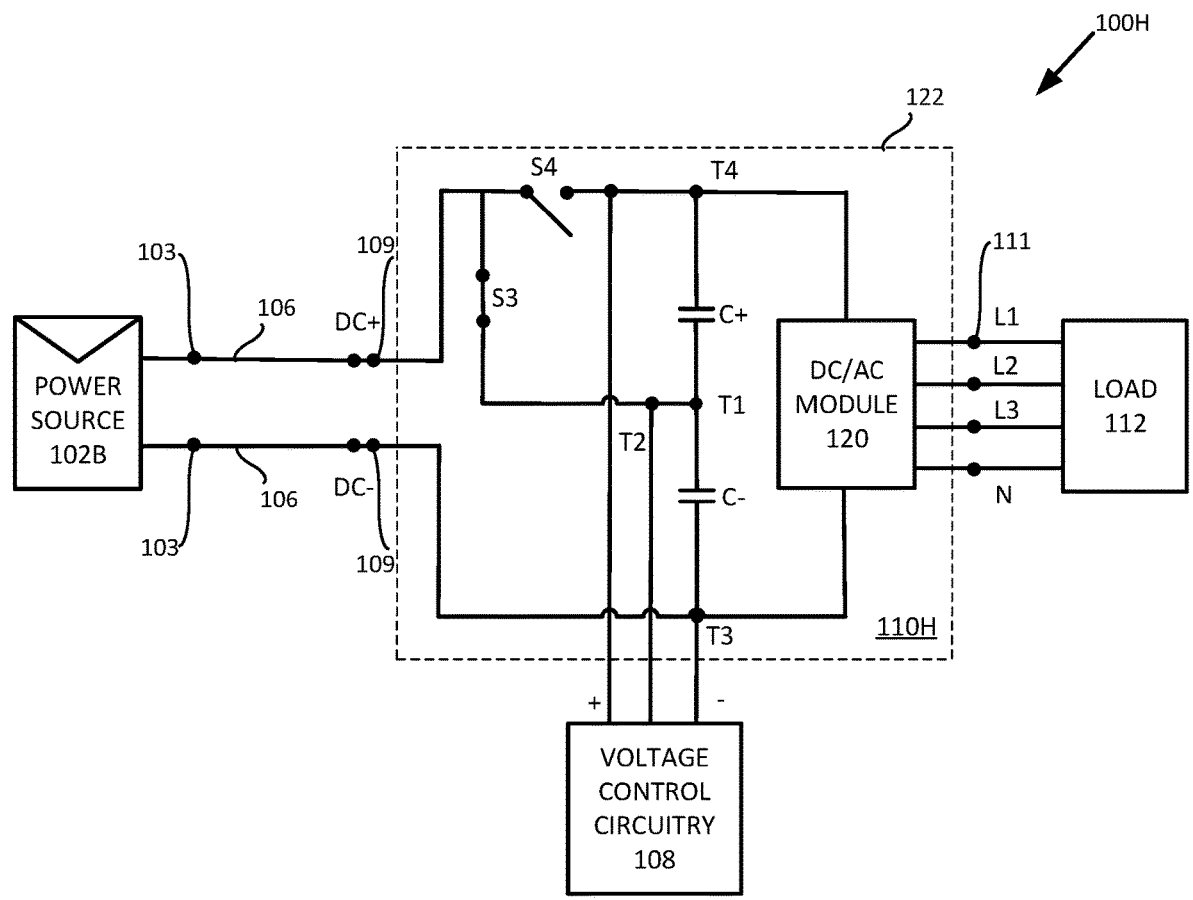
FIG. 8A shows a power system in a voltage-boost configuration mode.
Figure 8B:
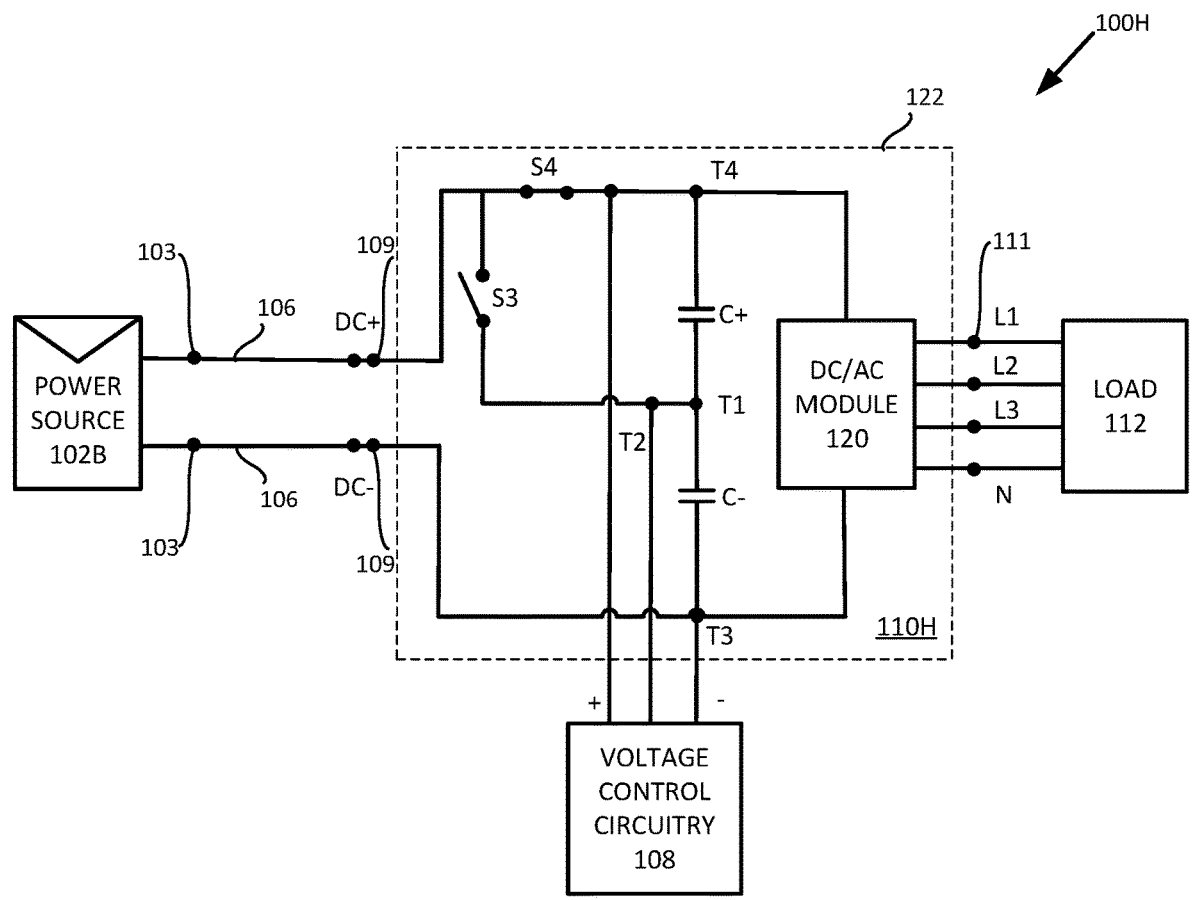
FIG. 8B shows the power system of FIG. 8A in a non-voltage-boost configuration mode.

FIG. 8A and FIG. 8B illustrate a power system 100H according to examples of the present subject matter. Power system 100H may be similar to other power systems 100 shown herein, except that power system 100H may include a plurality of switches, S3 and S4, configured to switch the power system 100H between a voltage-boost configuration mode, that may be a below ground potential configuration mode, and a non-voltage-boost configuration mode. Switch S3 may be configured to connect terminal DC+ to, or to disconnect terminal DC+ from, terminal T2. Switch S4 may be configured to connect terminal DC+ to, or to disconnect terminal DC+ from, terminal T4. Switches S3 and S4 may be configured to alternatingly switch power system 100H between the different configuration modes. For example, power system 100H may be configured to switch into a voltage-boost configuration mode by switching switch S3 "ON" to create a closed circuit and to connect terminal DC+ to terminal T2, and by switching switch S4 "OFF" to disconnect (e.g., create an open circuit between) terminal DC+ from terminal T4 (as shown in FIG. 8A). Power system 100H may also be configured to switch into a non-voltage-boost configuration mode by switching switch S3 "OFF" to disconnect (e.g., create an open circuit between) terminal DC+ from terminal T2, and by switching switch S4 "ON" to create a closed circuit and to connect terminal DC+ to terminal T4 (as shown in FIG. 8B). Switches S3 and S4 may be two separate switches or may be combined into a single pole double throw switch that alternates between connecting terminal DC− to either terminal T2 or terminal T4. The arrangement of system power device 110H when power system 100H is in voltage-boost configuration mode may be similar to the arrangement of system power device 110B.

Figure 9A:
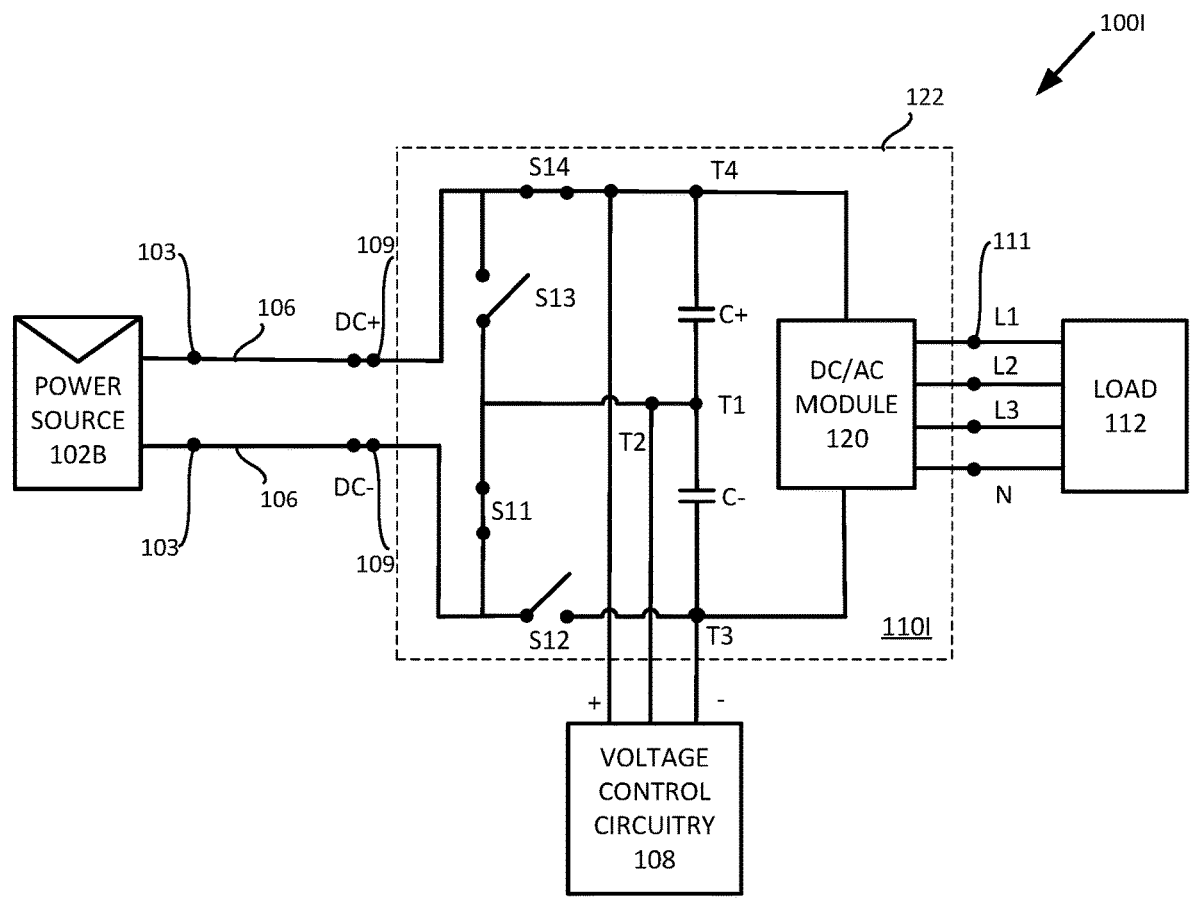
FIG. 9A shows a power system in an above ground potential configuration mode.
Figure 9B:
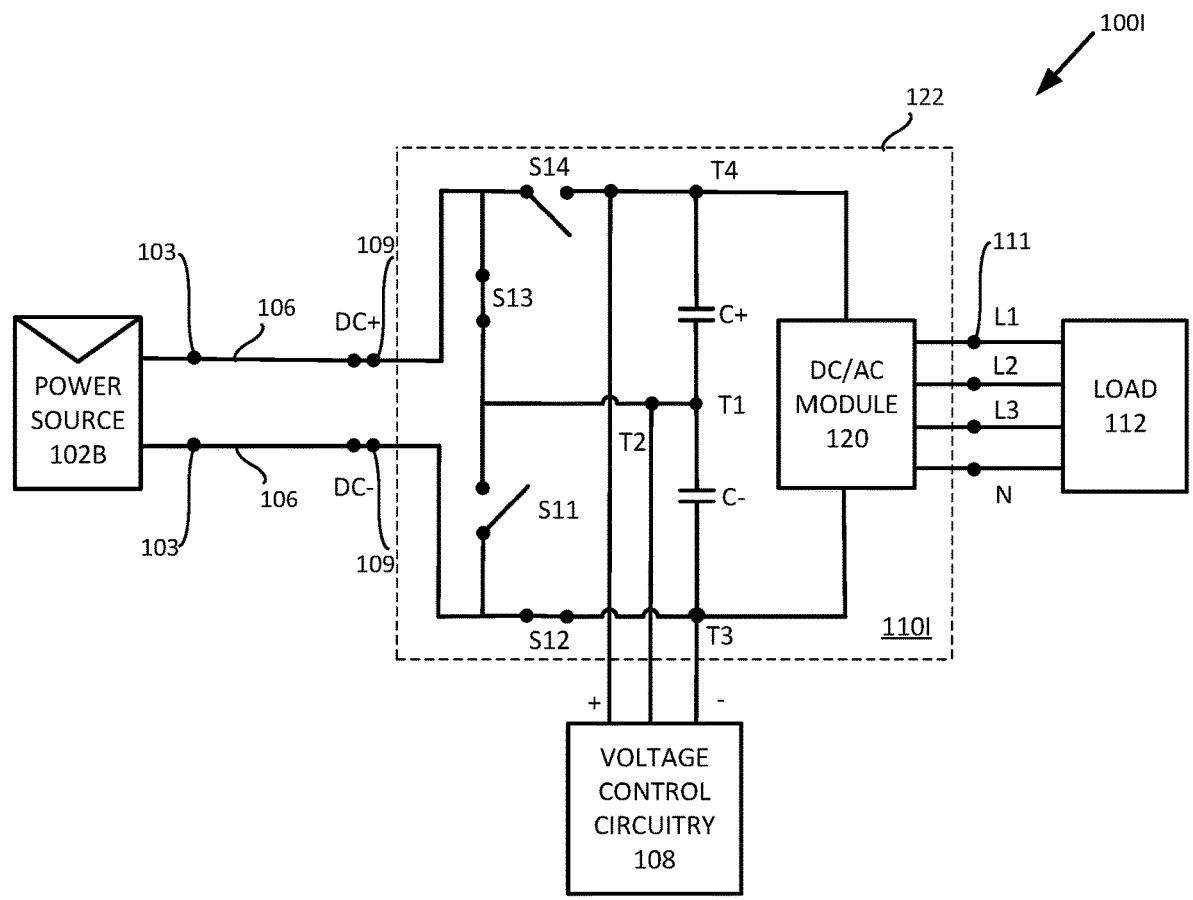
FIG. 9B shows the power system of FIG. 9A in a below ground potential configuration mode.
Figure 9C:
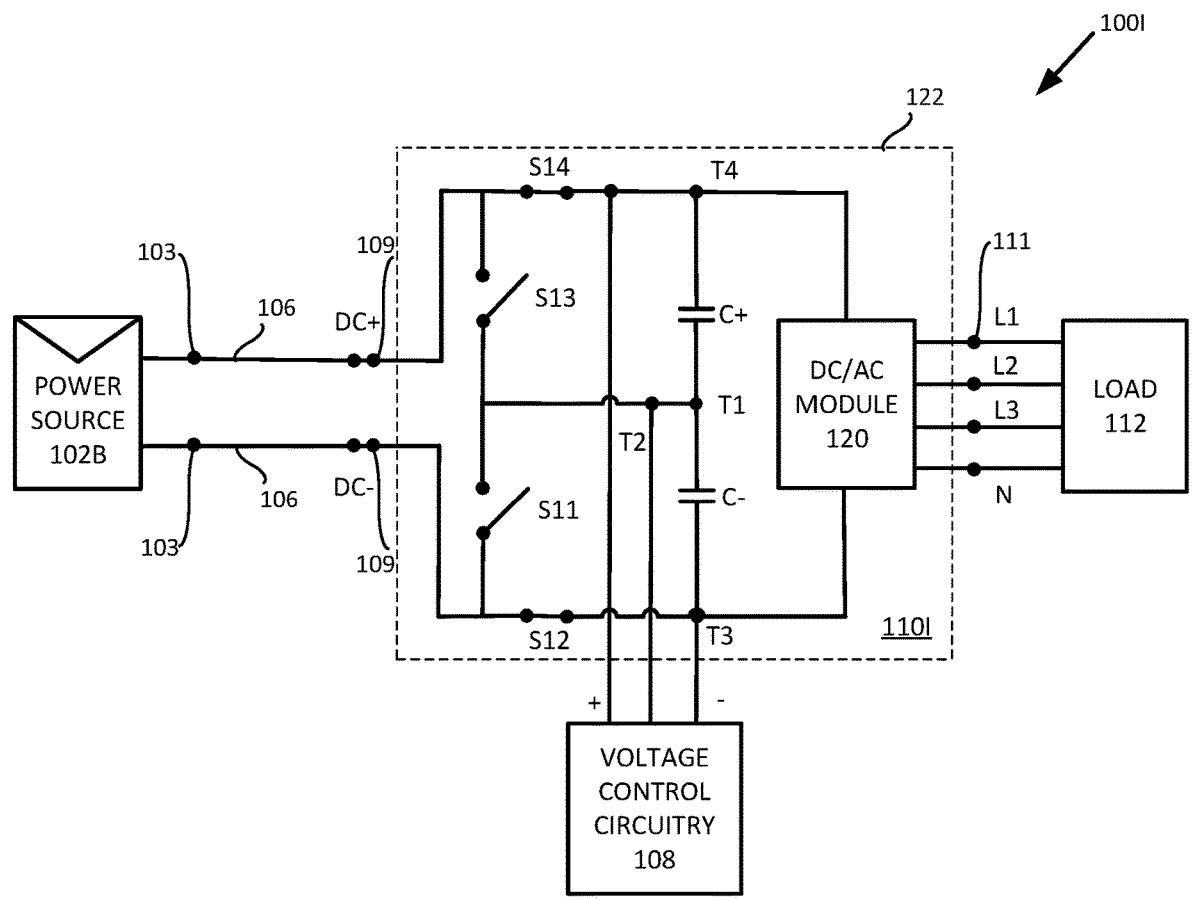
FIG. 9C shows the power system of FIG. 9A in a non-voltage-boost configuration mode.

FIG. 9A, FIG. 9B, and FIG. 9C illustrate a power system 100I according to examples of the present subject matter. Power system 100I may be similar to other power systems 100 shown herein, except that power system 100I may include a plurality of switches, S11, S12, S13, and S14, configured to switch the power system 100I between different configuration modes, for example: an above ground potential voltage-boost configuration mode, a below ground potential voltage-boost configuration mode, a non-voltage-boost configuration mode, etc. Switch S11 may be configured to connect terminal DC− to, and to disconnect terminal DC− from, terminal T2. Switch S12 may be configured to connect terminal DC− to, and to disconnect terminal DC− from, terminal T3. Switch S13 may be configured to connect terminal DC+ to, and to disconnect terminal DC+ from, terminal T2. Switch S14 may be configured to connect terminal DC+ to, and to disconnect terminal DC+ from, terminal T4. Switches S11, S12, S13, and S14 may be configured to alternatingly switch power system 100I between the different configuration modes. For example, power system 100I may be configured to switch into an above ground potential voltage-boost configuration mode by switching switch S11 "ON" to create a closed circuit and to connect terminal DC− to terminal T2, by switching switch S12 "OFF" to disconnect (e.g., create an open circuit) terminal DC− from terminal T3, by switching switch S13 "OFF" to disconnect (e.g., create an open circuit) terminal DC+ from terminal T2, and by switching switch S14 "ON" to create a closed circuit and connect terminal DC+ to terminal T4 (as shown in FIG. 9A). Power system 100I may also be configured to switch into a below ground potential voltage-boost configuration mode by switching switch S11 "OFF" to disconnect (e.g., create an open circuit) terminal DC− from terminal T2, by switching switch S12 "ON" to create a closed circuit and to connect terminal DC− to terminal T3, by switching switch S13 "ON" to create a closed circuit and to connect terminal DC+ to terminal T2, and by switching switch S14 "OFF" to disconnect (e.g., create an open circuit) terminal DC+ from terminal T4 (as shown in FIG. 9B). Power system 100I may also be configured to switch into a non-voltage-boost configuration mode by switching switch S11 "OFF" to disconnect (e.g., create an open circuit) terminal DC− from terminal T2, by switching switch S12 "ON" to create a closed circuit and to connect terminal DC− to terminal T3, by switching switch S13 "OFF" to disconnect (e.g., create an open circuit) terminal DC+ from terminal T2, and by switching switch S14 "ON" to create a closed circuit and to connect terminal DC+ to terminal T4 (as shown in FIG. 9C). The arrangement of system power device 110I when power system 100I is in above ground potential voltage-boost configuration mode may be similar to the arrangement of system power device 110A. The arrangement of system power device 110I when power system 100I is in below ground potential voltage-boost configuration mode may be similar to the arrangement of system power device 110B.

Figure 10A:
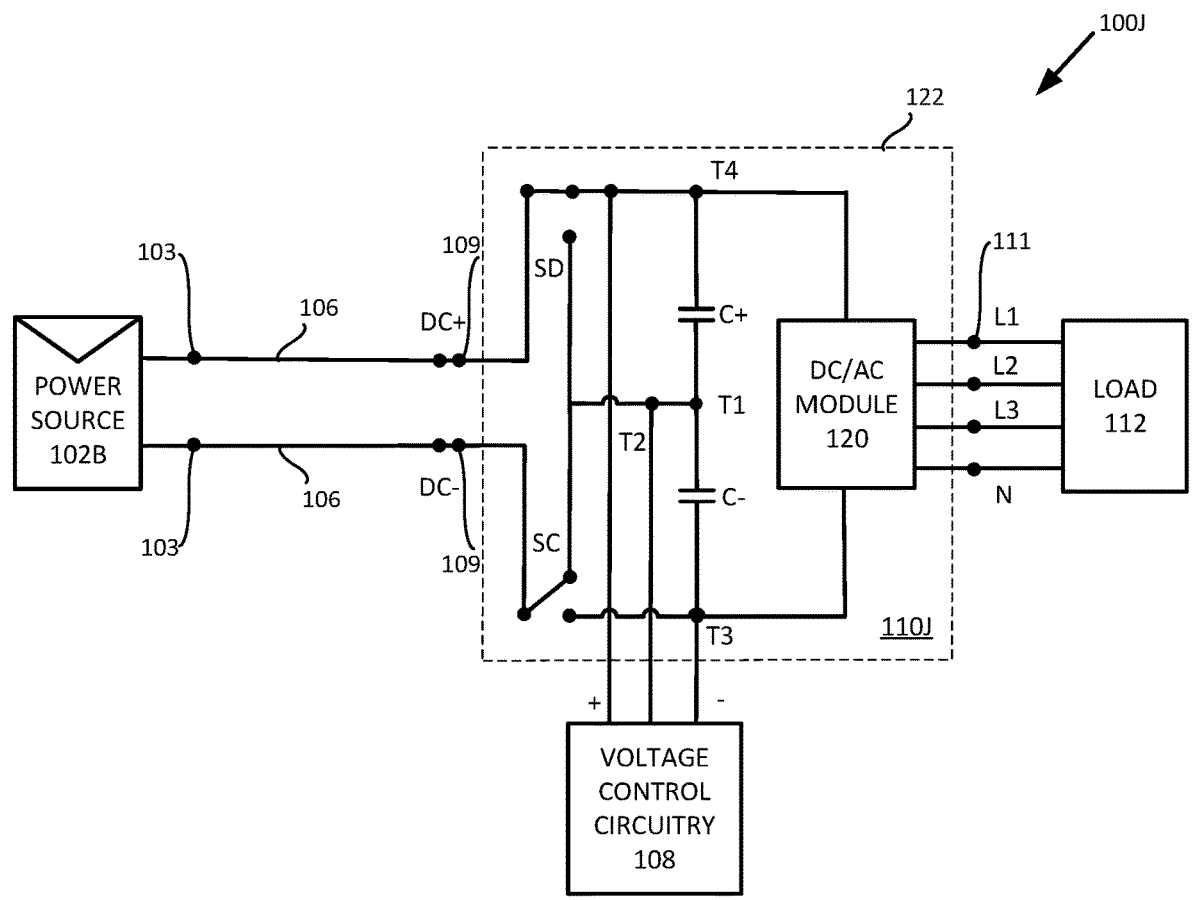
FIG. 10A shows a power system in an above ground potential configuration mode.
Figure 10B:
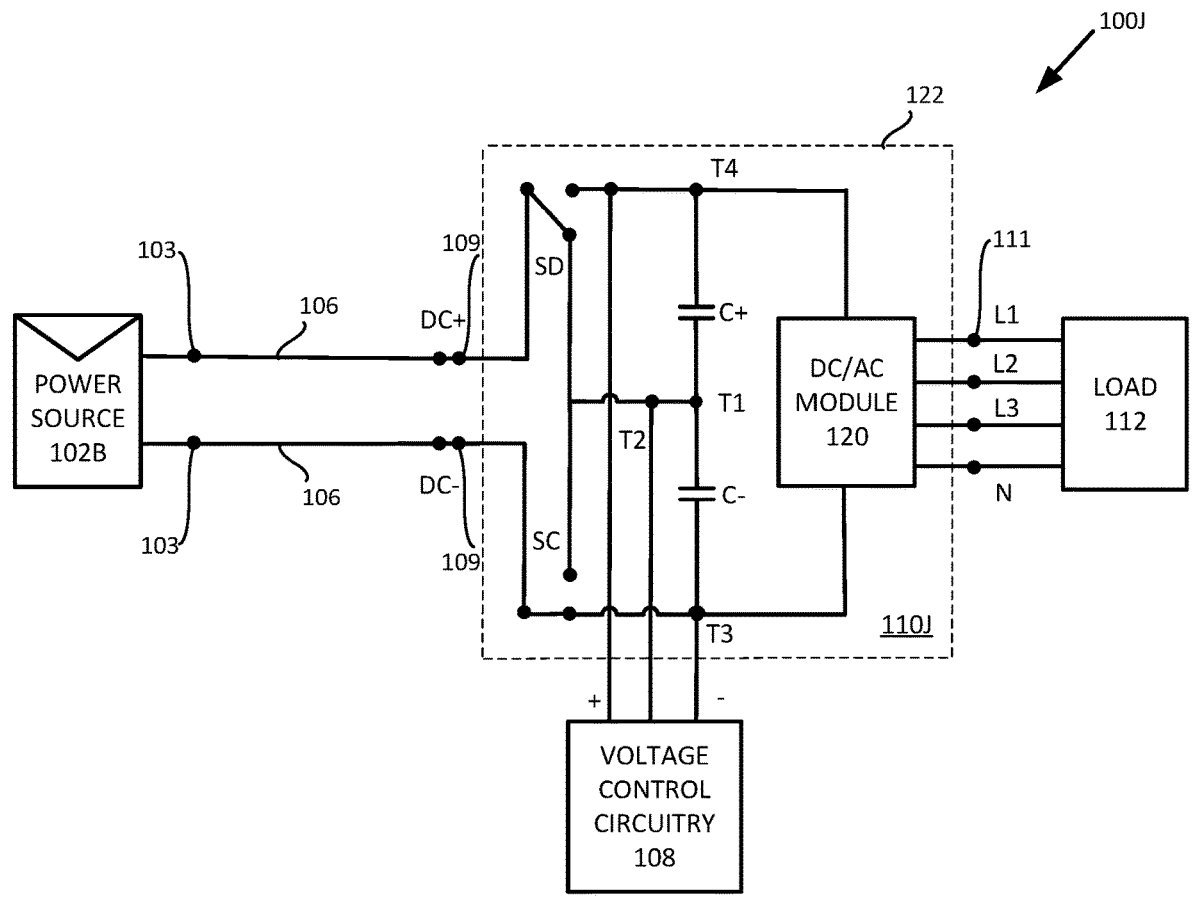
FIG. 10B shows the power system of FIG. 10A in a below ground potential configuration mode.
Figure 10C:
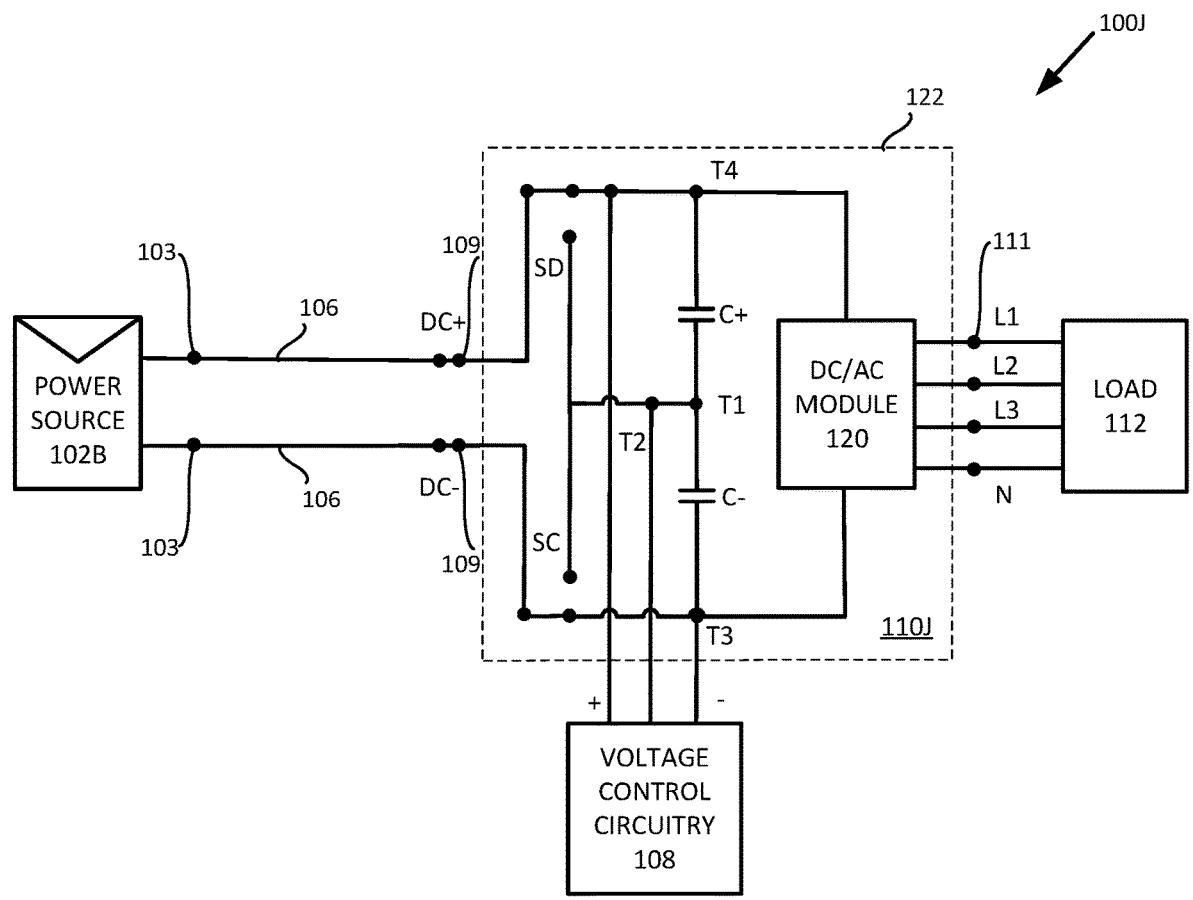
FIG. 10C shows the power system of FIG. 10A in a non-voltage-boost configuration mode.

FIG. 10A, FIG. 10B, and FIG. 10C illustrate a power system 100J according to examples of the present subject matter. Power system 100J may be similar to other power systems 100 shown herein, except that power system 100J may include a pair of switches, SC and SD, configured to switch the power system 100J between different configuration modes, for example: an above ground potential voltage-boost configuration mode, a below ground potential voltage-boost configuration mode, a non-voltage-boost configuration mode, etc. Switch SC may be configured to connect terminal DC−, alternatively, either to terminal T2 or to terminal T3. Switch SD may be configured to connect terminal DC+, alternatively, to either terminal T2 or to terminal T4. Switches SC and SD may be configured to alternatingly switch power system 100J between the different configuration modes. For example, power system 100J may be configured to switch into an above ground potential voltage-boost configuration mode by switching switch SC to create a closed circuit and to connect terminal DC− to terminal T2 (e.g., create an open circuit) and to disconnect terminal DC− from terminal T3, and by switching switch SD to disconnect (e.g., create an open circuit) terminal DC+ from terminal T2, thereby also creating a closed circuit, and to connect terminal DC+ to terminal T4, as shown in FIG. 10A. Power system 100J may also be configured to switch into a below ground potential voltage-boost configuration mode by switching switch SC to disconnect (e.g, create an open circuit) terminal DC− from terminal T2, thereby creating a closed circuit, and to connect terminal DC− to terminal T3, and by switching switch SD to create a closed circuit and to connect terminal DC+ to terminal T2, thereby also disconnecting terminal DC+ from terminal T4, as shown in FIG. 10B. Power system 100J may also be configured to switch into a non-voltage-boost configuration mode by switching switch SC to create an open circuit and to disconnect terminal DC− from terminal T2 (thereby also creating a closed circuit and connecting terminal DC− to terminal T3), and by switching switch SD to create an open circuit and to disconnect terminal DC+ from terminal T2 (thereby also creating a closed circuit and connecting terminal DC+ to terminal T4), as shown in FIG. 10C. The arrangement of system power device 110J when power system 100J is in above ground potential voltage-boost configuration mode may be similar to the arrangement of system power device 110A. The arrangement of system power device 110J when power system 100J is in below ground potential voltage-boost configuration mode may be similar to the arrangement of system power device 110B.

In some examples, the power system 100 may be configured to switch between different voltage-boost configuration modes (e.g., above ground potential or below ground potential), without a non-voltage-boost configuration mode.

The voltage control circuitry 108 may be configured to mitigate PID since the AC output of the system power device 110 is grounded (e.g., there is a neutral output line N connected to ground potential). Since the power system 100 is an AC grounded system, the potential at terminal T1 may be maintained at about 0 volts relative to ground potential and the voltage across the power source 102B may be maintained as either about zero or entirely positive relative to ground (e.g., about +400 volts), or about zero or entirely negative relative to ground (e.g., about −400 volts). An about zero or entirely negative potential with regard to ground may be beneficial with certain power sources 102 (for example, certain photovoltaic modules). Since the potential across the power source 102 is maintained about entirely above ground or about entirely below ground, then PID might be mitigated.

In cases where the AC is not grounded, the power system 100 may include additional circuitry to help maintain the voltage at terminal T1 at about 0 volts. In some cases where the AC is not grounded, this additional circuitry may be configured to mitigate PID.

Figure 11:
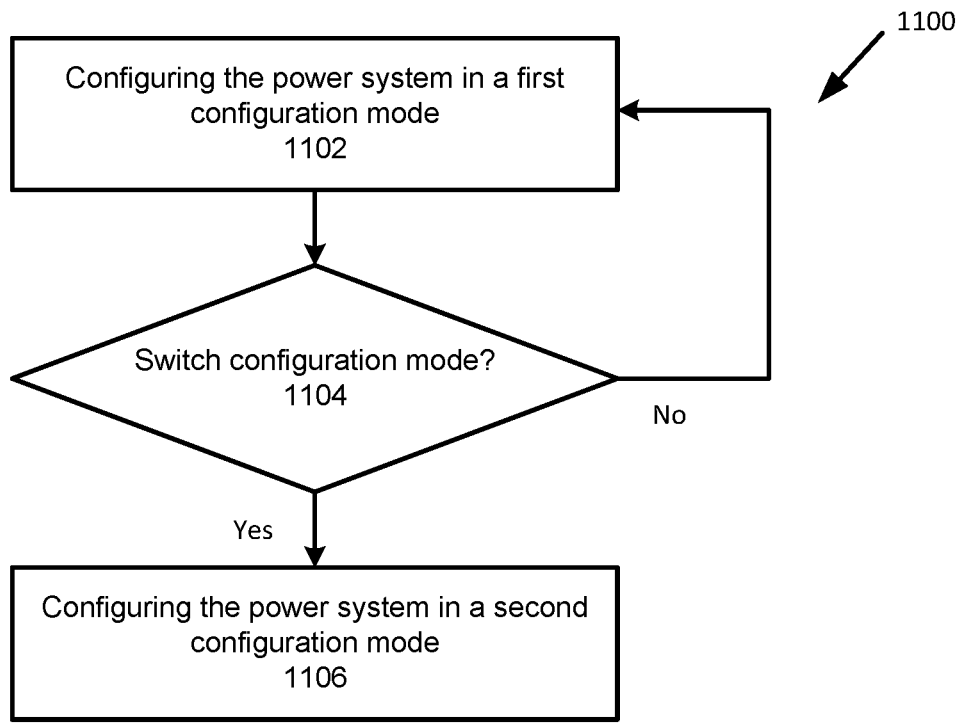
FIG. 11 shows a flow chart of a method.

FIG. 11 shows a flow chart 1100 of a method, according to one or more examples of the present subject matter.

In step 1102, the power system 100 is configured in a first configuration mode. For example, the power system 100 may be configured in a voltage-boost configuration mode or a non-voltage-boost configuration mode. If in a voltage-boost configuration mode, the power system 100 may be configured in an above ground potential configuration mode or a below ground configuration mode.

In step 1104, a decision may be made whether the configuration mode of power system 100 should be switched. This step may be performed using one or more controllers 116 and sensors of the power system. For example, the sensors may provide one or more parameters to the controller 116 that may be used to help determine whether the configuration mode of the power system 100 should be switched. For example, the determination may be based on a parameter related to a voltage of the power system 100.

If in step 1104 the decision is that the configuration mode of the power system 100 should not be switched, then the process 1100 may return to step 1102.

If in step 1104 the decision is that the configuration mode of the power system 100 should be switched, then the process 1100 may proceed to step 1106.

In step 1106, the power system 100 is configured in a second configuration mode. In step 1106, the power system 100 may be switched from the first configuration mode to the second configuration mode. This step may be performed using one or more switches and voltage control circuitry 108 of the power system 100. For example, the one or more switches may obtain one or more signals from the one or more controllers 116, including instructions to change the configuration mode of the power system 100. For example, the one or more switches may be configured to switch the configuration mode to a voltage-boost configuration mode or a non-voltage-boost configuration mode. The voltage-boost configuration mode may be an above ground potential configuration mode or a below ground configuration mode. In this way the power system 100 may be switched between the different configuration modes, for example, depending on which configuration mode may be the most advantageous at the time.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

Appendix A: Incorporated U.S. patent application Ser. No. US 62/955,627:

A switched capacitor circuit includes power switches and at least one capacitor, and may be used to implement output-voltage-regulated power converters. In many cases, switching may incur significant losses due to voltages disposed across the switch and/or current flowing through the switch when the switch state is reversed. Losses may be increased by operating the switches at high frequency. There is a need for switched capacitor circuit topologies and associated switching methods for increased efficiency of switched capacitor circuits.

The following summary presents a simplified summary of certain features. The summary is not an extensive overview and is not intended to identify key or critical elements.

Systems, apparatuses, and methods are described for a switched capacitor converter (SCC). The SCC may include a resonant circuit including an inductor. The SCC may be configured to be operable in multiple modes. For example, according to some features, the SCC may include terminals that may be used as input terminals or as output terminals. In some arrangements, an input voltage may be converted to an output voltage (e.g. an output voltage that is about double the input voltage or an output voltage that is about half the input voltage).

Aspects of the disclosure herein further include methods for controlling the SCC switches (e.g. modulation methods) to decrease switching losses associated with operating the converter, and to increase efficiency of the SCC. According to some aspects, a control method may be used to switch converter switches under zero-voltage conditions. According to some aspects, a control method may be used to switch converter switches under zero-current conditions.

These and other features and advantages are described in greater detail below.

Aspects of the disclosure herein further include methods for controlling SCC switches (e.g. modulation methods) to, for example, decrease switching losses associated with operating the converter and/or to increase efficiency of the SCC. According to some aspects, a control method may be used to switch converter switches under zero-voltage conditions. According to some aspects, a control method may be used to switch converter switches under zero-current conditions. Some features are shown by way of example, and not by limitation, in the accompanying drawings. In the drawings, like numerals reference similar elements. Some figures may be duplicative and/or depict different aspects of the same, similar, or interconnected systems (e.g., one or more portions of FIG. 14A or FIG. 14B may be duplicative of FIG. 14C).

Figure 14A:
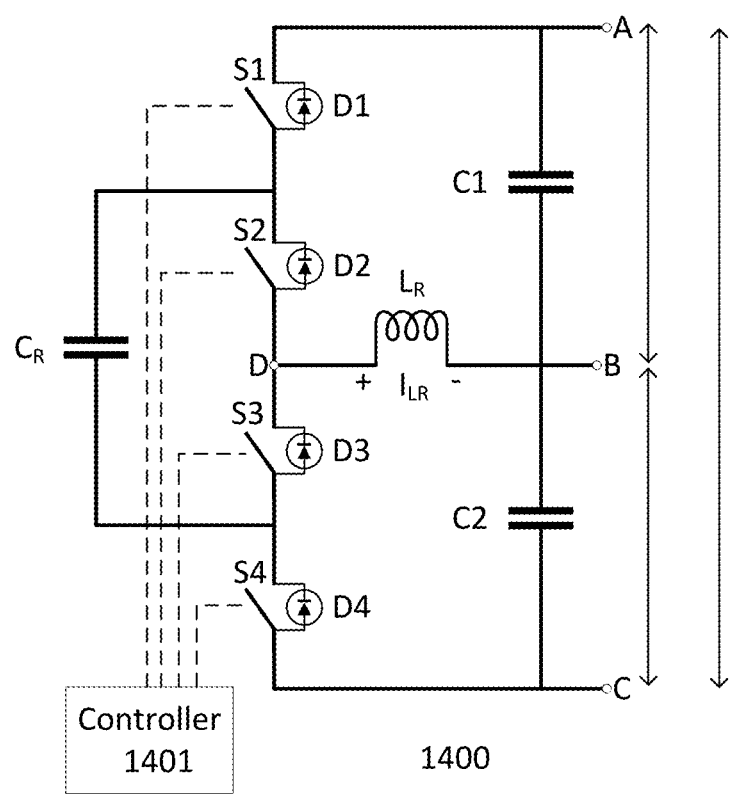
FIG. 14A illustrates a circuit in accordance with various aspects.
Figure 14D:
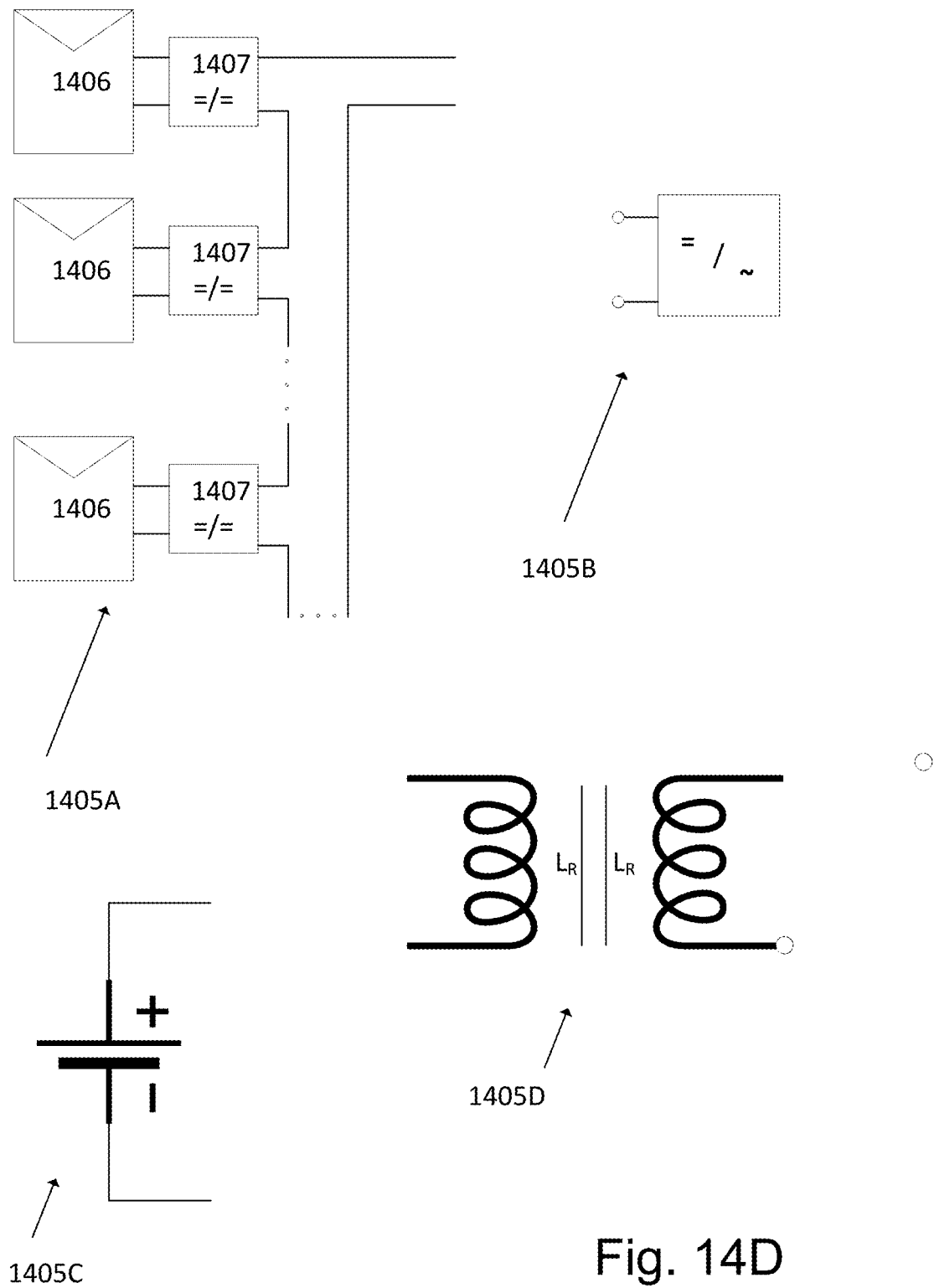
FIG. 14D illustrates example systems in accordance with various aspects.

Reference is now made to FIG. 14A. FIG. 14B and FIG. 14C which show an example circuit 100 in accordance with the disclosure herein. Circuit 1400 comprises four switches S1, S2, S3, and S4. Switches S1, S2, S3, and S4 may be connected in series. and each may be coupled in parallel to a bypass device (e.g . . . a diode). For example, first switch S1 may be coupled in parallel to a first bypass device D1, second switch S2 may be coupled in parallel to a second bypass device D2, third switch S3 may be coupled in parallel to a third bypass device D3, and/or fourth switch S4 may be coupled in parallel to a fourth bypass device D4. The four switches may be transistors or a group of transistors that together form a single switch. Transistors may comprise metal oxide silicon field-effect transistors (MOSFETs), junction gate field-effect transistors (JFETs), bipolar junction transistor (BJTs), insulated-gate bipolar transistors or (IGBTs), bidirectional switches, anti-parallel switches as denoted by FIG. 14B, and/or any appropriate means of switching within a circuit. A respective bypass device may comprise one or more elements (e.g., separate from a respective switch) such as a large signal diode, a Schottky diode, a tunnel diode, a PIN diode, and/or any appropriate means of allowing unidirectional electrical flow within a circuit. The bypass devices may comprise built-in body diodes (e.g., each may be a MOSFET's parasitic diode).

The four switches are connected in series between nodes A and C, where D is a midpoint of the series connection. Switch S1 may be coupled to node A (e.g . . . at a drain terminal, such as when S1 is a MOSFET) and switch S2 (e.g . . . a source terminal of a MOSFET). Switch S2 may be coupled to switch S1 (e.g., source) and to node D. Switch S3 may be coupled to node D (e.g., at a drain terminal, such as when S3 is a MOSFET) and S4 (e.g., a source terminal of a MOSFET). Switch S4 may be coupled to switch S3 (e.g., source) and to node C.

Switches S1, S2, S3, and S4 may be controlled by controller 1401. Controller 1401 may control the switches to be turned on (e.g., allowing current to flow through the switch) or turned off (e.g. preventing current from flowing through the switch), in one or both directions, depending on the type of switch. In the example where the switches S1, S2, S3, and S4 are MOSFETs, controller 1401 may be coupled to the gate of each MOSFET. The coupling between controller 1401 and the gate of the MOSFET may create a gate-to-source voltage to control the MOSFET to be on or off. The coupling may be direct or may be through a gate driver that amplifies a signal to the gate Controller 1401 may be a digital controller, an analog controller, an analog control circuit, digital signal controller (DSP), a microcontroller unit (MCU), a field-programmable gate array (FPGA), an application-specific integrated circuit (ASIC), a microprocessor, memory executing instructions (e.g. in conjunction with a microprocessor and/or computer software (e.g executing on a general purpose processor).

Circuit 1400 may comprise a resonant circuit. A resonant circuit may comprise an inductor coupled to a capacitor, and may oscillate at a resonant frequency of, wherein L is the inductance of the inductor and C is the capacitance of the capacitor. The resonant circuit of circuit 1400 comprises a winding LR and a power bank CR, by non-limiting example is illustrated as an inductor and a capacitor, and is configured to resonate at a frequency of The power bank may be any appropriate device for creating and/or maintaining a voltage differential. The winding may be any number of windings of a coil, choke, inductor, reactor, or any appropriate means of storing energy over a magnetic field. The resonating of the resonating circuit may occur by the circuit storing power in an electrical field created by the power banks, transferring the stored power to a magnetic field created by the winding. and continuously transitioning back and forth between states. Power banks C1 and C2, here by non-limiting example shown as capacitors, are to hold a voltage differential between nodes A and B and between nodes B and C, respectively.

Nodes A, B, and C may be used as input terminals, output terminals, or both. Two of the nodes may be used as terminals for receiving an input voltage (across a first subset of two out of the three nodes A, B and C), with the first subset of nodes used as input terminals. The circuit may be operated to provide an output voltage across a second subset of two of the three nodes (e.g., with the second subset of nodes used as output terminals).

The first subset of terminals and the second subset of terminals may partially overlap (e.g . . . may share at least one terminal). Further, operation of circuit 1400 may be interchangeable, enabling bidirectional conversion of power. For example, the first subset may be used as input terminals and the second subset may be used as output terminals, (e.g., wherein the circuit may be operated to convert power from the first subset of terminals to the second subset of terminals). In another example, the first subset may be used as output terminals and the second subset may be used as input terminals (e.g., wherein the circuit may be operated to convert power from the second subset of terminals to the first subset of terminals).

Referring now to FIG. 14B, circuit 1402 may have a structure similar to or the same as circuit 100, but with the addition of switches S5-S8 connected in series with switches S1-S4 (which may be switches S1-S4 of FIG. 14A) to form bidirectional switches, by orienting each pair of series-connected switches such that each pair of corresponding bypass diodes are connected head-to-head or back-to-back. The bi-directional switches may be provided for use in the case of AC voltage input. The switches may allow further control and degrees of freedom as well as prevent unwanted flow of reverse current across the switches.

Input terminals and output terminals (e.g . . . input terminals and output terminals of FIG. 14A or FIG. 14B) may be configured in various arrangements, such as may be shown in FIG. 14C. The input terminals are coupled to power source 1403 and output terminals are coupled to load 1404, which may form a system. First arrangement 1400A comprises a first subset of nodes A and B configured for use as input terminals and a second subset of nodes A and C configured for use as output terminals. Second arrangement 1400B comprises a first subset of nodes B and C configured for use as input terminals and a second subset of nodes A and C configured for use as output terminals. Third arrangement 1400C comprises a first subset of nodes A and B configured for use as input terminals and a second subset of nodes B and C configured for use as output terminals. Fourth arrangement 1400D comprises a first subset of nodes B and C configured for use as input terminals and a second subset of nodes A and B configured for use as output terminals. Fifth arrangement 1400E comprises a first subset of nodes A and C configured for use as input terminals and a second subset of nodes A and B configured for use as output terminals. Sixth arrangement 1400F comprises a first subset of nodes A and C configured for use as input terminals and a second subset of nodes B and C configured for use as output terminals.

First arrangement 1400A and the second arrangement 1400B may operate in substantially the same manner. The third arrangement 1400C and fourth arrangement 1400D may operate in substantially the same manner. The fifth arrangement 1400E and the sixth arrangement 1400F may operate in substantially the same manner.

Operation of circuit 1400 may include controlled resonance of the resonant circuit through the switching of the switches to cause the voltage across C2 to follow the voltage across C1, or to cause the voltage across C1 to follow the voltage across C2. The voltage following between voltage over C1 and voltage over C2 may be proportional, for example, a roughly one-to-one voltage ratio. In the one-to-one ratio example, circuit 1400 may act as a voltage doubler, wherein nodes A and B, and/or nodes B and C, are used as input terminals and nodes A and C are used as output terminals. For example, if input terminal nodes A and B have a voltage differential of 400V, then the output terminal nodes A and C may output a voltage differential of 800V. In the one-to-one ratio example, circuit 100 may act as a voltage halver. where nodes A and C are used as input terminals and nodes A and B or nodes B and C are used as output terminals. For example, if input terminal nodes A and C have a voltage differential of 800V, then the output terminal nodes A and B may receive a voltage differential of 400V. In a one-to-one voltage ratio example, circuit 1400 may act as a voltage isolator, where nodes A, B or nodes B, C are used input terminals and nodes B, C or nodes A, B are used as output terminals respectively. For example, if input terminal nodes A and B have a voltage differential of 400V than the output terminal nodes B and C may receive a voltage differential of 400V.

Reference is now made to FIG. 14C which shows example inputs and outputs for circuit 1400. Circuit 1400 may be coupled to other components, forming a system. Photovoltaic (PV) system 1405A may be a power generator, such as power source 1403. PV system 1405A may comprise a PV farm of one or more PV strings, wherein each string may include one or more PV cells or PV panels 1406. Each PV cell or panel may be coupled to a DC/DC converter 1407. DC/DC converter 1407 may be a boost converter, a buck converter, a buck- boost converter, and/or any appropriate means of converting DC to DC. The DC/DC converter 1407 may include a maximum power point tracking (MPPT) function and/or element. The PV strings may further be coupled to combiner boxes that combine a voltage of one or more PV panels 1406 and an inverter or transformer 1405B to receive the voltage from PV panels 1406. The inverter or transformer 1405B may further comprise an uninterruptable power source (UPS). PV system 1405A is an exemplary PV system and is not limited to the structure laid forth. Circuit 1400 may be coupled to any part of the PV system 1405A. For example, the PV panel of circuit 1400 may be coupled to the DC/DC converter. In another example, a DC/DC converter of circuit 1400 may be coupled to a PV string. In another example, a DC/DC converter of circuit 1400 may be coupled to a junction or combiner box. In another example, a DC/DC converter of circuit 1400 may be coupled from a PV string or a junction or combiner box to inverter or transformer 1405B. In another example, a DC/DC converter of circuit 1400 may be coupled from a PV string or a junction or combiner box to a UPS. In another example, a DC/DC converter of circuit 1400 may be coupled from a UPS to inverter or transformer 1405B.

Another example system is a battery 1405C. The circuit may be used (e.g . . . when the system is battery 1405C) in conjunction with charging the battery through output terminals, or discharging the battery through input terminals, or a combination of both. Another example system 1405D may be an inductor or transformer. Circuit 1400 or circuit 1402 may be coupled to the end of the system 1405D and receive an AC voltage. The circuit 1400 or the circuit 1402 may be placed at the end of an inverter with a tap. The inverter may be a 3-level neutral point clamped inverter (NPC inverter). The circuit 1400 or circuit 1402 may be used to balance the middle point tap to two equal voltage valued sides. System 1405D may mimic a split phase system wherein the circuit 1400 or the circuit 1402 may halve the inverter or transformer output to create two voltage halves of equal proportion. This may have the advantage of increasing compatibility with electrical systems that operate under split phase, such as US households and/or the US power grid.

Figure 15A:
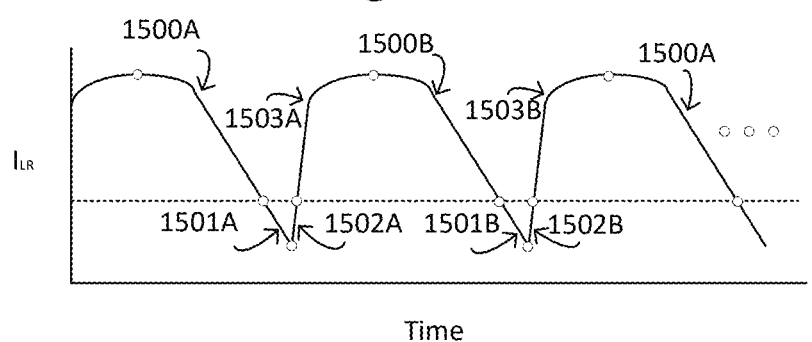
FIG. 15A illustrates a current flow in a circuit in accordance with various aspects.
Figure 15B:
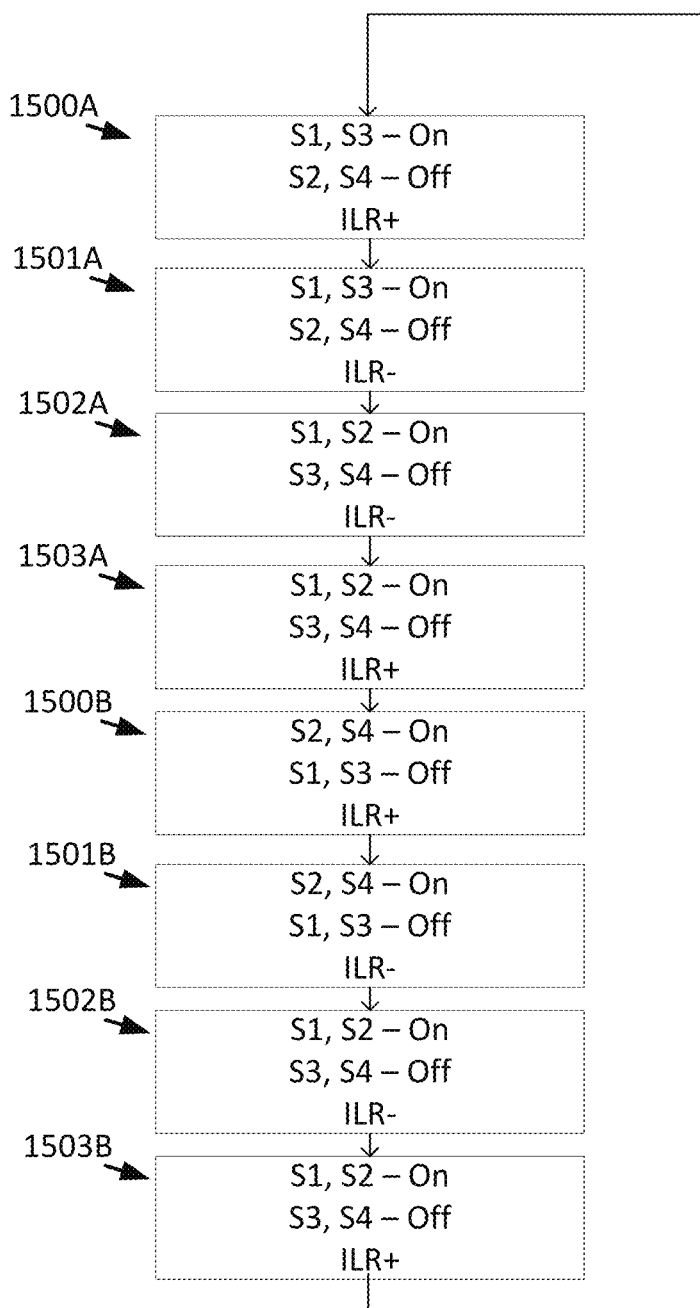
FIG. 15B illustrates a flow chart corresponding to current flow in a circuit. in accordance with various aspects.

Reference is now made to FIG. 15A and FIG. 15B, which show examples of the controlled periodic switching states of circuit 1400 by controller 1401. The switching from state to state may be oriented to soft switch. Soft switching may have the benefit of lower switching losses. Soft switching may involve zero current switching (ZCS), zero voltage switching (ZVS), or both. ZCS may be achieved by the current through the switch being brought to zero or near zero before the switch is turned on or off. ZVS may be achieved by the voltage across the switch being brought to zero (or near zero) before the switch is turned on or off. Circuit 1400 may use soft switching in at one or more switching transitions and may soft switch a majority of the switching transitions.

Switching frequency, or $f_{SW}$, may refer to a rate at which one or more states switch. Switching frequency $f_{SW}$ may be of a value higher or lower than the resonating frequency $f_R$ (in Hz). Both the resonating frequency $f_R$ and the switching frequency $f_{SW}$ may be close in proximity (in Hz) and be no further than for example 15 KHz. 10 KHz, or 5 KHz from one another. For example, if the resonating frequency $f_R$ is 50 KHz then the switching frequency $f_{SW}$ may be 40 KHz-60 KHz (e.g., 45 KHz in the example of a 10 KHz range). Circuit 100 may be operated by the switching frequency $f_{SW}$ in an open loop feedback system and may be independent from the process output.

The periodic states composing the controlled periodic switching states are 1500A, 1501A, 1502A, 1503A, 1500B, 1501B, 1502B, 1503B. The A states and the B states may be similar in form. The flow of current in a positive direction or a negative direction indicate a reverse of current polarity to one another and not limiting to a specific direction. The turning off and/or turning on for the switches may be done actively and/or passively, and may be done with a signal or without a signal. The resonating circuit may oscillate and/or reverse current back and forth in the positive and negative direction. In state 1500A, S1 and S3 are "on," S2 and S4 are "off," and winding current ILR is flowing in the positive direction. Switch S1 may have current flowing through a parallel bypass device at first before turning on under ZCS. In state 1501A, S1 and S3 are "on," S2 and S4 are "off," and winding current ILR may reverse and flow in the negative direction. The winding current ILR may reverse due to the oscillations of the resonating circuit. In state 1502A, S1 and S2 are "on," S3 and S4 are "off," and winding current ILR is flowing in the negative direction. S3 may be turned off when the current has low magnitude (e.g . . . close to ZCS). The current may start flowing through the parallel bypass device of S2 before S2 is turned on, and may be turned on under ZVS. In state 1503A, S1 and S2 are "on," S3 and S4 are "off," and winding current ILR may reverse and flow in the positive direction. Switch S1 may be turned on by the current flowing through the parallel bypass device and may have the switch turned off at or near ZVS and/or ZCS.

The winding current ILR may reverse due to the oscillations of the resonating circuit. In state 1500B, S2 and S4 are "on," S1 and S3 are "off," and winding current ILR is flowing in the positive direction. Switch S4 may have current flowing through parallel bypass device at first, and may turn on under ZCS. In state 1501B, S2 and S4 are "on," S1 and S3 are "off,"

and winding current ILR may reverse and flow in the negative direction. The winding current ILR may reverse due to the oscillations of the resonating circuit. In state 1502B, S1 and S2 are "on," S3 and S4 are "off," and winding current ILR may flow in the negative direction.

S4 may be turned off when the current has a low magnitude (e.g . . . close to ZCS). The current may start flowing through the parallel bypass device of S1 before S1 is turned on, and may be turned ON under ZVS. In state 1503B, S1 and S2 are "on," S3 and S4 are "off," and winding current ILR may reverse and flow in the positive direction. S2 may be turned off while the current is flowing through the parallel bypass device and may have turn off at or near ZVS and/or ZCS. The winding current ILR may reverse due to the oscillations of the resonating circuit. After 1503B, in a periodic fashion the following state may proceed back with state 1500A and the cycle repeats.

Figure 16:
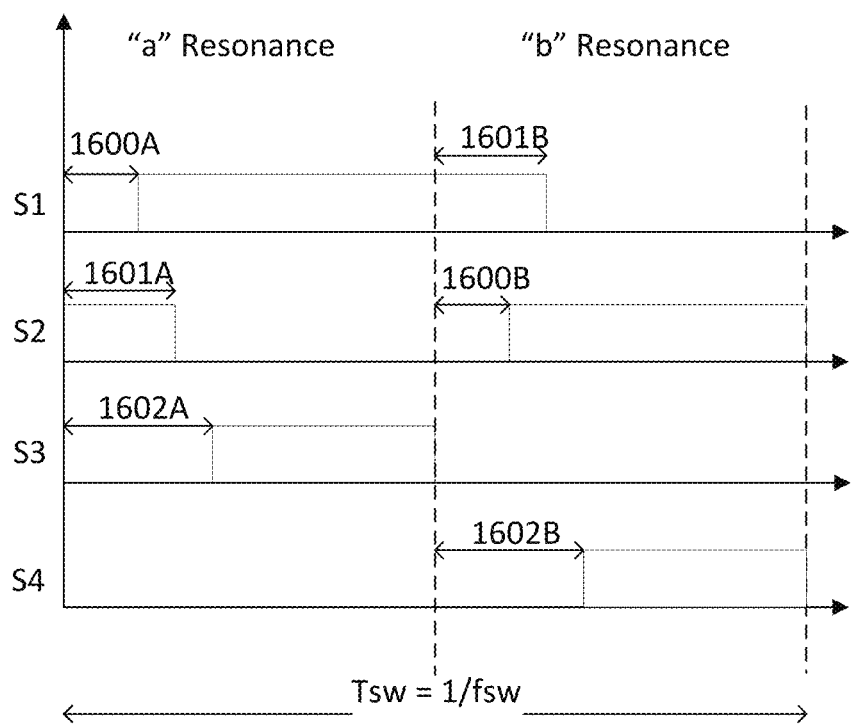
FIG. 16 illustrates an example signal chart of a controller controlling a circuit. in accordance with various aspects.

Reference is now made to FIG. 16 which shows an example of the control signal sent to the switches by controller 101. There exists a set of delays 1600A, 1601A, and 1602A and 1600B, 1601B, and 1602B. Delay set A and delay set B may be similar to one another and may have similar desired effects. Delays 1600A, 1601A, and 1602A in set A and 1600B, 1601B, and 1602B in set B may be to achieve ZVS and/or ZCS and may be based on the switching characteristics of the switches, which may have the advantage of increasing efficiency and decreasing switching overshoots. Delay 1600A and delay 1600B may allow the parallel bypass device to a switch to conduct before the switch turns on. Delay 1600A and the delay 1600B may be based on the turn-off characteristics of the closing switch. In one example regarding the delay 1600A, there may be a delay in the control signal while the transients in switch S3 dissipate. After the dissipation, the control signal may instruct S2 to turn on. Delay 1600A and delay 1600B may allow ZVS in the newly turned on switch. Delay 1601A and delay 1601B may be determined by the turn-off time of the closing switch and/or may be timed to the winding current falling to zero or near zero levels. The length of delay 1601A and delay 1601B may be functions of reverse recovery and turn-off characteristics of the switch (e.g., which may achieve ZCS or near-ZCS). For example, one turn-off characteristic may be the turn-off time of S1 for 1601A. In another example, one turn-off characteristic be the turn-off time of S2 for 1601B. Delay 1602A and delay 1602B may be determined by the conduction time corresponding to the parallel bypass device of the switch to be turned on. For example, it may be advantageous to turn on the switch while the parallel bypass device is conducting, as this may reduce conduction losses. While reducing the delay 1602A and delay 1602B may reduce conduction losses, in some instances it may be advantageous reduce the delay only to a certain threshold as a delay that is too small may lead to high over-voltage overshoots in the proceeding switch (e.g., that is being turned on). For example, it may be advantageous to allow a for the conduction time of S4 before proceeding to S1 for 1602A or the conduction time of S3 before proceeding S2 for 1602B.

The following may comprise description and figures that may be duplicative of, or supplemental to, description and figures discussed above.

Figure 17:
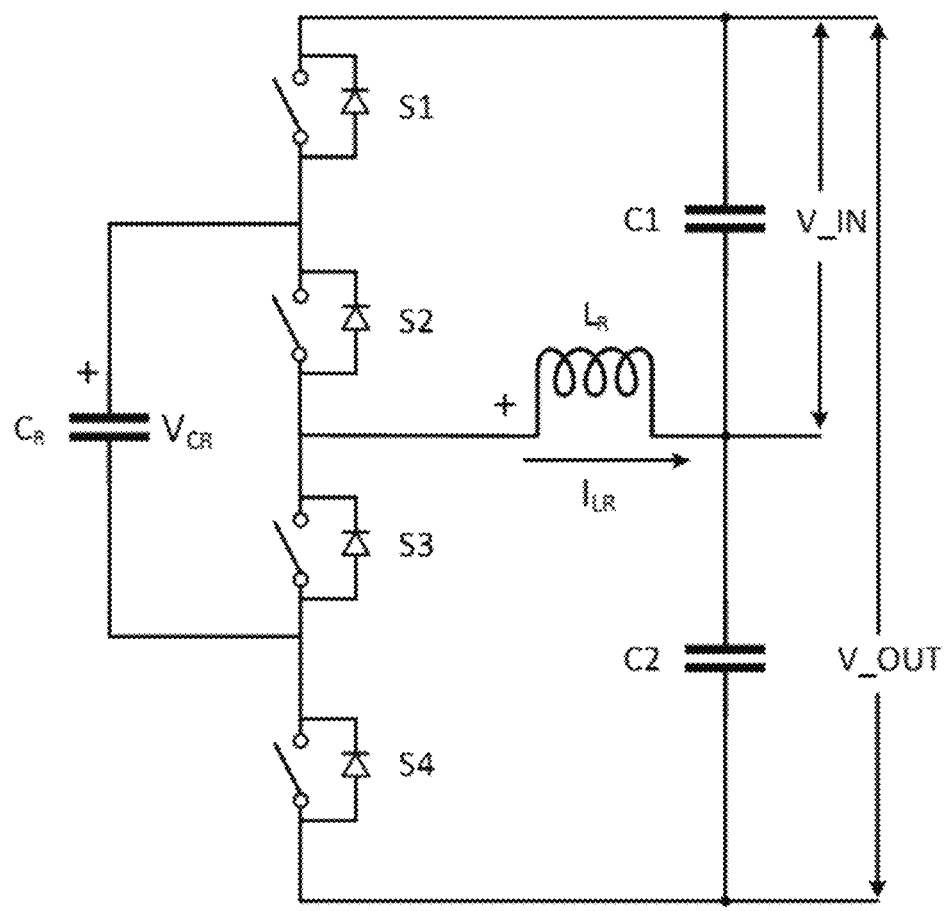
FIG. 17 illustrates an example topology of a resonant switched capacitor converter.

This document details the soft switching modulation approach for the resonant switched capacitor converter. The topology of the resonant switched capacitor is illustrated in FIG. 17. The proposed modulation approach may have several advantages. First several of the switches have zero-voltage switching (ZVS) or zero current switching (ZCS) transitions which lead to high efficiency converter operation. Second, the converter may operate at low switching frequencies, fSW (as compared to the frequency of the resonant circuit formed by inductor and capacitor, fR) which simplifies the design implementation and further reduces switching losses (fSW<fR).

Figure 18:
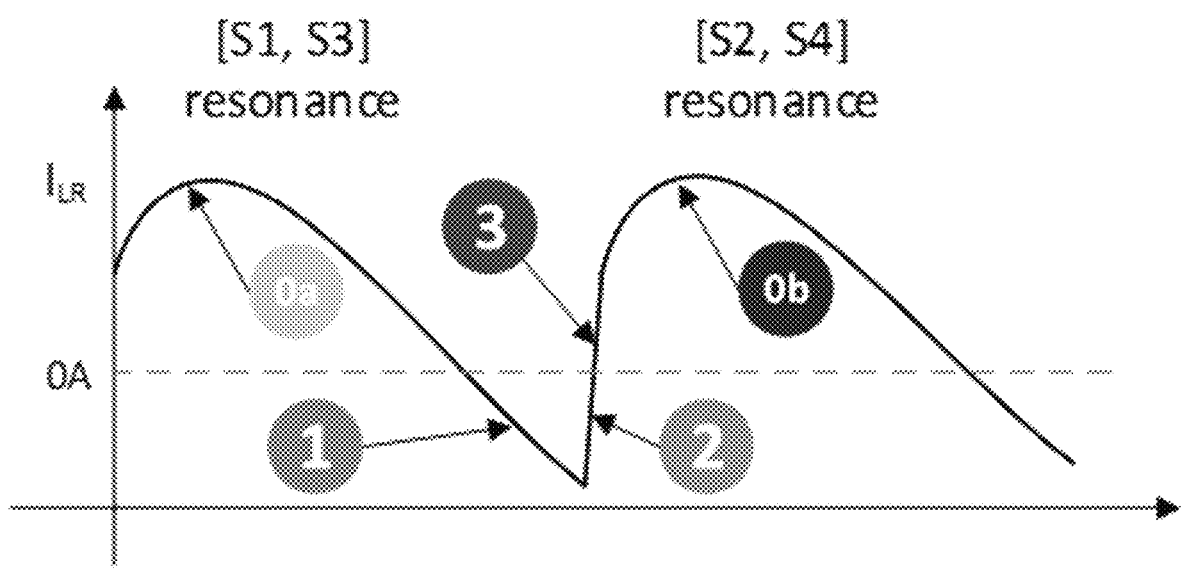
FIG. 18 illustrates an exemplary waveform of the current in a resonant inductor.

FIG. 18 illustrates an exemplary resonant inductor waveform under the proposed modulation approach. The modes of operation are annotated as "0a," "1," "2," "3," and "0b" in FIG. 18. FIG. 18 illustrates the switching devices which carry the current during the several modes of operation along with soft-switching transitions between various switching devices. FIG. 18 illustrates an example of the converter transitioning from [S1., S3] resonance to [S2, S4] resonance.

Figure 19:
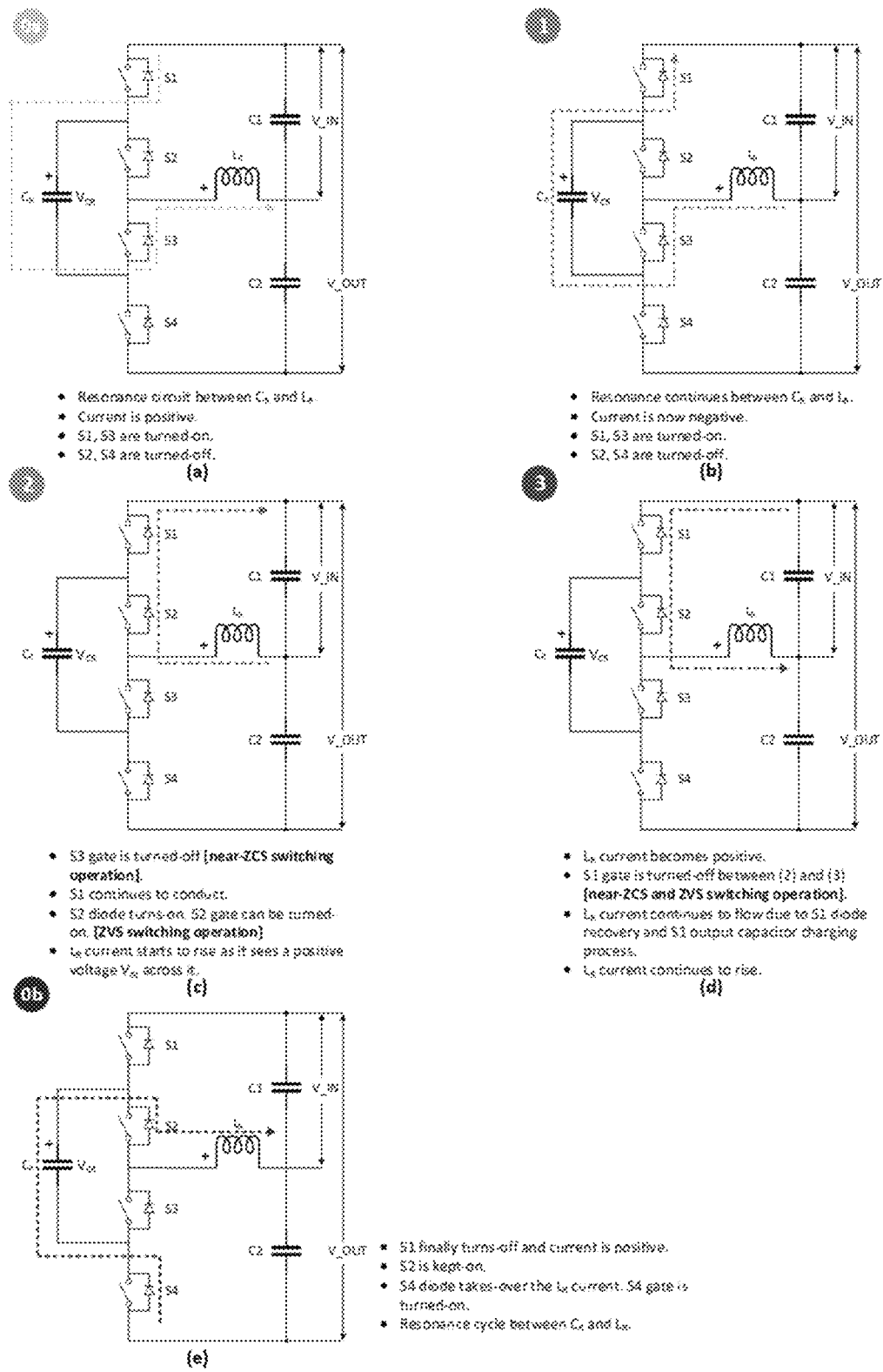
FIG. 19 illustrates an example switching circuit illustrating an example ZVS and ZCS process.

The waveform may transition between the modes annotated in FIG. 18 as follows. During mode "0a," the resonance inductor and capacitor may resonate. Switches S1 and S3 may remain turned-on and the current may be positive. Switches S2 and S4 are turned-off. During mode "1," the resonance current may become negative as the resonance cycle continues. The same switches S1 and S3 may continue to conduct. Switches S2 and S4 may remain turned-off. During mode "2," S3 may be turned-off. Although the current may be non-zero, the magnitude may be small. Hence, the switching operation may be considered ZCS switching. The current may continue to flow through S1 and may make its path through the body-diode of S2. The switch S2 gate may now be turned-on under ZVS switching. The current may change its direction and may start to rise as it sees a positive voltage of VIN. During mode "3," as the current rises, the current may reverse its polarity and become positive. The switch S1 gate may be turned-off between mode "2" and mode "3" under ZVS (e.g., near-ZCS switching operation). However, the switch S1 may continue to conduct due to diode reverse recovery process and its output capacitor charging process. During mode "0b," as switch S1 begins to turn-off and block voltage, the body diode of S4 may start to take-over the current and conduct. The second resonance cycle may begin wherein the resonant current flows through S2 and S4. Switch S4 gate may now be turned on. One example of how an SCC may transition between the modes depicted in FIG. 18 may be given by FIG. 19.

Figure 20:
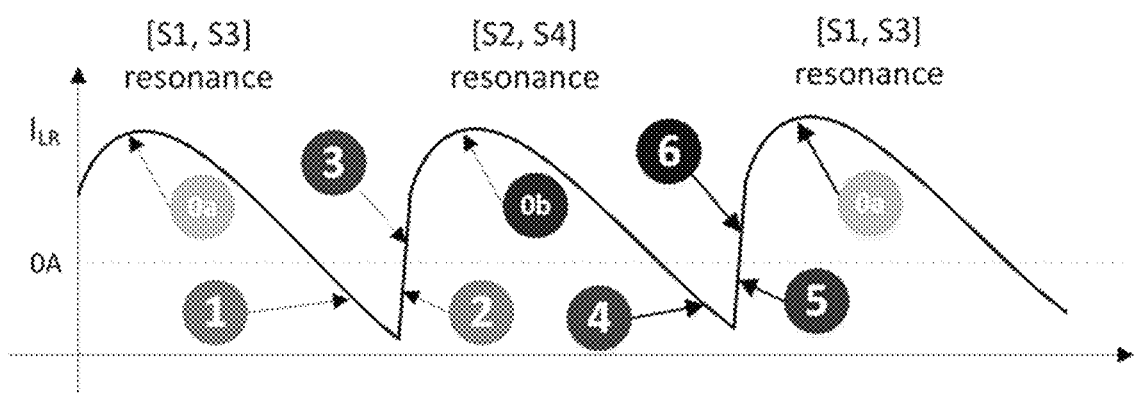
FIG. 20 illustrates an exemplary waveform of the current in a resonant inductor.

The following section outlines another exemplary transition from [S2, S4] resonance to [S1, S3] resonance. FIG. 20 illustrates an example approach.

The waveform may transition between the modes annotated in FIG. 20 as follows. During mode "0b," the resonance inductor and capacitor may resonate. Switches S2 and S4 may be on (conducting) and the current may be positive. Switches S1 and S3 may be turned-off. During mode "4," the resonance current may become negative as the resonance cycle continues. The same switches S2 and S4 may continue to conduct. Switches S1 and S3 may still be turned-off. During mode "5," S4 may be turned-off. Although the current may be non-zero, the magnitude may be small. Hence, the switching operation may be considered ZCS switching. The current may continue to flow through S2 and may make its path through the body-diode of S1. The switch S1 gate may now be turned-on under ZVS switching. The current may change its direction and may start to rise as it sees a positive voltage of VIN. During mode "6," (e.g. as the current rises) the current may reverse its polarity and may become positive. The switch S2 gate may be turned-off between mode "5" and mode "6" under ZVS and near-ZCS switching operation. However, the switch S2 may continue to conduct due to diode reverse recovery process and its output capacitor charging process. During mode "0a," (e.g., as switch S2 begins to turn-off and block voltage) the body diode of S3 may start to take-over the current and conduct. The second resonance cycle may begin (e.g . . . the resonant current may flow through S1 and S3). Switch S3 gate may now be turned on. One example of how an SCC may transition between the modes depicted in FIG. 20 may be given by FIG. 21.

Figure 22:
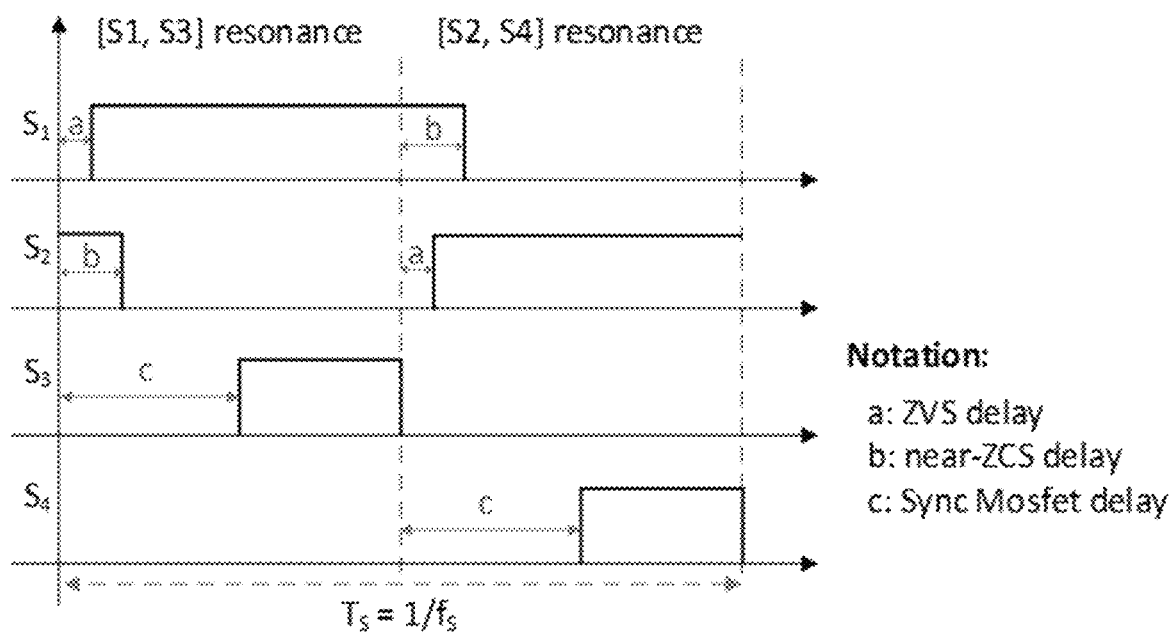
FIG. 22 illustrates exemplary gate driver signals for ZVS and ZCS switching operation.

FIG. 22 illustrates exemplary gate signals for the four switches S1-S4. The delays "a," "b," and "c" may be determined based on the switching characteristics of the switches to increase efficiency and reduce switching overshoots. The delays in the gate signals are denoted as "a," "b," and "c," Considering the transition from [S1, S3] resonance to [S2, S4] resonance, the delays "a," "b," and "c" may be determined as follows. During the turn-off of switch S3. the negative inductor current may transfer from mode "1" to mode "2". The current may transfer from switch S3 to S2. Regarding delay "a," after S2 body diode starts conducting. switch S2 may be turned-on. The delay interval may be determined based on turn-off characteristics of S3 and the negative current magnitude. Regarding delay "b," the delay interval "b" may determine the turn-off time of switch S1. This interval may be timed to make sure that the inductor current is near zero when S1 stops conducting. The delay length may be a function of the reverse recovery and turn-off characteristics of the switch S1. Regarding delay "c," the delay "c" may determine the conduction time of the body diode of S4. The conduction losses may be reduced, for example, when the switch S4 is turned-on while it is conducting as a body diode. Hence, the delay may be minimized to reduce conduction losses. On the other hand, in some instances it may be advantageous to keep the delay above a threshold, which may reduce over-voltage overshoots in switch S1 (e.g., as charge transfer occurs between S1 and S4).

Although examples are described above, features and/or steps of those examples may be combined, divided, omitted, rearranged, revised, and/or augmented in any desired manner. For example, a controller 1401 depicted in FIG. 14C may cause operations as described in FIG. 15A and/or FIG. 15B. In another example, the circuit of FIG. 14B may be combined with a power supply and/or load as depicted in FIG. 14C. Various alterations, modifications, and improvements are intended to be part of this description, though not expressly stated herein, and are intended to be within the spirit and the scope of the disclosure. Accordingly, the foregoing description is by way of example only, and is not limiting.

Clauses:

A1. An apparatus comprising: a first node (A), a second node (B), a third node (C) and a fourth node (D); a first switch (S1), a second switch (S2), a third switch (S3), and a fourth switch (S4), wherein the first switch and the second switch are coupled in series between the first node and the second node, wherein the third switch and the fourth switch are coupled between the second node and third node, and wherein each of the first switch, the second switch, the third switch, and the fourth switch is coupled in parallel to a respective bypass device (D1, D2, D3, D4); a circuit configured to resonate at a resonant frequency (fR), the circuit comprising: a winding (LR) and power bank (CR), wherein the winding is coupled between the second node and the fourth node, wherein the power bank comprises a first end and a second end, wherein the first end is coupled between the first switch and the second switch, and wherein the second end is coupled between the third switch and the fourth switch; and a controller configured to switch the first switch, the second switch, the third switch, and the fourth switch in a periodic and ordered manner.

A2. The apparatus of clause A1, wherein the controller is configured to, sequentially, in a period of operation of the first, second, third and fourth switches: turn the first switch and the third switch on and turn the second switch and the fourth switch off, turn the third switch off and the second switch on, turn the first switch off and the fourth switch on, turn the fourth switch off and the first switch on, and turn the second switch off and the third switch on.

A3. The apparatus of clause A1, wherein two nodes of the first node, third node, or fourth node are configured for use as input nodes, and two of the first node, third node, or fourth node are configured for use as output nodes.

A4. The apparatus of clause A3, wherein one of the first node, third node, or fourth node is duplicated for use as both an input node and an output node.

A5. The apparatus of clause A3, wherein the first node and the fourth node are configured for use as input terminals, the first node and the third node are configured for use as output terminals, and the controller is configured to control a voltage between the output terminals to be about double a voltage between the input terminals.

A6. The apparatus of clause A3, wherein the fourth node and the third node are configured for use as input terminals, the first node and the third node are configured for use as output terminals, and the controller is configured to control a voltage between the output terminals to be about double a voltage between the input terminals.

A7. The apparatus of clause A3, wherein the first node and the fourth node are configured for use as input terminals, the fourth node and the third node are configured for use as output terminals, and the controller is configured to control a voltage between the output terminals to be about the same a voltage between the input terminals.

A8. The apparatus of clause A3, wherein the fourth node and the third node are configured for use as input terminals, the first node and the fourth node are configured for use as output terminals, and the controller is configured to control a voltage between the output terminals to be about the same a voltage between the input terminals.

A9. The apparatus of clause A3, wherein the first node and the third node are configured for use as input terminals, the first node and the fourth node are configured for use as output terminals, and the controller is configured to control a voltage between the output terminals to be about half a voltage between the input terminals.

A10. The apparatus of clause A3, wherein the first node and the third node are configured for use as input terminals, the fourth node and the third node are configured for use as output terminals, and the controller is configured to control a voltage between the output terminals to be about half a voltage between the input terminals.

A11. The apparatus of clause A1, wherein the controller is configured to switch the first, second, third, and fourth switches under soft switching conditions.

A12. The apparatus of clause A11, wherein the controller is configured to switch the first, second, third, and fourth switches under soft switching conditions during a majority of switch transitions.

A13. The apparatus of clause A11, wherein the soft switching comprises zero voltage switching.

A14. The apparatus of clause A11, wherein the soft switching comprises zero current switching.

A15. The apparatus of clauses A13 and A14, wherein the controller is configured to switch a switch from the first, second, third, or fourth switch, with at least one of zero voltage switching and zero current switching when a bypass device parallel to the switch is conducting.

A16. The apparatus of clause A1 further comprising, a second power bank coupled from the first node to the fourth node and a third power bank coupled from the fourth node to the third node.

A17. The apparatus of clause A1, wherein the controller is configured to operate using open- loop feedback.

A18. The apparatus of clause A1, wherein the resonating frequency and the frequency of the controller's control signal (fsw) do not differ by more than 10 KHz.

A19. The apparatus of clause A1, wherein the frequency of the control signal (fsw) is lower than the resonating frequency.

A20. The system of clauses A1-A19, wherein the controller is further configured to have one or more signal delays between the switch transitions.

A21. The system of clause A20, wherein one or more of the delays is based on one of the switching characteristics of at least one of the switches.

A22. The system of clause A20, wherein one or more of the delays may allow the parallel bypass device of a switch to conduct before the switch turns on.

A23. The system of clause A20, wherein one or more of the delays is based on the control signal waiting for the transients to dissipate in at least one switch.

A24. The system of clause A20, wherein one or more of the delays may allow soft switching in a switch that is turned on.

A25. The system of clause A20, wherein one or more of the delays may be timed to the winding current to fall to zero or near zero levels.

A26. The system of clause A20, wherein one or more of the delays may be functions of reverse recovery of at least one of the switches.

A27. The system of clause A20, wherein one or more of the delays may be determined by a conduction time of the parallel bypass device of the switch to be turned on.

A28. The system of clause A20, wherein one or more of the delays may be minimized to reduce conduction losses.

A29. The system of clause A20, wherein one or more of the delays are large enough to avoid high over-voltage overshoots in the proceeding switch to be turned on.

A30. The system of clauses A1-29, wherein the circuit is used as an uninterruptable power source.

A31. A method comprising: controlling, using a controller, a resonant circuit comprising: a first node (A), a second node (B), a third node (C) and a fourth node (D); a first switch (S1), a second switch (S2), a third switch (S3), and a fourth switch (S4), wherein the first switch and the second switch are coupled in series between the first node and the second node, wherein the third switch and the fourth switch are coupled between the second node and the third node, and wherein each of the first switch, the second switch, the third switch and the fourth switch is coupled in parallel to a respective bypass device (D1, D2, D3, D4); resonating, at a resonant frequency (fR), the resonant circuit by a winding (LR) and a power bank (CR); determining, by a controller, to switch the first, second, third and fourth switches in a periodic and ordered manner in the following order: turning on the first switch and the third switch, turning off the third switch and turning on the second, turning off the first switch and turning on the fourth switch, turning off the fourth switch and turning on the first switch, and turning off the second switch and turning on the third switch.

A32. The method of clause A31, further comprising configuring two nodes of the first node, third node, and fourth node for use as input nodes, and configuring two of the first node, third node, and fourth node for use as output nodes.

A33. The method of clause A32, further comprising duplicating one of the first node, third node, and fourth node for use as both an input node and an output node.

A34. The method of clause A32, further comprising a doubling of a voltage between an input terminal and an output terminal by the controlling of a voltage between the output terminals, wherein the first node and the fourth node are configured for use as input terminals, and wherein the first node and the third node are configured for use as output terminals.

A35. The method of clause A32, further comprising a doubling of a voltage between an input terminal and an output terminal by the controlling of a voltage between the output terminals, wherein the fourth node and the third node are configured for use as input terminals, and wherein the first node and the third node are configured for use as output terminals.

A36. The method of clause A32, further comprising a mirroring of a similar voltage between an input terminal and an output terminal by the controlling of a voltage between the output terminals, wherein the first node and the fourth node are configured for use as input terminals, and wherein the fourth node and the third node are configured for use as output terminals.

A37. The method of clause A32, further comprising a mirroring of a similar voltage between an input terminal and an output terminal by the controlling of a voltage between the output terminals, wherein the fourth node and the third node are configured for use as input terminals, and wherein the first node and the fourth node are configured for use as output terminals.

A38. The method of clause A32, further comprising a halving of a voltage between an input terminal and an output terminal by the controlling of a voltage between the output terminals, wherein the first node and the third node are configured for use as input terminals, and wherein the first node and the fourth node are configured for use as output terminals.

A39. The method of clause A32, further comprising a halving of a voltage between an input terminal and an output terminal by the controlling of a voltage between the output terminals, wherein the first node and the third node are configured for use as input terminals, and wherein the fourth node and the third node are configured for use as output terminals.

A40. The method of clause A31, wherein the determining to switch comprises determining to switch the first, second, third, and fourth switches under soft switching conditions.

A41. The method of clause A40, wherein the determining to switch comprises determining to switch the first, second, third, and fourth switches under soft switching conditions during a majority of switch transitions.

A42. The method of clause A40, wherein the soft switching comprises zero voltage switching.

A43. The method of clause A40, wherein the soft switching comprises zero current switching.

A44. The method of clauses A42 and A43, wherein the determining to switch comprises determining to switch a switch from the first, second, third, or fourth switch, with at least one of zero voltage switching and zero current switching during the bypassing by a bypass device parallel to the switch when the bypass device is conducting.

A45. The method of clause A31 further comprising, a second power bank coupled from the first node to the fourth node and a third power bank coupled from the fourth node to the third node.

A46. The method of clause A31, further comprising controlling by the controller an open- loop feedback.

A47. The method of clause A31, further comprising the resonating frequency and the frequency of the controller's control signal (fsw) being within a 10 KHz range of one another.

A48. The method of clause A31, further comprising the frequency of the control signal being lower than the resonating frequency.

A49. The system of clauses A31-A48, further comprising controlling by the controller at least one signal delay between the switches transitions.

A50. The system of clause A49, wherein one or more of the delays is based on one of the switching characteristics of at least one of the switches.

A51. The system of clause A49, wherein one or more of the delays may allow the parallel bypass device of a switch to conduct before the switch turns on.

A52. The system of clause A49, wherein one or more of the delays is based on the control signal waiting for the transients to dissipate in at least one switch.

A53. The system of clause A49, wherein one or more of the delays may allow soft switching in a switch that is turned on.

A54. The system of clause A49, wherein one or more of the delays may be timed to the winding current to fall to zero or near zero levels.

A55. The system of clause A49, wherein one or more of the delays may be functions of reverse recovery of at least one of the switches.

A56. The system of clause A49, wherein one or more of the delays may be determined by a conduction time of the parallel bypass device of the switch to be turned on.

A57. The system of clause A49, wherein one or more of the delays may be minimized to reduce conduction losses.

A58. The system of clause A49, wherein one or more of the delays are large enough to avoid high over-voltage overshoots in the proceeding switch to be turned on.

A59. The system of clauses A31-A58, wherein the circuit is used as an uninterruptable power source.

A60. A system comprising: a circuit comprising: a first node (A), a second node (B), a third node (C) and a fourth node (D); a first switch (S1), a second switch (S2), a third switch (S3), and a fourth switch (S4), wherein the first switch and the second switch are coupled in series between the first node and the second node, wherein the third switch and the fourth switch are coupled between the second node and the third node, wherein each of the first switch, the second switch, the third switch and the fourth switch is coupled in parallel to a respective bypass device (D1, D2, D3, D4); a circuit configured to resonate at a resonant frequency (fR), the circuit comprising: a winding (LR) and power bank (CR), wherein the winding is coupled between the second node and the fourth node, wherein the power bank comprises a first end and a second end, wherein the first end is coupled between the first switch and the second switch, and wherein the second end is coupled between the third switch and the fourth switch; and a controller configured to switch the first switch, the second switch, the third switch and the fourth switch in a periodic and ordered manner, a power source connected to a first subset of the first, second, third, and fourth nodes; and a load connected to a second subset of the first, second, third, and fourth nodes.

A61. The system of clause A60, wherein the first node and the fourth node are coupled to the power source, the first node and the third node are coupled to the load, and the controller is configured to control a voltage between the output terminals to be about double a voltage between the input terminals.

A62. The system of clause A60, wherein the fourth node and the third node are coupled to the power source, the first node and the third node are coupled to the load, and the controller is configured to control a voltage between the output terminals to be about double a voltage between the input terminals.

A63. The system of clause A60, wherein the first node and the fourth node are coupled to the power source, the fourth node and the third node are coupled to the load, and the controller is configured to control a voltage between the output terminals to be about the same a voltage between the input terminals.

A64. The system of clause A60, wherein the fourth node and the third node are coupled to the power source, the first node and the fourth node are coupled to the load, and the controller is configured to control a voltage between the output terminals to be about the same a voltage between the input terminals.

A65. The system of clause A60, wherein the first node and the third node are coupled to the power source, the first node and the fourth node are coupled to the load, and the controller is configured to control a voltage between the output terminals to be about half a voltage between the input terminals.

A66. The system of clause A60, wherein the first node and the third node are coupled to the power source, the fourth node and the third node are coupled to the load, and the controller is configured to control a voltage between the output terminals to be about half a voltage between the input terminals.

A67. The system of clauses A60-A66, wherein the power source is a photovoltaic cell.

A68. The system of clauses A60-A66, wherein the power source is a string of photovoltaic cells.

A69. The system of clauses A60-A66, wherein the power source is a combiner box.

A70. The system of clauses A60-A66, wherein the power source is a junction box.

A71. The system of clauses A60-A66, wherein the power source is an uninterruptable power source (UPS).

A72. The system of clauses A60-A66, wherein the power source is a battery.

A73. The system of clauses A60-A66, wherein the power source is a maximum power point tracking (MPPT) circuit.

A74. The system of clauses A60-A66, wherein the power source is a direct current (DC) power converter.

A75. The system of clauses A60-A66, wherein the load is a photovoltaic cell.

A76. The system of clauses A60-A66, wherein the load is a string of photovoltaic cells.

A77. The system of clauses A60-A66, wherein the load is a combiner box.

A78. The system of clauses A60-A66, wherein the load is a junction box.

A79. The system of clauses A60-A66, wherein the load is an uninterruptable power source (UPS).

A80. The system of clauses A60-A66, wherein the load is a maximum power point tracking
(MPPT) circuit.

A81. The system of clauses A60-A66, wherein the load is a battery.

A82. The system of clauses A60-A66, wherein the load is an inverter.

A83. The system of clauses A60-A66, wherein the load is a transformer.

A84. The system of clauses A60-A66, wherein the load is an alternating current (AC) power converter.

A85. The system of clauses A60-A84, wherein the controller is further configured to have one or more signal delays between the switches transitions.

A86. The system of clause A85, wherein one or more of the delays is based on one of the switching characteristics of at least one of the switches.

A87. The system of clause A85, wherein one or more of the delays may allow the parallel bypass device of a switch to conduct before the switch turns on.

A88. The system of clause A85, wherein one or more of the delays is based on the control signal waiting for the transients to dissipate in at least one switch.

A89. The system of clause A85, wherein one or more of the delays may allow soft switching in a switch that is turned on.

A90. The system of clause A85, wherein one or more of the delays may be timed to the winding current to fall to zero or near zero levels.

A91. The system of clause A85, wherein one or more of the delays may be functions of reverse recovery of at least one of the switches.

A92. The system of clause A85, wherein one or more of the delays may be determined by the conduction time of the parallel bypass device of the switch to be turned on.

A93. The system of clause A85, wherein one or more of the delays may be minimized to reduce the conduction losses.

A94. The system of clause A85, wherein one or more of the delays are large enough to avoid high over-voltage overshoots in the proceeding switch to be turned on.

A95. The system of clauses A61-A94, wherein the circuit is used as an uninterruptable power source (UPS).

A96. The system in clause A68, wherein, the string voltage is kept to a regulated voltage level.

The invention claimed is:

1. An apparatus comprising:
    a DC/AC module comprising: direct current (DC) to alternating current (AC) converter circuitry configured to convert DC power to AC power;
    a first terminal, a second terminal, a third, terminal, a fourth terminal, and a midpoint terminal, wherein the DC/AC module is connected between the first terminal and the second terminal;
    a first capacitor connected between the first terminal and the midpoint terminal;
    a second capacitor connected between the second terminal and the midpoint terminal;
    a first switch configured to switch between: connecting the third terminal to the first terminal, and connecting the third terminal to the midpoint terminal;
    a second switch configured to switch between: connecting the fourth terminal to the second terminal, and connecting the fourth terminal to the midpoint terminal; and
    one or more controllers configure to control the first switch and the second switch to operate the apparatus in a plurality of configuration modes that includes at least two of:
    an above ground potential voltage-boost configuration mode, a below ground potential voltage-boost configuration mode, and a non-voltage-boost configuration mode,
    wherein in the above ground potential voltage-boost configuration mode maintains a voltage input to the DC to AC converter circuitry to be greater than a voltage across the third and the fourth terminals, and maintains voltages at the third and fourth terminals to be equal to or positive relative to a ground reference,
    wherein in the below ground potential voltage-boost configuration mode maintains the voltage input to the DC to AC converter circuitry to be greater than a voltage across the third and the fourth terminals, and maintains voltages at the third and fourth terminals to be equal to or negative relative to a ground reference, and
    the non-voltage-boost configuration mode maintains the voltage input to the DC to AC converter circuitry to be equal to a voltage across the third and the fourth terminals.

2. The apparatus of claim 1, wherein the DC/AC module is configured to receive the DC power from a DC power source via the third terminal and the fourth terminal.

3. The apparatus of claim 2, wherein the third terminal is configured to be connected to a positive output of the DC power source and the fourth terminal is configured to be connected to a negative output of the DC power source.

4. The apparatus of claim 2, further comprising the DC power source, wherein the DC power source is a photovoltaic power source.

5. The apparatus of claim 1, further comprising voltage control circuitry configured to increase a voltage, wherein the voltage control circuitry is connected to:
    the first terminal,
    the second terminal, and
    the midpoint terminal.

6. The apparatus of claim 5, further comprising a housing that houses:
the DC/AC module,
the first capacitor, and
the second capacitor,
wherein the voltage control circuitry is configured to increase voltage inside the housing.

7. The apparatus of claim 5, wherein the voltage control circuitry comprises DC to DC converter circuitry configured to convert a DC input to a DC output.

8. The apparatus of claim 5, wherein the DC/AC module further comprises a neutral output terminal, and the voltage control circuitry is further configured to control voltage at the midpoint terminal with respect to the neutral output terminal.

9. The apparatus of claim 1, wherein the DC/AC module further comprises a plurality of output terminals.

10. The apparatus of claim 9, wherein the plurality of output terminals includes at least two AC phase output terminals.

11. The apparatus of claim 9, wherein the plurality of output terminals includes a neutral output terminal.

12. A method comprising:
connecting a first capacitor between a midpoint terminal and a first terminal of a DC/AC module, the DC/AC module comprising direct current (DC) to alternating current (AC) converter circuitry configured to convert DC power to AC power;
connecting a second capacitor between the midpoint terminal and a second terminal of the DC/AC module;
connecting a first switch to the first terminal, the midpoint terminal, and a third terminal such that the first switch is arranged to switch between connecting the third terminal to the first terminal, and connecting the third terminal to the midpoint terminal;
connecting a second switch to the second terminal, the midpoint terminal, and a fourth terminal such that the second switch is arranged to switch between connecting the fourth terminal to the second terminal, and connecting the fourth terminal to the midpoint terminal; and
controlling the first switch and the second switch to operate in a plurality of configuration modes that includes at least two of: an above ground potential voltage-boost configuration mode, a below ground potential voltage boost configuration mode, and a non-voltage-boost configuration mode,
wherein in the above ground potential voltage-boost configuration mode maintains a voltage input to the DC to AC converter circuitry to be greater than a voltage across the third and the fourth terminals, and maintains voltages at the third and fourth terminals to be equal to or positive relative to a ground reference,
wherein in the below ground potential voltage-boost configuration mode maintains the voltage input to the DC to AC converter circuitry to be greater than a voltage across the third and the fourth terminals, and maintains voltages at the third and fourth terminals to be equal to or negative relative to a ground reference, and
the non-voltage-boost configuration mode maintains the voltage input to the DC to AC converter circuitry to be equal to a voltage across the third and the fourth terminals.

13. The method of claim 12, further comprising connecting the third terminal and the fourth terminal to a DC power source.

14. The method of claim 13, wherein the DC power source is a photovoltaic power source.

15. The method of claim 13, further comprising connecting the third terminal to a positive output of the DC power source, and connecting the fourth terminal to a negative output of the DC power source.

16. The method of claim 12, further comprising increasing, with voltage control circuitry, a voltage, wherein the voltage control circuitry is connected to:
the first terminal of the DC/AC module,
the second terminal of the DC/AC module, and
the midpoint terminal.

17. The method of claim 16, wherein the DC/AC module, the first capacitor, and the second capacitor are comprised in a housing, and wherein the method further comprises operating the voltage control circuitry to increase voltage inside the housing.

18. The method of claim 16, wherein the voltage control circuitry comprises DC to DC converter circuitry configured to convert a DC input to a DC output.

19. The method of claim 12, further comprising controlling voltage at the midpoint terminal with respect to a neutral output terminal of the DC/AC module.

20. An apparatus comprising:
a DC/AC module comprising: direct current (DC) to alternating current (AC) converter circuitry configured to convert DC power to AC power;
a first terminal, a second terminal, a third, terminal, a fourth terminal, and a midpoint terminal, wherein the DC/AC module is connected between the first terminal and the second terminal;
a first capacitor connected between the first terminal and the midpoint terminal;
a second capacitor connected between the second terminal and the midpoint terminal;
a first switch configured to switch between: connecting the third terminal to the first terminal, and connecting the third terminal to the midpoint terminal;
a second switch configured to switch between: connecting the fourth terminal to the second terminal, and connecting the fourth terminal to the midpoint terminal; and
one or more controllers configure to control the first switch and the second switch to operate the apparatus in a plurality of configuration modes that includes at least two of: an above ground potential voltage-boost configuration mode, a below ground potential voltage-boost configuration mode, and a non-voltage-boost configuration mode,
wherein in the above ground potential voltage-boost configuration mode the first switch connects the third terminal to the first terminal and the second switch connects the fourth terminal to the midpoint terminal,
wherein in the below ground potential voltage-boost configuration mode the first switch connects the third terminal to the midpoint terminal and the second switch connects the fourth terminal to the second terminal, and
wherein in the non-voltage-boost configuration mode the first switch connects the third terminal to the first terminal and the second switch connects the fourth terminal to the second terminal.

* * * * *